(12) United States Patent
Kim et al.

(10) Patent No.: US 12,333,109 B2
(45) Date of Patent: *Jun. 17, 2025

(54) PEN AND TOUCH INPUT SYSTEM AND CONTROLLER

(71) Applicant: HiDeep Inc., Seongnam-si (KR)

(72) Inventors: Seyeob Kim, Seongnam-si (KR);
Bonkee Kim, Seongnam-si (KR);
Young ho Cho, Seongnam-si (KR);
HwanHee Lee, Seongnam-si (KR);
Giduk Kim, Seongnam-si (KR);
Joohyun Go, Seongnam-si (KR); Mun Sub Byun, Seongnam-si (KR);
Hyoungwook Woo, Seongnam-si (KR);
Kiryoung Jung, Seongnam-si (KR); Ho Jun Moon, Seongnam-si (KR)

(73) Assignee: HiDeep Inc. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,906

(22) Filed: Jun. 16, 2023

(65) Prior Publication Data
US 2023/0418412 A1 Dec. 28, 2023

(30) Foreign Application Priority Data

Jun. 16, 2022 (KR) .................. 10-2022-0073661
Jul. 7, 2022 (KR) .................. 10-2022-0083683

(51) Int. Cl.
G06F 3/0354 (2013.01)
G06F 3/041 (2006.01)
(Continued)

(52) U.S. Cl.
CPC ...... *G06F 3/04166* (2019.05); *G06F 3/03545* (2013.01); *G06F 3/04162* (2019.05);
(Continued)

(58) Field of Classification Search
CPC ............. G06F 3/03545; G06F 3/04106; G06F 3/04162; G06F 3/04166; G06F 3/0445;
(Continued)

(56) References Cited

U.S. PATENT DOCUMENTS 5,218,174 A * 6/1993 Gray .................. H03B 5/1231
178/20.02
5,565,632 A 10/1996 Ogawa
(Continued)

FOREIGN PATENT DOCUMENTS

AU 2015307393 2/2017
CN 105607766 5/2016
(Continued)

OTHER PUBLICATIONS

Partial European Search Report issued in European Application No. 23179367 on Feb. 1, 2024.
(Continued)

*Primary Examiner* — Ryan A Lubit
(74) *Attorney, Agent, or Firm* — The Belles Group, P.C.

(57) ABSTRACT

A pen and touch input system according to an embodiment of the present invention includes a touch input device including a sensor unit and a control unit for controlling the sensor unit and a stylus pen interacting with the touch input device.

51 Claims, 27 Drawing Sheets

(51) Int. Cl.
*G06F 3/044* (2006.01)
*G06F 3/046* (2006.01)

(52) U.S. Cl.
CPC .......... *G06F 3/0445* (2019.05); *G06F 3/0446* (2019.05); *G06F 3/046* (2013.01)

(58) Field of Classification Search
CPC ...... G06F 3/0446; G06F 3/0448; G06F 3/046; G06F 2203/04112
See application file for complete search history.

(56) References Cited

U.S. PATENT DOCUMENTS

| | | | |
|---|---|---|---|
| 5,576,502 | A | 11/1996 | Fukushima et al. |
| 8,304,671 | B2 | 11/2012 | Fukushima et al. |
| 9,151,586 | B2 | 10/2015 | Fukushima |
| 9,207,784 | B2 | 12/2015 | Wong et al. |
| 10,338,747 | B2 | 7/2019 | Kim |
| 10,691,278 | B1 | 6/2020 | Kay et al. |
| 11,048,359 | B2 | 6/2021 | Xi et al. |
| 11,675,446 | B2 | 6/2023 | Kim |
| 2001/0038384 | A1 | 11/2001 | Fukushima |
| 2003/0141119 | A1 | 7/2003 | Chao et al. |
| 2005/0162411 | A1 | 7/2005 | Berkel Van |
| 2009/0084614 | A1 | 4/2009 | Fukushima et al. |
| 2010/0176817 | A1 | 7/2010 | Mclean et al. |
| 2011/0115753 | A1 | 5/2011 | Katsurahira |
| 2012/0074962 | A1 | 3/2012 | Fukushima et al. |
| 2012/0223917 | A1 | 9/2012 | Lin |
| 2013/0141398 | A1 | 6/2013 | Cho et al. |
| 2013/0257785 | A1 | 10/2013 | Brown et al. |
| 2014/0132529 | A1 | 5/2014 | Jeong |
| 2014/0152627 | A1 | 6/2014 | Wong et al. |
| 2014/0320445 | A1 | 10/2014 | Kim |
| 2015/0049052 | A1 | 2/2015 | Atkinson |
| 2015/0070330 | A1 | 3/2015 | Stern |
| 2015/0084935 | A1 | 3/2015 | Lien |
| 2016/0154528 | A1* | 6/2016 | Ahn ..................... G06F 3/0441 345/174 |
| 2017/0153748 | A1 | 6/2017 | Choi |
| 2017/0269770 | A1* | 9/2017 | Ogawa ............... G06F 3/04166 |
| 2017/0277284 | A1 | 9/2017 | Kim |
| 2017/0285772 | A1 | 10/2017 | Yamamoto |
| 2018/0004324 | A1* | 1/2018 | Park ..................... G06F 3/0441 |
| 2018/0039345 | A1 | 2/2018 | Obata |
| 2018/0101272 | A1 | 4/2018 | Xi et al. |
| 2018/0164908 | A1 | 6/2018 | Tanaka |
| 2018/0209818 | A1 | 7/2018 | Miyazawa |
| 2020/0050298 | A1 | 2/2020 | Tanaka |
| 2020/0264712 | A1* | 8/2020 | Kim .................... G06F 3/0441 |
| 2020/0310564 | A1* | 10/2020 | Woo .................... G06F 3/046 |
| 2021/0089147 | A1* | 3/2021 | Kim .................... G06F 3/03545 |
| 2021/0124449 | A1 | 4/2021 | Jang et al. |
| 2021/0173437 | A1* | 6/2021 | Bae ......................... H10K 59/40 |
| 2021/0303121 | A1* | 9/2021 | Ku ......................... G06F 3/0446 |
| 2022/0164081 | A1 | 5/2022 | Lee et al. |
| 2023/0067179 | A1 | 3/2023 | Kim et al. |
| 2023/0074089 | A1* | 3/2023 | Kim .................... G06F 3/04162 |
| 2023/0083248 | A1* | 3/2023 | Park .................... G06F 3/03542 345/174 |
| 2023/0418412 | A1 | 12/2023 | Kim |

FOREIGN PATENT DOCUMENTS

| | | |
|---|---|---|
| CN | 113383299 A | 9/2021 |
| CN | 113424136 | 9/2021 |
| CN | 113424136 A | 9/2021 |
| CN | 114816110 A | 7/2022 |
| EP | 2045696 | 4/2009 |
| EP | 4036696 A1 | 8/2022 |
| JP | S 6025886 | 9/1982 |
| JP | 2005529414 | 9/2005 |
| JP | 2009-288958 | 12/2009 |
| JP | 2011-107985 | 6/2011 |
| JP | 3171524 | 11/2011 |
| JP | 2013-162113 | 8/2013 |
| JP | 2014-219959 | 11/2014 |
| JP | 2016-134512 | 7/2016 |
| JP | 2017-211753 | 11/2017 |
| KR | 20110002073 | 1/2011 |
| KR | 1020130078142 A | 7/2013 |
| KR | 1020140013948 A | 2/2014 |
| KR | 1020140035789 A | 3/2014 |
| KR | 20140060933 | 5/2014 |
| KR | 1020160025440 A | 3/2016 |
| KR | 20180004412 | 1/2018 |
| KR | 1020180125671 A | 11/2018 |
| KR | 1020220110053 | 8/2022 |
| KR | 1020220118534 A | 8/2022 |
| TW | 201407427 A | 2/2014 |
| TW | 201421300 | 6/2014 |
| TW | 201908934 A | 3/2019 |
| WO | WO 2002089157 | 11/2002 |
| WO | 2021/150045 | 7/2021 |
| WO | 2021/150045 A1 | 7/2021 |

OTHER PUBLICATIONS

Radu-Marian Cernat: "Transient modeling of coaxial coil systems taking into account nonlinear material properties", Aug. 6, 2013 (Aug. 6, 2013), pp. 1-119, XP055950024, DOI: 10.17877/de290r-5510.

A. Verma et al., "Microwave permittivity and permeability of ferrite-polymer thick films", Journal of Magnetism and Magnetic Materials, vol. 263, No. 1-2, 20030701, pp. 228-234.

* cited by examiner

PEN AND TOUCH INPUT SYSTEM AND CONTROLLER

CROSS-REFERENCE TO RELATED APPLICATIONS

This U.S. non-provisional patent application claims priority under 35 U.S.C. § 119 of Korean Patent Application No. 10-2022-0073661, filed on Jun. 16, 2022 and Korean Patent Application No. 10-2022-0083683, filed on Jul. 7, 2022, the entire contents of all of which are hereby incorporated by reference. This application is related by subject matter to U.S. non-provisional patent application Ser. No. 17/193,177, filed on Mar. 5, 2021, issued as U.S. Pat. No. 11,301,062 on Apr. 12, 2022; U.S. non-provisional patent application Ser. No. 17/694,933, filed on Mar. 15, 2022, issued as U.S. Pat. No. 11,662,837 on May 30, 2023; U.S. non-provisional patent application Ser. No. 18/133,608, filed on Apr. 12, 2023; U.S. non-provisional patent application Ser. No. 18/203,633, filed on May 30, 2023; U.S. non-provisional patent application Ser. No. 18/330,549, filed on Jun. 7, 2023; and U.S. non-provisional patent application Ser. No. 18/230,025, filed on Aug. 3, 2023, the entire contents of all of which are hereby incorporated by reference.

BACKGROUND

The present disclosure relates to a controller, and more particularly, to a system and a controller for controlling a sensor unit in a pen and touch input device interacting with a stylus pen.

A touch sensor is provided in various touch input devices such as mobile phones, smart phones, laptop computers, digital broadcasting terminals, personal digital assistants (PDA), portable multimedia players (PMP), navigation units, slate PCs, tablet PCs, ultrabooks, and wearable devices.

The touch sensor in the touch input device may be disposed on a display panel that displays an image or a portion of the touch input device. As a user touches a touch sensor to interact with the touch input device, the touch input device may provide an intuitive user interface to the user.

The user may use a stylus pen for a precise touch input. The stylus pen may be classified into an active stylus pen and a passive stylus pen depending on whether a battery and an electronic component are provided therein.

Although the active stylus pen has an excellent basic performance and provides additional functions (pen pressure, hovering, buttons) in comparison with the passive stylus pen, the active stylus pen is expensive and uses a rechargeable battery as power. Thus, not many users substantially use the active stylus pen except for some advanced users.

Although the passive stylus pen is inexpensive and does not require a battery in comparison with the active stylus pen, the passive stylus pen is difficult to recognize a precise touch in comparison with the active stylus pen. In recent years, however, technologies of an electro magnetic resonance (EMR) method that is an inductive resonance method and a capacitive resonance method are proposed to realize a passive stylus pen capable of recognizing a precise touch.

Although the EMR method is excellent in writing and drawing quality that is a key function of the stylus pen, the EMR method has a great thickness and requires more costs because a separate EMR sensor panel and a separate EMR driving IC are necessarily added in addition to a capacitance touch panel.

The capacitive resonance method uses a general capacitance touch sensor and a general touch controller IC to increase a performance of the IC and support a pen touch without additional costs.

In the EMR method or the capacitive resonance method, a resonance signal is required to have a great amplitude to more accurately distinguish a touch caused by the stylus pen. Thus, a driving signal transmitted to the stylus pen needs to have the almost same resonance frequency as that of the resonance circuit contained in the stylus pen. However, according to a typical EMR method or a typical capacitive resonance method, although the resonance frequency is the same as a frequency of the driving signal, signal transmission is difficult because of extremely great attenuation of the signal transmission. As a result, despite attempts of many touch controller IC vendors for a long time, no companies have succeeded in mass production yet because a sufficient output signal is not produced.

Thus, a feature of how to design structures of the internal resonance circuit and the pen is a key factor to manufacture an EMR or capacitive resonance stylus pen capable of producing a maximum output signal.

SUMMARY

The present disclosure provides a pen including a stylus pen producing sufficient output signals, a touch input system interacting with a stylus pen, and a controller for controlling a device.

The present disclosure provides a system and a controller for controlling a sensor unit in a pen and touch input device including a pen interacting with a stylus pen capable of producing a sufficient output signal.

The present disclosure also provides a pen and touch input system including a controller device for controlling a sensor unit in a multifunctional touch input device capable of detecting a position of a touch, driving a stylus pen, and detecting a position of the stylus pen.

The present disclosure also provides a pen and touch input system including a controller device for controlling a sensor unit in a touch input device capable of solving a limitation in which an output voltage of a sensing circuit unit is varied according to a position of a stylus pen.

The present disclosure also provides a pen and touch input system including a controller device for controlling a sensor unit in a touch input device capable of widening a bandwidth of an operating frequency of a touch driving signal and a pen driving signal when a screen of a touch input device is expanded to a size of a screen of a table PC.

The present disclosure also provides a pen and touch input system including a controller device for controlling a sensor unit in a touch input device capable of relieving attenuation of a pen sensing signal when a screen of a touch input device is expanded to a size of a screen of a table PC.

The problem to be solved in the present invention is not limited to the above-described problem.

An embodiment of the present invention provides a pen and touch input system including: a touch input device including a sensor unit and a control unit configured to control the sensor unit; and a stylus pen configured to interact with the touch input device. Here, the sensor unit includes: a plurality of first patterns each extending in a first direction and having first ends electrically connected to the control unit; a plurality of second patterns each extending in the first direction and disposed adjacent to the first patterns; a plurality of third patterns each extending in a second direction different from the first direction and having first ends electrically connected to the control unit; and a plurality of fourth patterns each extending in the second direction and disposed adjacent to the third patterns. Also, second ends of at least a portion of the plurality of second patterns are electrically connected to each other, and second ends of at least a portion of the plurality of fourth patterns are electrically connected to each other. Also, the stylus pen includes: a body unit; a tip exposed to the outside in the body unit; an inductor unit including a ferrite core disposed in the body unit and a coil wound in multiple layers around at least a portion of the ferrite core; and a capacitor unit disposed in the body unit and electrically connected to the inductor unit to form a resonance circuit. Also, the control unit applies a touch driving signal to the plurality of first patterns and receives a touch sensing signal from the third patterns, and the control unit applies a stylus pen driving signal to at least one of the plurality of first to fourth patterns and receives a stylus pen sensing signal from at least one of the plurality of first to fourth patterns.

Another embodiment of the present invention provides a pen and touch input system including: a touch input device including a sensor unit and a control unit configured to control the sensor unit; and a stylus pen configured to interact with the touch input device. Here, the sensor unit includes: a plurality of first patterns each extending in a first direction and having first ends electrically connected to the control unit; and a plurality of third patterns each extending in a second direction different from the first direction and having first ends electrically connected to the control unit. Also, the stylus pen includes: a body unit; a tip exposed to the outside in the body unit; an inductor unit including a ferrite core disposed in the body unit and a coil wound in multiple layers around at least a portion of the ferrite core; and a capacitor unit disposed in the body unit and electrically connected to the inductor unit to form a resonance circuit. Also, the control unit applies a touch driving signal to the plurality of first patterns and receives a touch sensing signal from the plurality of third patterns, and the control unit applies a stylus pen driving signal to at least one of the plurality of first patterns or the plurality of third patterns.

Another embodiment of the present invention provides a pen and touch input system including: a touch input device including a sensor unit and a control unit configured to control the sensor unit; and a stylus pen configured to interact with the touch input device. Here, the sensor unit includes: a plurality of first patterns each extending in a first direction and having first ends electrically connected to the control unit; and a plurality of third patterns each extending in a second direction different from the first direction and having first ends electrically connected to the control unit. Also, the stylus pen includes: a body unit; a tip exposed to the outside in the body unit; an inductor unit including a ferrite core disposed in the body unit and a coil wound in multiple layers around at least a portion of the ferrite core; and a capacitor unit disposed in the body unit and electrically connected to the inductor unit to form a resonance circuit. Also, the control unit applies a touch driving signal to the plurality of first patterns and receives a touch sensing signal from the plurality of third patterns, and the control unit receives a stylus pen sensing signal from at least one of the plurality of first patterns or the plurality of third patterns.

Another embodiment of the present invention provides a pen and touch input system including: a touch input device including a sensor unit and a control unit configured to control the sensor unit; and a stylus pen configured to interact with the touch input device. Here, the sensor unit includes: a plurality of first patterns each extending in a first direction and having first ends electrically connected to the control unit; a plurality of second patterns each extending in the first direction and disposed adjacent to the first patterns; a plurality of third patterns each extending in a second direction perpendicular to the first direction and having first ends electrically connected to the control unit; and a plurality of fourth patterns each extending in the second direction and disposed adjacent to the third patterns. Also, second ends of at least a portion of the plurality of second patterns or at least a portion of the plurality of fourth patterns are electrically connected to each other. Also, the stylus pen includes: a body unit; a tip exposed to the outside in the body unit; an inductor unit including a ferrite core disposed in the body unit and a coil wound in multiple layers around at least a portion of the ferrite core; and a capacitor unit disposed in the body unit and electrically connected to the inductor unit to form a resonance circuit. Also, the control unit applies a touch driving signal to the plurality of first patterns and receives a touch sensing signal from the plurality of third patterns, and the control unit applies a stylus pen driving signal to at least one of the plurality of second patterns or the plurality of fourth patterns.

Another embodiment of the present invention provides a pen and touch input system including: a touch input device including a sensor unit and a control unit configured to control the sensor unit; and a stylus pen configured to interact with the touch input device. Here, the sensor unit includes: a plurality of first patterns each extending in a first direction and having first ends electrically connected to the control unit; a plurality of second patterns each extending in the first direction and disposed adjacent to the first patterns; a plurality of third patterns each extending in a second direction different from the first direction and having first ends electrically connected to the control unit; and a plurality of fourth patterns each extending in the second direction and disposed adjacent to the third patterns. Also, second ends of at least a portion of the plurality of second patterns or at least a portion of the plurality of fourth patterns are electrically connected to each other. Also, the stylus pen includes: a body unit; a tip exposed to the outside in the body unit; an inductor unit including a ferrite core disposed in the body unit and a coil wound in multiple layers around at least a portion of the ferrite core; and a capacitor unit disposed in the body unit and electrically connected to the inductor unit to form a resonance circuit. Also, the control unit applies a touch driving signal to the plurality of first patterns and receives a touch sensing signal from the plurality of third patterns, and the control unit receive a stylus pen sensing signal from at least one of the plurality of second patterns or the plurality of fourth patterns.

Another embodiment of the present invention provides a pen and touch input system including: a touch input device including a sensor unit and a control unit configured to control the sensor unit; and a stylus pen configured to interact with the touch input device. Here, the sensor unit includes: a plurality of first patterns each extending in a first direction and having first ends electrically connected to the control unit; a plurality of second patterns each extending in the first direction and disposed adjacent to the first patterns; a plurality of third patterns each extending in a second direction different from the first direction and having first ends electrically connected to the control unit; and a plurality of fourth patterns each extending in the second direction and disposed adjacent to the third patterns. Also, second ends of at least a portion of the plurality of second patterns are electrically connected to each other, and second ends of at least a portion of the plurality of fourth patterns are electrically connected to each other. Also, the stylus pen includes: a body unit; a tip exposed to the outside in the body unit; an inductor unit including a ferrite core disposed in the body unit and a coil wound in multiple layers around at least a portion of the ferrite core; and a capacitor unit disposed in the body unit and electrically connected to the inductor unit to form a resonance circuit. Also, the control unit applies a touch driving signal to the plurality of first patterns and receives a touch sensing signal from the plurality of third patterns, and the control unit selects at least one of the plurality of first to fourth patterns as a pen driving electrode and applies a stylus pen driving signal to the selected pen driving.

Another embodiment of the present invention provides a pen and touch input system including: a touch input device including a sensor unit and a control unit configured to control the sensor unit; and a stylus pen configured to interact with the touch input device. Here, the sensor unit includes: a plurality of first patterns each extending in a first direction and having first ends electrically connected to the control unit; a plurality of second patterns each extending in the first direction and disposed adjacent to the first patterns; a plurality of third patterns each extending in a second direction different from the first direction and having first ends electrically connected to the control unit; and a plurality of fourth patterns each extending in the second direction and disposed adjacent to the third patterns. Also, second ends of at least a portion of the plurality of second patterns are electrically connected to each other, and second ends of at least a portion of the plurality of fourth patterns are electrically connected to each other. Also, the stylus pen includes: a body unit; a tip exposed to the outside in the body unit; an inductor unit including a ferrite core disposed in the body unit and a coil wound in multiple layers around at least a portion of the ferrite core; and a capacitor unit disposed in the body unit and electrically connected to the inductor unit to form a resonance circuit. Also, the control unit applies a touch driving signal to the plurality of first patterns and receives a touch sensing signal from the plurality of third patterns, and the control unit selects at least two of the plurality of first to fourth patterns as a pen sensing electrode and senses a stylus pen signal emitted from the stylus pen through the selected pen sensing electrode.

Here, the ferrite core may have a dielectric constant of 1000 or less, the coil may be formed such that adjacent winding layers are alternately wound, and the coil is a wire that surrounds two or more insulating wires.

Here, the coil may be formed such that adjacent winding layers are wound in an inclined zigzag pattern.

Here, the ferrite core may include nickel.

Here, the coil may be a litz wire.

Here, the pen and touch input system may further include a bobbin that surrounds at least a portion of the ferrite core, and the coil is wound around at least a portion of the bobbin.

Here, the inductor part may be formed such that two or more inductor parts are connected in series.

Here, the pen and touch input system may further include a conductive blocking member disposed on at least a portion of the inductor part.

Here, the blocking member may include one slit configured to block generation of an eddy current, both ends of the blocking member may be spaced apart from each other in the first direction by the one slit, and the first direction may be a direction in which the eddy current is formed.

Here, at least one of the second pattern or the fourth pattern may be used to apply the stylus pen driving signal for driving the stylus pen.

Here, the stylus pen driving signal for driving the stylus pen may be applied through a pattern different from a pattern for applying the touch driving signal and a pattern for receiving the touch sensing signal.

Here, one of the second pattern or the fourth pattern may be electrically floated.

Here, among at least one plurality of patterns of the plurality of second patterns or the plurality of fourth patterns for applying the stylus pen driving signal, first ends of at least two patterns may be electrically connected to each other.

Here, at least one of the second pattern or the fourth pattern may be used to receive the stylus pen sensing signal for sensing the stylus pen.

Here, the stylus pen sensing signal for sensing the stylus pen may be received through a pattern different from a pattern for applying the touch driving signal and a pattern for receiving the touch sensing signal.

Here, at least one of the first pattern or the third pattern may be used to apply the stylus pen driving signal for driving the stylus pen.

Here, the stylus pen sensing signal for sensing the stylus pen may be received through the same pattern as a pattern for applying the touch driving signal or a pattern for receiving the touch sensing signal.

Here, each of the first pattern and the second pattern may have a length greater than that of each of the third pattern and the fourth pattern.

Here, at least one of the first to fourth patterns may be used to apply the stylus pen driving signal for driving the stylus pen and sense the stylus pen driving signal.

Here, the first pattern may include first-a patterns and first-b patterns arranged in the first direction, the second pattern may include second-a patterns and second-b patterns arranged in the first direction, second ends of at least a portion of the plurality of second-a patterns may be electrically connected to each other, second ends of at least a portion of the plurality of second-b patterns may be electrically connected to each other, and the second ends of at least a portion of the plurality of second-a patterns may face the second ends of at least a portion of the plurality of second-b patterns.

Here, each of the first pattern and the second pattern may have a length greater than that of each of the third pattern and the fourth pattern.

Here, at least one of the first pattern to fourth pattern may include a plurality of main pattern parts and a connection pattern part configured to connect two adjacent main pattern parts among the plurality of main pattern parts.

Here, at least a portion of the main pattern parts may have a diamond shape.

Here, the main pattern part of the second pattern may have a shape corresponding to that of the main pattern part of the first pattern part, and the main pattern part of the fourth pattern may have a shape corresponding to that of the main pattern part of the third pattern part.

Here, the first pattern or the third pattern may have an opening, and the second pattern or the fourth pattern may be disposed in the opening of the first pattern or the third pattern.

Here, the first pattern or the third pattern may surround the second pattern or the fourth pattern, respectively.

Here, the first pattern and the second may be disposed on the same layer, or the third pattern and the fourth pattern may be disposed on the same layer.

Here, at least a portion of the first pattern and at least a portion of the second pattern may be disposed on a first layer, and at least a portion of the third pattern and at least a portion of the fourth pattern may be disposed on a second layer.

Here, second ends of the plurality of second patterns and the plurality of fourth patterns may be electrically connected to each other through vias.

Here, the control unit may: apply a driving signal for touch sensing to at least one first pattern of the plurality of first patterns; and sense a sensing signal received from at least one third pattern of the plurality of third patterns.

Here, the control unit may connect the plurality of second patterns or the plurality of fourth patterns to a plurality of driving circuit units.

Here, the control unit may include a recording medium in which a program is recorded for executing: a process of applying a driving signal for touch sensing to at least one first pattern of the plurality of first patterns; and a process of receiving a sensing signal received from at least one third pattern among the plurality of third patterns.

Here, the control unit may include a recording medium in which a program is recorded for executing: a process of connecting the plurality of second patterns or the plurality of fourth patterns to a plurality of driving circuit units.

Here, the pen and touch input system may further include: a plurality of driving circuit units for touch sensing; and a plurality of sensing circuit units for touch sensing. Here, the control unit may control to: apply a driving signal for touch sensing to at least one driving pattern of the first pattern or the third pattern through the plurality of driving circuit units for touch sensing; and receive a sensing signal for touch sensing from at least one sensing pattern of the first pattern or the third pattern through the plurality of sensing circuit units for touch sensing.

Here, the pen and touch input system may further include a plurality of pen driving circuit units, and the control unit may control to apply the same signal as the driving signal for touch sensing to the plurality of second patterns or the plurality of fourth patterns through the plurality of pen driving circuit units.

Here, the control unit may control to output: the stylus pen driving signal to one pen driving pattern of at least one kind of patterns of the plurality of first patterns or the plurality of fourth patterns; and a driving signal opposite to the above driving signal to one pen driving pattern of at least the other patterns.

Here, the control unit may include a recording medium in which a program is recorded for executing: a process of outputting the driving signal to one pen driving pattern of at least one kind of patterns of the plurality of first patterns to the plurality of fourth patterns; and a process of outputting a driving signal opposite to the above driving signal to one pen driving pattern of at least the other patterns.

Here, the pen and touch input system may further include a plurality of driving circuit units for driving the pen, and the control unit may control to apply: a driving signal to at least one driving pattern of the plurality of first to fourth patterns through at least one driving circuit unit for driving the pen of the plurality of driving circuit units for driving the pen; and a signal opposite to the above driving signal to at least one driving pattern of the plurality of first to fourth patterns through at least another driving circuit unit for driving the pen of the plurality of driving circuit units for driving the pen.

Here, the control unit may controls to sense the pen based on an output value from at least one sensing pattern of at least one kind of sensing patterns of the plurality of first to fourth patterns and an output value from at least one sensing pattern of one kind of sensing patterns different from the at least one kind of sensing patterns.

Here, the control unit may include a recording medium in which a program is recorded for executing: a process of sensing a pen based on an output value from at least one sensing pattern of at least one kind of sensing patterns of the plurality of first to fourth patterns and an output value from at least one sensing pattern of one kind of sensing patterns different from the at least one kind of sensing patterns.

Here, the pen and touch input system may further include a plurality of sensing circuit units for pen sensing, and the control unit may control to: sense the pen based on an output value from at least one sensing pattern of the plurality of first to fourth patterns, which is sensed through at least one sensing circuit unit for pen sensing among the plurality of sensing circuit units for pen sensing, and an output value from a sensing pattern different from the at least one pen sensing pattern, which is sensed through at least one sensing circuit unit for pen sensing among the plurality of sensing circuit units for pen sensing.

Here, at least a portion of the sensing circuit unit for pen sensing may be used for touch sensing.

Here, the pen and touch input system may further include a capacitor connected to a pattern of the second end among the plurality of second patterns or the plurality of fourth patterns.

Here, the second pattern may be a bar pattern disposed in the first pattern and extending in the first direction, and the fourth pattern may be a bar pattern disposed in the third pattern and extending in the second direction. Here, the controller may further include: a plurality of fifth patterns disposed between the plurality of first patterns, having a shape corresponding to and overlapping a main pattern part of the third pattern, and electrically connected to the fourth pattern; a capacitor connected to a pattern of the second end among the plurality of fifth patterns; a plurality of sixth patterns disposed between the plurality of third patterns, having a shape corresponding to and overlapping a main pattern part of the first pattern, and electrically connected to the second pattern; and a capacitor connected to the pattern of the second end among the plurality of sixth patterns.

Here, the pen and touch input system may further include at least one trace directly connected to a portion at which the patterns disposed on the second end are electrically connected to each other and disposed outside an active area of the touch input device.

Here, the sensor unit may further include at least one of a fifth pattern and a sixth pattern, the fifth pattern is disposed on a layer different from a layer on which one pattern of the third pattern and the fourth pattern is disposed, electrically connected to one pattern of the third pattern and the fourth pattern, and overlapping at least one portion of the other pattern of the third pattern and the fourth pattern in a vertical direction, and the sixth pattern is disposed on a layer different from a layer on which one pattern of the first pattern and the second pattern is disposed, electrically connected to one pattern of the first pattern and the second pattern, and overlapping at least one portion of the other pattern of the first pattern and the second pattern in the vertical direction.

Here, the first pattern and the second pattern may be disposed on different layers, and the first pattern may overlap one portion of the second pattern in a vertical direction, or the third pattern and the fourth pattern may be disposed on different layers, and the third pattern may overlap one portion of the fourth pattern in the vertical direction.

Another embodiment of the present invention provides a controller configured to control a sensor unit in a touch input device including the sensor unit and configured to interact with a stylus pen. Here, the sensor unit includes: a plurality of first patterns each extending in a first direction and having first ends electrically connected to the control unit; a plurality of second patterns each extending in the first direction and disposed adjacent to the first patterns; a plurality of third patterns each extending in a second direction different from the first direction and having first ends electrically connected to the control unit; and a plurality of fourth patterns each extending in the second direction and disposed adjacent to the third patterns. Also, second ends of at least a portion of the plurality of second patterns are electrically connected to each other, and second ends of at least a portion of the plurality of fourth patterns are electrically connected to each other. Also, the stylus pen includes: a body unit; a tip exposed to the outside in the body unit; an inductor unit including a ferrite core disposed in the body unit and a coil wound in multiple layers around at least a portion of the ferrite core; and a capacitor unit disposed in the body unit and electrically connected to the inductor unit to form a resonance circuit. Also, the control unit applies a touch driving signal to the plurality of first patterns and receives a touch sensing signal from the third patterns, and the control unit applies a stylus pen driving signal to at least one of the plurality of first to fourth patterns and receives a stylus pen sensing signal from at least one of the plurality of first to fourth patterns.

Another embodiment of the present invention provides a controller configured to control a sensor unit in a touch input device including the sensor unit and configured to interact with a stylus pen. Here, the sensor unit includes: a plurality of first patterns each extending in a first direction and having first ends electrically connected to the control unit; and a plurality of third patterns each extending in a second direction different from the first direction and having first ends electrically connected to the control unit. Also, the stylus pen includes: a body unit; a tip exposed to the outside in the body unit; an inductor unit including a ferrite core disposed in the body unit and a coil wound in multiple layers around at least a portion of the ferrite core; and a capacitor unit disposed in the body unit and electrically connected to the inductor unit to form a resonance circuit. Also, the control unit applies a touch driving signal to the plurality of first patterns and receives a touch sensing signal from the plurality of third patterns, and the control unit receives a stylus pen sensing signal from at least one of the plurality of first patterns and the plurality of third patterns.

Another embodiment of the present invention provides a controller configured to control a sensor unit in a touch input device including the sensor unit and configured to interact with a stylus pen. Here, the sensor unit includes: a plurality of first patterns each extending in a first direction and having first ends electrically connected to the control unit; a plurality of second patterns each extending in the first direction and disposed adjacent to the first patterns; a plurality of third patterns each extending in a second direction different from the first direction and having first ends electrically connected to the control unit; and a plurality of fourth patterns each extending in the second direction and disposed adjacent to the third patterns. Also, second ends of at least a portion of the plurality of second patterns or at least a portion of the plurality of fourth patterns are electrically connected to each other. Also, the stylus pen includes: a body unit; a tip exposed to the outside in the body unit; an inductor unit including a ferrite core disposed in the body unit and a coil wound in multiple layers around at least a portion of the ferrite core; and a capacitor unit disposed in the body unit and electrically connected to the inductor unit to form a resonance circuit. Also, the control unit applies a touch driving signal to the plurality of first patterns and receives a touch sensing signal from the plurality of third patterns, and the control unit applies a stylus pen driving signal to at least one of the plurality of first patterns and the plurality of third patterns.

Another embodiment of the present invention provides a controller configured to control a sensor unit in a touch input device including the sensor unit and configured to interact with a stylus pen. Here, the sensor unit includes: a plurality of first patterns each extending in a first direction and having first ends electrically connected to the control unit; a plurality of second patterns each extending in the first direction and disposed adjacent to the first patterns; a plurality of third patterns each extending in a second direction perpendicular to the first direction and having first ends electrically connected to the control unit; and a plurality of fourth patterns each extending in the second direction and disposed adjacent to the third patterns. Also, second ends of at least a portion of the plurality of second patterns or at least a portion of the plurality of fourth patterns are electrically connected to each other. Also, the stylus pen includes: a body unit; a tip exposed to the outside in the body unit; an inductor unit including a ferrite core disposed in the body unit and a coil wound in multiple layers around at least a portion of the ferrite core; and a capacitor unit disposed in the body unit and electrically connected to the inductor unit to form a resonance circuit. Also, the control unit applies a touch driving signal to the plurality of first patterns and receives a touch sensing signal from the plurality of third patterns, and the control unit receives a stylus pen sensing signal from at least one of the plurality of first patterns and the plurality of third patterns.

An embodiment of the present invention provides a controller configured to control a sensor unit in a touch input device including the sensor unit and configured to interact with a stylus pen. Here, the sensor unit includes: a plurality of first patterns each extending in a first direction and having first ends electrically connected to the control unit; a plurality of second patterns each extending in the first direction and disposed adjacent to the first patterns; a plurality of third patterns each extending in a second direction different from the first direction and having first ends electrically connected to the control unit; and a plurality of fourth patterns each extending in the second direction and disposed adjacent to the third patterns. Also, second ends of at least a portion of the plurality of second patterns are electrically connected to each other, and second ends of at least a portion of the plurality of fourth patterns are electrically connected to each other. Also, the stylus pen includes: a body unit; a tip exposed to the outside in the body unit; an inductor unit including a ferrite core disposed in the body unit and a coil wound in multiple layers around at least a portion of the ferrite core; and a capacitor unit disposed in the body unit and electrically connected to the inductor unit to form a resonance circuit. Also, the control unit applies a touch driving signal to the plurality of first patterns and receives a touch sensing signal from the third patterns, and the control unit applies a stylus pen driving signal to at least one of the plurality of first to fourth patterns and receives a stylus pen sensing signal from at least one of the plurality of first to fourth patterns.

Another embodiment of the present invention provides a controller configured to control a sensor unit in a touch input device including the sensor unit and configured to interact with a stylus pen. Here, the sensor unit includes: a plurality of first patterns each extending in a first direction and having first ends electrically connected to the control unit; and a plurality of third patterns each extending in a second direction different from the first direction and having first ends electrically connected to the control unit. Also, the stylus pen includes: a body unit; a tip exposed to the outside in the body unit; an inductor unit including a ferrite core disposed in the body unit and a coil wound in multiple layers around at least a portion of the ferrite core; and a capacitor unit disposed in the body unit and electrically connected to the inductor unit to form a resonance circuit. Also, the control unit applies a touch driving signal to the plurality of first patterns and receives a touch sensing signal from the plurality of third patterns, and the control unit applies a stylus pen sensing signal to at least one of the plurality of first patterns or the plurality of third patterns.

Another embodiment of the present invention provides a controller configured to control a sensor unit in a touch input device including the sensor unit and configured to interact with a stylus pen. Here, the sensor unit includes: a plurality of first patterns each extending in a first direction and having first ends electrically connected to the control unit; and a plurality of third patterns each extending in a second direction different from the first direction and having first ends electrically connected to the control unit. Also, the stylus pen includes: a body unit; a tip exposed to the outside in the body unit; an inductor unit including a ferrite core disposed in the body unit and a coil wound in multiple layers around at least a portion of the ferrite core; and a capacitor unit disposed in the body unit and electrically connected to the inductor unit to form a resonance circuit. Also, the control unit applies a touch driving signal to the plurality of first patterns and receives a touch sensing signal from the plurality of third patterns, and the control unit receives a stylus pen sensing signal from at least one of the plurality of first patterns or the plurality of third patterns.

Another embodiment of the present invention provides a controller configured to control a sensor unit in a touch input device including the sensor unit and configured to interact with a stylus pen. Here, the sensor unit includes: a plurality of first patterns each extending in a first direction and having first ends electrically connected to the control unit; a plurality of second patterns each extending in the first direction and disposed adjacent to the first patterns; a plurality of third patterns each extending in a second direction perpendicular to the first direction and having first ends electrically connected to the control unit; and a plurality of fourth patterns each extending in the second direction and disposed adjacent to the third patterns. Also, second ends of at least a portion of the plurality of second patterns or at least a portion of the plurality of fourth patterns are electrically connected to each other. Also, the stylus pen includes: a body unit; a tip exposed to the outside in the body unit; an inductor unit including a ferrite core disposed in the body unit and a coil wound in multiple layers around at least a portion of the ferrite core; and a capacitor unit disposed in the body unit and electrically connected to the inductor unit to form a resonance circuit. Also, the control unit applies a touch driving signal to the plurality of first patterns and receives a touch sensing signal from the plurality of third patterns, and the control unit applies a stylus pen driving signal to at least one of the plurality of second patterns or the plurality of fourth patterns.

Another embodiment of the present invention provides a controller configured to control a sensor unit in a touch input device including the sensor unit and configured to interact with a stylus pen. Here, the sensor unit includes: a plurality of first patterns each extending in a first direction and having first ends electrically connected to the control unit; a plurality of second patterns each extending in the first direction and disposed adjacent to the first patterns; a plurality of third patterns each extending in a second direction different from the first direction and having first ends electrically connected to the control unit; and a plurality of fourth patterns each extending in the second direction and disposed adjacent to the third patterns. Also, second ends of at least a portion of the plurality of second patterns or at least a portion of the plurality of fourth patterns are electrically connected to each other. Also, the stylus pen includes: a body unit; a tip exposed to the outside in the body unit; an inductor unit including a ferrite core disposed in the body unit and a coil wound in multiple layers around at least a portion of the ferrite core; and a capacitor unit disposed in the body unit and electrically connected to the inductor unit to form a resonance circuit. Also, the control unit applies a touch driving signal to the plurality of first patterns and receives a touch sensing signal from the plurality of third patterns, and the control unit receive a stylus pen sensing signal from at least one of the plurality of second patterns or the plurality of fourth patterns.

Another embodiment of the present invention provides a controller configured to control a sensor unit in a touch input device including the sensor unit and configured to interact with a stylus pen. Here, the sensor unit includes: a plurality of first patterns each extending in a first direction and having first ends electrically connected to the control unit; a plurality of second patterns each extending in the first direction and disposed adjacent to the first patterns; a plurality of third patterns each extending in a second direction different from the first direction and having first ends electrically connected to the control unit; and a plurality of fourth patterns each extending in the second direction and disposed adjacent to the third patterns. Also, second ends of at least a portion of the plurality of second patterns are electrically connected to each other, and second ends of at least a portion of the plurality of fourth patterns are electrically connected to each other. Also, the stylus pen includes: a body unit; a tip exposed to the outside in the body unit; an inductor unit including a ferrite core disposed in the body unit and a coil wound in multiple layers around at least a portion of the ferrite core; and a capacitor unit disposed in the body unit and electrically connected to the inductor unit to form a resonance circuit. Also, the control unit applies a touch driving signal to the plurality of first patterns and receives a touch sensing signal from the plurality of third patterns, and the control unit selects at least one of the plurality of first to fourth patterns as a pen driving electrode and applies a stylus pen driving signal to the selected pen driving electrode.

Another embodiment of the present invention provides a controller configured to control a sensor unit in a touch input device including the sensor unit and configured to interact with a stylus pen. Here, the sensor unit includes: a plurality of first patterns each extending in a first direction and having first ends electrically connected to the control unit; a plurality of second patterns each extending in the first direction and disposed adjacent to the first patterns; a plurality of third patterns each extending in a second direction perpendicular to the first direction and having first ends electrically connected to the control unit; and a plurality of fourth patterns each extending in the second direction and disposed adjacent to the third patterns. Also, second ends of at least a portion of the plurality of second patterns or at least a portion of the plurality of fourth patterns are electrically connected to each other. Also, the stylus pen includes: a body unit; a tip exposed to the outside in the body unit; an inductor unit including a ferrite core disposed in the body unit and a coil wound in multiple layers around at least a portion of the ferrite core; and a capacitor unit disposed in the body unit and electrically connected to the inductor unit to form a resonance circuit. Also, the control unit applies a touch driving signal to the plurality of first patterns and receives a touch sensing signal from the plurality of third patterns, and the control unit selects at least two of the first to fourth patterns as a pen sensing electrode and senses a stylus pen signal emitted from the stylus pen through the selected pen sensing electrode.

Here, the ferrite core may have a dielectric constant of 1000 or less, the coil may be formed such that adjacent winding layers are alternately wound, and the coil is a wire that surrounds two or more insulating wires.

Here, the coil may be formed such that adjacent winding layers are wound in an inclined zigzag pattern.

Here, the ferrite core may include nickel.

Here, the coil may be a litz wire.

Here, the controller may further include a bobbin that surrounds at least a portion of the ferrite core, and the coil may be wound around at least a portion of the bobbin.

Here, the inductor part may be formed such that two or more inductor parts are connected in series.

Here, the controller may further include a conductive blocking member disposed on at least a portion of the inductor part.

Here, the blocking member may include one slit configured to block generation of an eddy current, both ends of the blocking member may be spaced apart from each other in the first direction by the one slit, and the first direction may be a direction in which the eddy current is formed.

Here, second ends of at least a portion of the plurality of second patterns may be electrically connected to each other, or second ends of at least a portion of the plurality of fourth patterns may be electrically connected to each other.

Here, at least one of the second pattern or the fourth pattern may be used to apply the stylus pen driving signal for driving the stylus pen.

Here, the stylus pen driving signal for driving the stylus pen may be applied through a pattern different from a pattern for applying the touch driving signal and a pattern for receiving the touch sensing signal.

Here, one of the second pattern or the fourth pattern may be electrically floated.

Here, among at least one plurality of patterns of the plurality of second patterns or the plurality of fourth patterns for applying the stylus pen driving signal, first ends of at least two patterns may be electrically connected to each other.

Here, at least one of the second pattern or the fourth pattern may be used to receive the stylus pen sensing signal for sensing the stylus pen.

Here, the stylus pen sensing signal for sensing the stylus pen may be received through a pattern different from a pattern for applying the touch driving signal and a pattern for receiving the touch sensing signal.

Here, at least one of the first pattern or the third pattern may be used to apply the stylus pen driving signal for driving the stylus pen.

Here, the stylus pen sensing signal for sensing the stylus pen may be received through the same pattern as a pattern for applying the touch driving signal or a pattern for receiving the touch sensing signal.

Here, each of the first pattern and the second pattern may have a length greater than that of each of the third pattern and the fourth pattern.

Here, at least one of the first to fourth patterns may be used to apply the stylus pen driving signal for driving the stylus pen and sense the stylus pen driving signal.

Here, the first pattern may include first-a patterns and first-b patterns arranged in the first direction, the second pattern may include second-a patterns and second-b patterns arranged in the first direction, second ends of at least a portion of the plurality of second-a patterns may be electrically connected to each other, second ends of at least a portion of the plurality of second-b patterns may be electrically connected to each other, and the second ends of at least a portion of the plurality of second-a patterns may face the second ends of at least a portion of the plurality of second-b patterns.

Here, each of the first pattern and the second pattern may have a length greater than that of each of the third pattern and the fourth pattern.

Here, at least one of the first pattern to fourth pattern may include a plurality of main pattern parts and a connection pattern part configured to connect two adjacent main pattern parts among the plurality of main pattern parts.

Here, at least a portion of the main pattern parts may have a diamond shape.

Here, the main pattern part of the second pattern may have a shape corresponding to that of the main pattern part of the first pattern part, and the main pattern part of the fourth pattern may have a shape corresponding to that of the main pattern part of the third pattern part.

Here, the first pattern or the third pattern may have an opening, and the second pattern or the fourth pattern may be disposed in the opening of the first pattern or the third pattern, respectively.

Here, the first pattern or the third pattern may surround the second pattern or the fourth pattern, respectively.

Here, the first pattern and the second may be disposed on the same layer, or the third pattern and the fourth pattern may be disposed on the same layer.

Here, at least a portion of the first pattern and at least a portion of the second pattern may be disposed on a first layer, and at least a portion of the third pattern and at least a portion of the fourth pattern may be disposed on a second layer.

Here, second ends of the plurality of second patterns and the plurality of fourth patterns may be electrically connected to each other through vias.

Here, the control unit may apply a driving signal for touch sensing to at least one first pattern among the plurality of first patterns and receive a sensing signal received from at least one third pattern among the plurality of third patterns.

Here, the controller may connect the plurality of second patterns or the plurality of fourth patterns to a plurality of driving circuit units.

Here, the controller may include a recording medium in which a program is recorded for executing: a process of applying a driving signal for touch sensing to at least one first pattern among the plurality of first patterns; and a process of receiving a sensing signal received from at least one third pattern among the plurality of third patterns.

Here, the controller may include a recording medium in which a program is recorded for executing: a process of connecting the plurality of second patterns or the plurality of fourth patterns to a plurality of driving circuit units.

Here, the control unit may further include: a plurality of driving circuit units for touch sensing; and a plurality of sensing circuit units for touch sensing, and the controller may control to: apply a driving signal for touch sensing to at least one driving pattern among the plurality of first or third patterns through the plurality of driving circuit units for touch sensing; and receive a sensing signal for touch sensing received from at least one sensing pattern among the plurality of first or third patterns through the plurality of sensing circuit units for touch sensing.

Here, the controller may further include a plurality of pen driving circuit units, and the controller may control to apply the same signal as the driving signal for touch sensing to the plurality of second patterns or the plurality of fourth patterns through the plurality of pen driving circuit units.

Here, the controller may allow: a driving signal to be outputted to at least one driving pattern among the plurality of driving patterns, and a driving signal opposite to the above-described driving signal to be outputted to at least another driving pattern among the plurality of driving patterns.

Here, the controller may include a recording medium in which a program is recorded for executing: a process of outputting a driving signal to at least one driving pattern among the plurality of driving patterns; and a process of outputting a driving signal opposite to the above-described driving signal to at least another driving pattern among the plurality of driving patterns.

Here, the controller may further include a plurality of driving circuit units for pen driving, and the controller may control to: apply a driving signal to at least one driving pattern through at least one driving circuit unit for pen driving through at least one driving circuit unit for pen driving among the plurality of driving circuit for pen driving; and apply a driving signal opposite to the above-described driving signal to at least another driving pattern through at least another driving circuit unit for pen driving among the plurality of driving circuit units for pen driving.

Here, the controller may sense the pen based on an output value from at least one sensing pattern of at least one sensing patterns of the plurality of first to fourth patterns and an output value from at least one sensing pattern of one sensing patterns different from the at least one sensing patterns.

Here, the controller may include a recording medium in which a program is recorded for executing: a process of sensing the pen based on an output value from at least one sensing pattern of at least one sensing patterns of the plurality of first to fourth patterns and an output value from at least one sensing pattern of one sensing patterns different from the at least one sensing patterns.

Here, the controller may further include a plurality of sensing circuit units for sensing the pen, and the controller may sense the pen based on an output value from at least one sensing pattern of the plurality of first to fourth patterns, which is sensed through at least one sensing circuit unit for sensing the pen among the plurality of sensing circuit units for sensing the pen and an output value from a sensing pattern different from the at least one pen sensing pattern, which is sensed through at least one sensing circuit unit for sensing the pen among the plurality of sensing circuit units for sensing the pen.

Here, at least a portion of the sensing circuit unit for pen sensing may be used for touch sensing.

Here, the controller may further include a capacitor connected to a pattern of the second end among the plurality of second patterns or the plurality of fourth patterns.

Here, the second pattern may be a bar pattern disposed in the first pattern and extending in the first direction, and the fourth pattern may be a bar pattern disposed in the third pattern and extending in the second direction. Here, the controller may further include: a plurality of fifth patterns disposed between the plurality of first patterns, having a shape corresponding to and overlapping a main pattern part of the third pattern, and electrically connected to the fourth pattern; a capacitor connected to a pattern of the second end among the plurality of fifth patterns; a plurality of sixth patterns disposed between the plurality of third patterns, having a shape corresponding to and overlapping a main pattern part of the first pattern, and electrically connected to the second pattern; and a capacitor connected to the pattern of the second end among the plurality of sixth patterns.

Here, the controller may further include at least one trace directly connected to a portion at which the patterns disposed on the second end are electrically connected to each other and disposed outside an active area of the touch input device.

Here, the sensor unit may further include at least one of a fifth pattern and a sixth pattern, the fifth pattern is disposed on a layer different from a layer on which one pattern of the third pattern and the fourth pattern is disposed, electrically connected to one pattern of the third pattern and the fourth pattern, and overlapping at least one portion of the other pattern of the third pattern and the fourth pattern in a vertical direction, and the sixth pattern is disposed on a layer different from a layer on which one pattern of the first pattern and the second pattern is disposed, electrically connected to one pattern of the first pattern and the second pattern, and overlapping at least one portion of the other pattern of the first pattern and the second pattern in the vertical direction.

Here, the first pattern and the second pattern may be disposed on different layers, and the first pattern may overlap one portion of the second pattern in a vertical direction, or the third pattern and the fourth pattern may be disposed on different layers, and the third pattern may overlap one portion of the fourth pattern in the vertical direction.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1A:
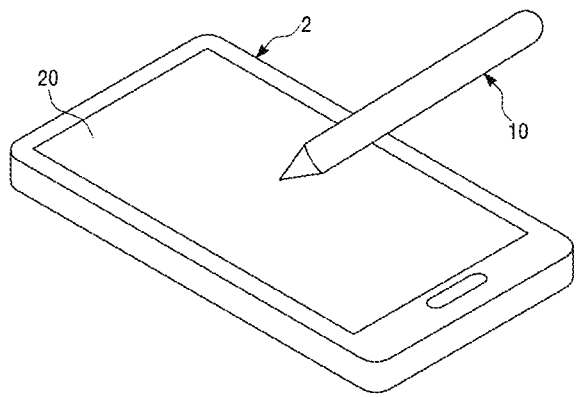
FIG. 1A is a conceptual view illustrating a pen including a stylus pen and a touch input device and a touch input system.

Hereinafter, the present invention will be described with reference to the accompanying drawings showing various embodiments of the invention. The present invention may, however, be embodied in different forms and should not be construed as limited to the embodiments set forth herein. Rather, the present invention covers various modifications, equivalents, and/or alternatives of the embodiments of the invention. When the drawings are described, like reference numerals refer to like elements throughout.

Therefore, it will be understood that the embodiments disclosed in this specification includes some variations without limitations to the shapes as illustrated in the figures. In the drawings, the dimensions of layers and regions are exaggerated for clarity of illustration. Also, in the drawings, the thickness of some layers and regions are exaggerated for convenience of description.

In the specification, it will be understood that when a layer (or film), a region, or a plate is referred to as being 'on' another layer, region, or plate, it can be directly on the other layer, region, or plate, or intervening layers, regions, or plates may also be present. On the other hand, it will also be understood that when a layer, a film, an area or a plate is referred to as being "directly on" another one, intervening layers, films, areas, and plates may not be present. Further, in the specification, the term "on" or "above" represents a feature of being positioned on or below the object, and does not represent a feature of being positioned "on" or "above" the object based on a gravitational direction.

In this specification, expressions such as "have", "may have", "includes", or "may include" refer to the presence of a corresponding characteristic (e.g., a numerical value, function, operation, or component such as a part), and does not exclude the presence of additional features.

In this specification, expressions such as "A or B", "at least one of A or/and B", or "one or more of A and/or B" may include all possible combinations of the items listed together. For example, the expressions "A or B", "at least one of A and B", or "at least one of A or B" may refer to all of (1) including at least one A, (2) including at least one B, or (3) a case of including both at least one A and at least one B.

In this specification, expressions such as "first" or "second" used herein may modify various components regardless of order and/or importance and be used only to distinguish one component from another component instead of limiting the corresponding component. For example, a first user device and a second user device may represent different user devices regardless of order or importance. For example, a first component referred to as a first component in one embodiment can be referred to as a second component in another embodiment without departing from the scope of the appended claims, and similarly, the second component may also be renamed as the first component.

When a component (e.g., a first component) is (operatively or communicatively) "coupled or connected with/to" another component (e.g., a second component), it should be understood that one component may be connected to another component in a direct way or through another component (e.g., a third component). When a component (e.g., a first component) is directly "coupled or connected with/to" another component (e.g., a second component), it may be understood that no other component (e.g., a third component) exists between one component and another component.

In this specification, the expression "configured to (or set to)" may be used interchangeably with, e.g., "suitable for", "having the capacity to", "designed to", "adapted to", "made to", or "capable of" depends on situations. The term "configured to (or set to)" may not necessarily refer to only "specifically designed to" in terms of hardware. Instead, in some circumstances, the expression "a device configured to~" may indicate that the device is "capable of~" with other devices or components. For example, the phrase "a processor configured to (or set to) perform A, B, and C" may indicate a generic-purpose processor (e.g., a CPU or an application processor) capable of performing corresponding operations by executing one or more software programs stored in a dedicated processor (e.g., an embedded processor) or memory device for performing the corresponding operation.

Terms used herein may be used only to describe specific embodiments, and may not be intended to limit the scope of other embodiments. The terms of a singular form may include plural forms unless referred to the contrary. Terms used herein, including technical or scientific terms, may have the same meanings as commonly understood by a person skilled in the art described in this document. Among the terms used in this specification, terms defined in a general dictionary may be interpreted as having the same or similar meaning as the meaning in the context of the related art, and unless explicitly defined in this specification, it should not be construed in an ideal or overly formal sense. In some cases, even terms defined in this document may not be construed to exclude embodiments of this document.

A touch input device according to various embodiments of the present document may include at least one of, e.g., a smartphone, a tablet personal computer (PC), a mobile phone, a video phone, an e-book reader, a laptop personal computer (PC), a netbook computer, a mobile medical device, a camera, or a wearable device. According to various embodiments, the wearable device may include at least one of an accessory (e.g., a watch, a ring, a bracelet, an anklet, a necklace, glasses, contact lenses, or a head-mounted-device (HMD)), a fabric or integrated garment (e.g., electronic clothing), a body attachable (e.g., a skin pad or tattoo), and a bio-implantable (e.g., an implantable circuit).

Hereinafter a controller for controlling a sensor unit in a touch input device including the sensor unit and interacting with a stylus pen according to an embodiment of the present invention will be described with reference to the accompanying drawings.

When the controller according to an embodiment of the present invention is described, a pen and touch input system including a touch input device including: a sensor unit; and a control unit for controlling the sensor unit and a stylus pen interacting with the touch input device will be described.

FIG. 1A is a conceptual view illustrating a pen and touch input system including a stylus pen and a touch input device.

Referring to FIG. 1A, a stylus pen 10 may receive (or uplink) a signal outputted from a touch input device 2 or a touch screen 20 around a touch screen 20 of the touch input device 2 and transmit (or downlink) a signal to the touch screen 20. Here, since the touch input device 2 includes a sensor unit and a control unit for controlling the sensor unit and interacts with the stylus pen 10, the touch input device 2 may be referred to as a 'pen and touch input device'.

Figure 1B:
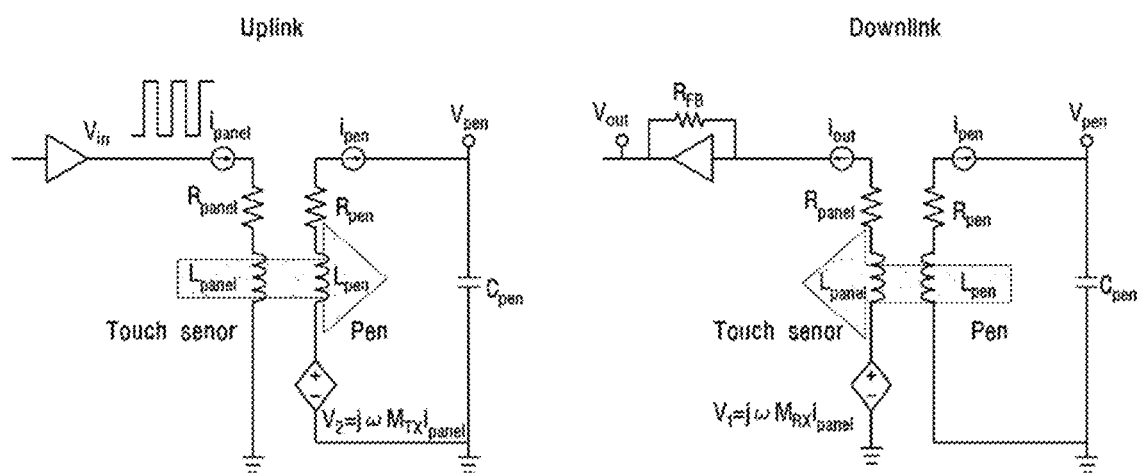
FIG. 1B is a view for explaining uplink and downlink in the pen and the touch input system in FIG. 1A.

FIG. 1B is a view for explaining uplink and downlink in the pen and the touch input system in FIG. 1A.

Referring to a left drawing of FIG. 1B, in the uplink, an electromotive force (V2, or Vemf) is formed in the coil inside the stylus pen 10 of FIG. 1A. Referring to the right drawing of FIG. 1B, in the downlink, an electromotive force V1 or Vemf is formed in the sensor unit of the touch input device 20. That is, the coil inside the stylus pen and the sensor unit of the touch input device operate as a transformer.

Figure 1C:
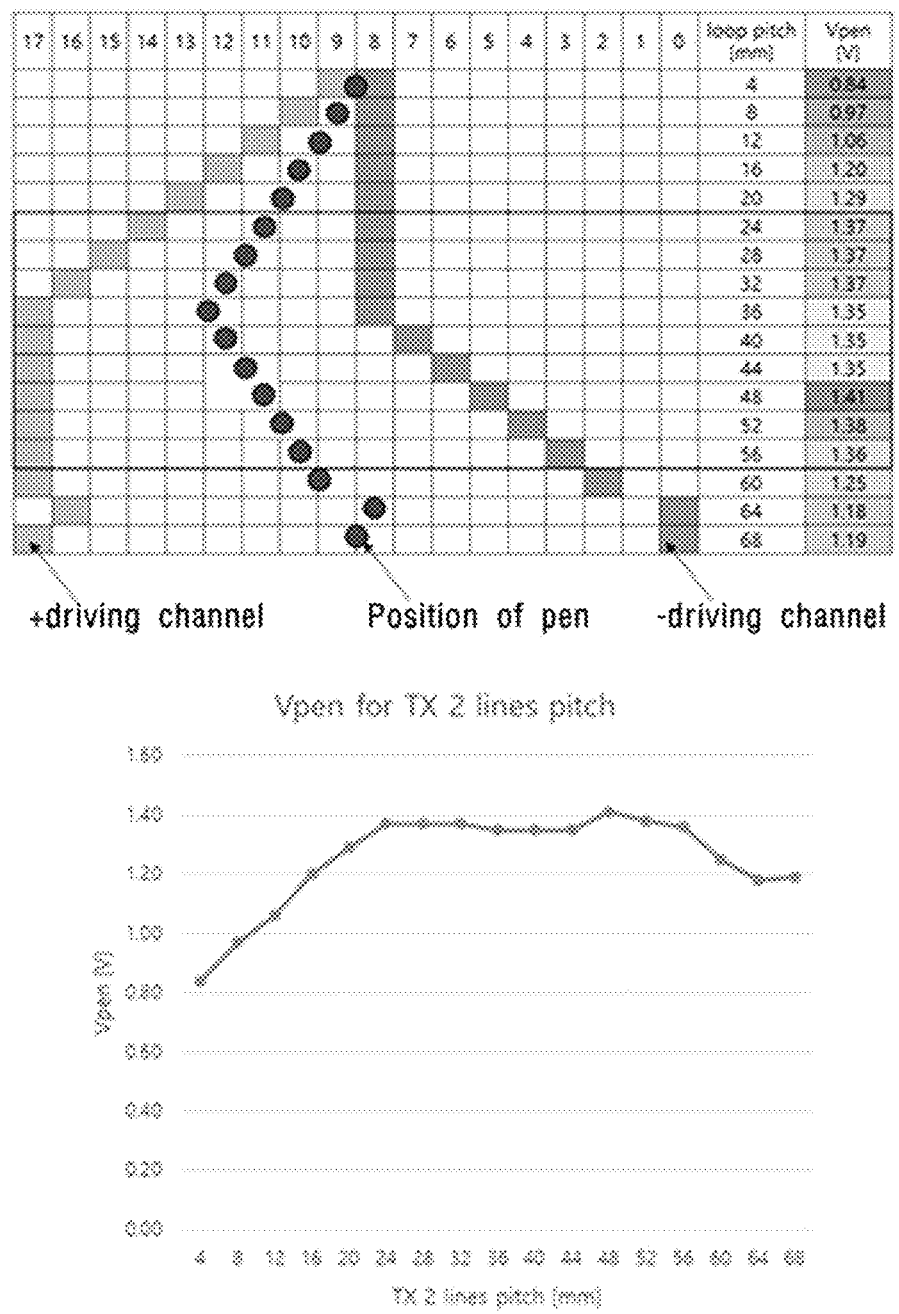
FIG. 1C is a view for explaining a gap between a +driving channel and a −driving channel in the uplink.

FIG. 1C is a view for explaining a gap between a +driving channel and a −driving channel in the uplink.

Referring to FIG. 1C, a gap between the +driving channel and the − driving channel in the uplink has an optimum gap according to a shape and a position of an inductor in the stylus pen. Referring to a general stylus pen design standard, the gap between the + driving channel and the − driving channel may be at least one channel gap (4 mm) or more.

Figure 2:
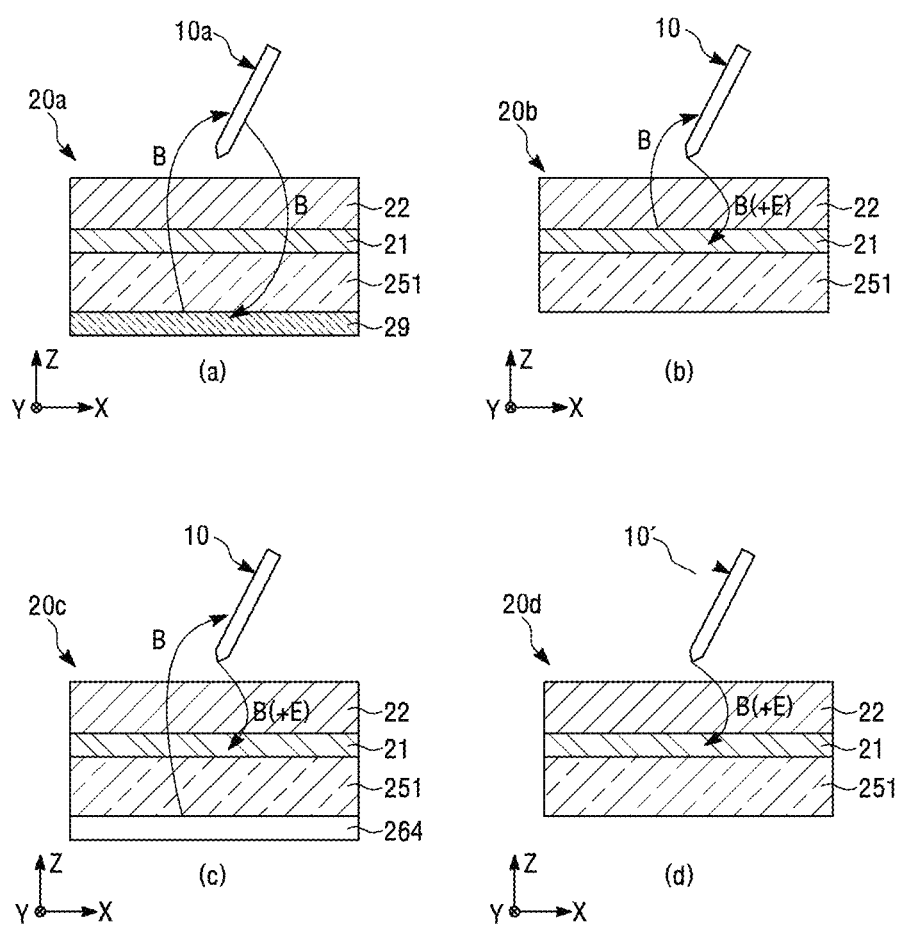
FIG. 2 is a schematic view illustrating a signal transmission operation between the stylus pen and the touch input device.

FIG. 2 is a schematic view illustrating a signal transmission operation between the stylus pen and the touch input device.

Referring to FIG. 2A, a touch screen 20a includes a digitizer 29, a display panel 251, a sensor part 21, and a window 22.

In the case of an electro-magnetic resonance (EMR) type pen among passive stylus pens, when the digitizer 29 transmits a magnetic signal B to an EMR type stylus pen 10a, a resonant circuit contained in the stylus pen 10a resonates with the magnetic signal B. Then, the digitizer 29 receives the resonated magnetic signal B from the stylus pen 10a.

The digitizer 29 may be attached to a bottom surface of the display panel 251 and include a ferrite sheet that blocks a magnetic field generated by an antenna loop and a flexible printed circuit board (FPCB) having a plurality of conductive antenna loops and an eddy current generated from other electrical elements or components when the antenna loop forms a magnetic field.

In the FPCB, the plurality of antenna loops for detecting an input position of a resonance signal are provided as a plurality of layers. One antenna loop overlaps at least one another antenna loop in a Z-axis direction. Accordingly, the FPCB has a great thickness. Thus, when using the digitizer 29, the touch input device 2 is hardly reduced in thickness and size.

When the digitizer 29 is mounted on the foldable and flexible touch input device 2, deformation may occur in the FPCB attached to an area folded when folding is generated. Repeated folding may cause stress to be applied to a wire member forming the antenna loop and resultantly cause a damage to the wire member. The ferrite sheet blocks influence of the magnetic field generated by the antenna loop on the inside of the touch input device 2. The ferrite sheet may have a great thickness, be easily deformed when the touch input device 2 is folded, and be damaged by the repeated folding.

Referring to FIG. 2B, a touch screen 20*b* includes a display panel 251, a sensor part 21, and a window 22.

In the case of a stylus pen 10 including a resonance circuit, when an electrode (or pattern) of the sensor part 21 transmits a magnetic signal B to the stylus pen, the resonance circuit contained in the stylus pen 10 resonates with the magnetic signal B. Accordingly, an electrode (or pattern) of the sensor unit 21 may receive a resonated electromagnetic signal (E and/or B) from the stylus pen 10. When the electrode (or pattern) of the sensor part 21 is made of a metal mesh having low resistance, a magnetic signal transmitted from the stylus pen 10 may be detected.

Likewise, when compared with the digitizer 29, since a touch screen 20*c* does not require an additional unit or module for transmitting a magnetic signal to the stylus pen 10, the touch screen 20*b* may be manufactured thinner with low manufacturing costs.

Referring to FIG. 2C, a touch screen 20*c* includes a loop coil 264, a display panel 251, a sensor unit 21, and a window 22.

In the case of a stylus pen 10 including a resonance circuit, when the loop coil 264 transmits a magnetic signal B to the stylus pen, the resonance circuit contained in the stylus pen 10 resonates with the magnetic signal B. Accordingly, an electrode (or pattern) of the sensor unit 21 may receive a resonated electromagnetic signal (E and/or B) from the stylus pen 10.

When compared with the digitizer 29, since the loop coil 264 does not receive a magnetic signal B for detecting a touch position, a wire structure may be simplified, and the touch screen 20*c* may be manufactured thinner. Thus, thinness and miniaturization of the touch input device 2 may be obtained. Also, since the loop coil 264 may be formed in various positions with various sizes, the touch screen 20*c* may be also applied to the foldable/flexible touch input device 2.

The loop coil 264 may include a substrate on which the antenna loop is disposed and a ferrite sheet. The antenna loop may be made of a conductive material such as copper and silver. The antenna loop may be disposed on the same layer as the sensor unit 21 in addition to the substrate. In this case, the antenna loop may be made of a conductive material having a high transmittance and a low impedance, such as a metal mesh, ITO, graphene, and a silver nanowire. Also, the antenna loop may be disposed below the window. In this case, the substrate may not be contained in the loop coil 264.

In the above, the sensor unit 21 may include a plurality of electrodes (or patterns) for detecting touch coordinates. For example, the sensor unit 21 includes a plurality of first touch electrodes for detecting touch coordinates in a first direction and a plurality of second touch electrodes for detecting touch coordinates in a second direction crossing the first direction. Although the sensor unit 21 is illustrated as one layer in FIG. 2, the first touch electrode and the second touch electrode may be disposed on different layers, may overlap each other, may not overlap each other, or may be disposed with a separate layer therebetween.

Referring to FIG. 2D, a touch screen 20*d* includes a display panel 251, a sensor unit 21, and a window 22.

In case of an active stylus pen 10' including a resonance circuit, the resonance circuit contained in the active stylus pen 10' resonates by using a power source (e.g., a battery for storing a power such as a secondary battery) and a capacitor such as EDLC (electric double layered capacitor) in the active stylus pen 10'. Then, the electrode of the sensor unit 21 may receive a resonated electromagnetic signal (E and/or B) from the stylus pen 10. When the electrode (or pattern) of the sensor part 21 is made of a metal mesh having a low resistance, a magnetic signal transmitted from the stylus pen 10' may be detected. The active stylus pen 10' may include a circuit that outputs an electromagnetic signal E and/or B having a predetermined frequency using a power source in addition to a resonance circuit to generate an electromagnetic signal. Also, the active stylus pen 10' may include all of the resonance circuit and circuits that the electromagnetic signal E and/or B having a predetermined frequency.

The touch screen 20*d* may receive an electromagnetic signal from the stylus pen 10' without transmitting a magnetic signal to the stylus pen 10'. That is, since the touch screen 20*d* does not require an additional unit or module for generating a signal for resonating the resonance circuit contained in the stylus pen 10', thinness and miniaturization of the touch screen 20*d* may be obtained, and power consumption and manufacturing costs may be reduced.

Next, a touch input device 2 according to an embodiment will be described with reference to FIG. 3.

Figure 3:
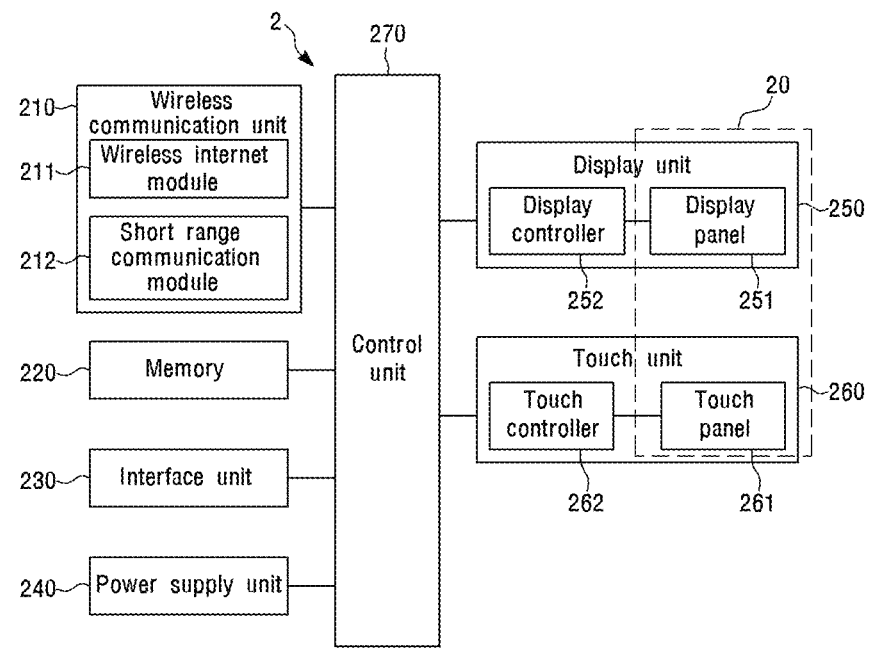
FIG. 3 is a schematic block diagram illustrating the touch input device.

FIG. 3 is a schematic block diagram illustrating a touch input device capable of interacting with a stylus pen.

As illustrated in the drawing, a touch input device 2 may include a wireless communication unit 210, a memory 220, an interface unit 230, a power supply unit 240, a display unit 250, a touch unit 260, and a control unit 270. Since components illustrated in FIG. 3 are not essential for realizing the touch input device, the touch input device described in the present disclosure may include more or less components that the above-described components.

In more detail, among the above-described components, the wireless communication unit 210 may include at least one module for allowing wireless communication between the touch input device 2 and a wireless communication system, between the touch input device 2 and another touch input device 2, or between the touch input device 2 and an external server. Also, the wireless communication unit 210 may include at least one module connecting the touch input device 2 to at least one network.

The wireless communication unit 210 may include a wireless internet module 211 and a short-range communication module 212.

The wireless Internet module 211 refers to a module for wireless internet connection and may be incorporated in the touch input device 2. The wireless internet module 211 is configured to transmit and receive a wireless signal over a communication network according to wireless internet technologies. For example, the wireless internet technologies include WLAN (Wireless LAN), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), NR (New Radio), LTE (Long Term Evolution), and LTE-A (Long Term Evolution-Advanced), and the wireless internet module 211 transmits and receives data according to at least one wireless internet technology within a scope including internet technologies that are not listed above.

The short-range communication module 212 is for short-range communication, and at least one of Bluetooth™, RFID (Radio Frequency Identification), infrared communication (Infrared Data Association; IrDA), UWB (Ultra Wideband), ZigBee, NFC (Near Field Communication), Wi-Fi, Wi-Fi Direct, or Wireless USB (Wireless Universal Serial Bus) may be used to support the short-range communication. The short-range communication module 212 may support wireless communication between the touch input device 2 and the wireless communication system, between the touch input device 2 and the wireless communication capable device, or between the touch input device 2 and a network in which an external server is disposed through wireless area networks. The short-range wireless communication network may be a short-range wireless personal area network.

Here, the wireless communication capable device may be a mobile terminal (e.g., a smart phone, a tablet PC, and a notebook) capable of (or interoperable) exchanging data with the touch input device 2 according to the present invention. The short-range communication module 212 may sense or recognize a wireless communication enabled device that is communicatable with the touch input device 2 around the touch input device 2. Further, the control unit 270 may transmit at least a portion of data processed by the touch input device 2 to the wireless communication enabled device through the short-range communication module 212 when the sensed wireless communication enabled device is a device authenticated to communicate with the touch input device 2 according to an embodiment. Thus, a user of the wireless communication enabled device may use the data processed by the touch input device 2 through the wireless communication enabled device.

Also, the memory 220 stores data supporting various functions of the touch input device 2. The memory 220 may store a plurality of application programs (or applications) executed in the touch input device 2 and data for operation of the touch input device 2, and commands.

The interface unit 230 may serve as a path to various kinds of external devices connected to the touch input device 2. The interface unit 230 may include at least one of a wired/wireless headset port, an external charger port, a wired/wireless data port, a memory card port, a port for connecting a device equipped with an identification module, an audio I/O (Input/Output) port, a video I/O port, and an earphone port.

The power supply unit 240 receives external power or internal power under the control of the control unit 270 and supplies a power to each component contained in the touch input device 2. The power supply unit 240 may include a battery, and the battery may be an internal battery or a replaceable battery.

The display unit 250 displays (or outputs) information processed in the touch input device 2. For example, the display unit 250 may display execution screen information of an application program executed in the touch input device 2, or UI (User Interface) or GUI (Graphic User Interface) information according to the execution screen information.

The display unit 250 may include an LCD display (liquid crystal display), an OLED (organic light-emitting diode) display, an electronic ink display (e-ink display), a quantum dot light-emitting display, and a micro-LED (light emitting diode) display.

The display unit 250 includes a display panel 251 for displaying an image, and a display controller 252 connected to the display panel 251 to supply signals for displaying an image to the display panel 251. For example, the display panel 251 may include a plurality of scan lines, a plurality of pixels connected to the same signal lines as a plurality of data lines, and a scan driving/receiving unit for supplying a scan signal to the scan lines, and the display controller 252 may include a data driver IC for generating a data signal to be applied to the data line, a timing controller for processing an image signal and controlling an overall operation of the display unit 250, and a power management IC.

The touch unit 260 senses a touch (or touch input) applied to a touch area by using a predetermined method, e.g., a capacitive method. For example, the touch unit 260 may be configured to convert a change in capacitance, voltage, or current generated in a specific portion into an electrical input signal. The touch unit 260 may be configured to detect a position, area, and capacitance of a touch object that applies a touch on the touch area when touched. Here, the touch object that is an object applying a touch to the touch sensor may include, e.g., a user's body portion (a finger or a palm) and a passive or active stylus pen 10.

The touch unit 260 includes a touch panel 261 including the sensor unit 21 in FIG. 2 and a touch controller 262 that transmits touch data to the control unit 270 and/or the display controller 252 by applying a driving signal to the touch panel 261 and receiving a sensing signal from the touch sensor 261.

The touch controller 262 may include a first driving/receiving unit connected to at least one of the plurality of first touch electrodes of the sensor unit 21 in FIG. 2 to apply a driving signal and receive a sensing signal; a second driving/receiving unit connected to at least one of the plurality of second touch electrodes to apply a driving signal and receive a sensing signal; and a MCU (micro control unit) that controls operations of the first driving/receiving unit and the second driving/receiving unit and obtains a touch position by using sensing signals outputted from the first and second driving/receiving units.

The touch controller 262 may be integrated with the control unit 270, which will be described later, into one IC or integrated with the display controller 252 into one IC. Alternatively, the touch controller 262 may be integrated into one IC with the display controller 252 and the control unit 270. The touch controller 262 and the control unit 270, the touch controller 262 and the display controller 252, or the touch controller 262, the display controller 252, and the control unit 270 may be integrated into one and referred to as a 'control unit'.

The display panel 251 and the touch panel 261 may form a mutual layer structure or be integrated with each other to be referred to as the touch screen 20.

The control unit 270 may control driving of the touch input device 2 and output touch coordinate information in response to a touch sensing result of the touch input device 2. Also, the control unit 270 may change a frequency of the driving signal in response to the touch sensing result.

The control unit 270 controls an overall operation of the touch input device 2 in addition to an operation related to the application program. The control unit 270 may provide or process information or functions suitable for the user by processing a signal, data, and information inputted or outputted through the above-described components or driving the application program stored in the memory 220.

Also, the control unit 270 may control at least a portion of the components described with reference to FIG. 3 to drive the application programs stored in the memory 220. Furthermore, the control unit 270 may combine and operate at least two components of the components contained in the touch input device 2 for driving of the application program.

Although the touch unit 260 is contained in the touch input device 2 together with the display unit 250 as described above, the touch input device 2 may include only the touch unit 260.

Figure 4:
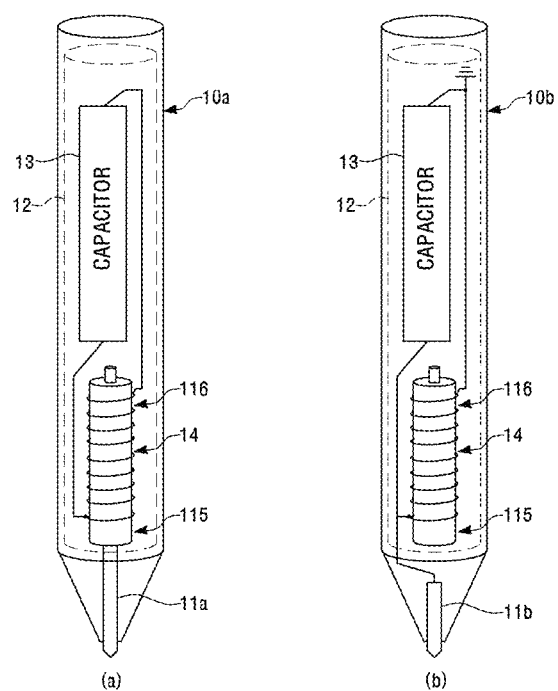
FIG. 4 is a view illustrating a stylus pen according to embodiments.

FIG. 4 is a view illustrating a stylus pen according to embodiments.

The stylus pens of FIG. 4 commonly include a resonance circuit unit 12 in a housing thereof.

The resonance circuit unit 12 that is a LC resonance circuit may resonate with the driving signal outputted from the touch screen 20 of FIGS. 2 and 3. The driving signal may include a signal (e.g., a sine wave or a square wave) having a frequency corresponding to a resonance frequency of the resonance circuit unit 12. In order to resonate, the resonance circuit unit 12 may have the same or similar resonance frequency as that of the driving signal. The resonance frequency of the stylus pen 10a and 10b is determined according to a design value of the resonance circuit unit 12 of the stylus pen 10a and 10b. When the sensor unit 21 of FIG. 2B or the loop coil 264 of FIG. 2C generates an electromagnetic field caused by a driving signal, the resonance circuit unit 12 of the stylus pen 10a and 10b resonates by using a signal received through variation of the magnetic field.

Elements of the stylus pen 10a and 10b may be accommodated in the housing. Although the housing may have a cylindrical shape, a polygonal column shape, a column shape in which at least a portion is curved, an entasis shape, a frustum of pyramid shape, and a circular truncated cone shape, the embodiment of the present invention is not limited thereto. Since the inside of the housing is empty, the elements of the stylus pen 10a and 10b such as the resonance circuit unit 12 may be accommodated in the housing. The housing may be made of a non-conductive material.

As illustrated in FIG. 4A, the EMR-type stylus pen 10a includes the resonance circuit unit 12. The resonance circuit unit 12 includes an inductor unit 14 and a capacitor unit 13. The inductor unit 14 includes a ferrite core 115 and a coil 116 wound around an outer surface of the ferrite core 115.

The EMR-type stylus pen 10a may further include a tip 11a. The tip 11a that is an end portion of the stylus pen 10a may pass through the ferrite core 115 or protrude from the ferrite core 115 as illustrated in FIG. 4A. The tip 11a may be a non-conductive tip or an electrode core made of a conductive material, e.g., a rigid resin mixed with conductive metal or conductive powder. Here, the tip 11a may not be electrically connected to the resonance circuit unit 12.

The ferrite core 115 may be, e.g., a cylindrical ferrite material. In the ferrite core 115, a through-hole which has a predetermined diameter (e.g., 1 mm) and through which the tip 11a is inserted and passes may be formed. In addition, the ferrite core 115 may have a cylindrical shape, a polygonal column shape, a column shape in which at least a portion is curved, an entasis shape, a frustum of pyramid shape, a circular truncated cone shape, a toroid shape, and a ring shape.

The coil 116 may be wound over an entire length of the ferrite core 115 in the axial direction or wound over a partial length thereof. The coil 116 is electrically connected to the capacitor unit 13.

The capacitor unit 13 may include a plurality of capacitors connected in parallel. Each of the capacitors on a printed board may have a different capacitance and be trimmed within a manufacturing process.

As illustrated in FIG. 4B, the ECR (Electrically Coupled Resonance)-type stylus pen 10b includes a conductive tip 11b and a resonance circuit unit 12. The resonance circuit unit 12 may include an inductor unit 14 and a capacitor unit 13 and be grounded. The inductor unit 14 includes a ferrite core 115 and a coil 116 wound around an outer surface of the ferrite core 115.

Although a whole or at least a portion of the conductive tip 11b may be made of a conductive material (e.g., metal, conductive rubber, conductive fabric, or conductive silicone), the embodiment of the present invention is not limited thereto.

The coil 116 may be wound over an entire length of the ferrite core 115 in the axial direction or wound over a partial length thereof. The coil 116 is electrically connected to the capacitor unit 13.

The capacitor unit 13 may include a plurality of capacitors connected in parallel. Each of the capacitors on a printed board may have a different capacitance and be trimmed within a manufacturing process.

Figure 5:
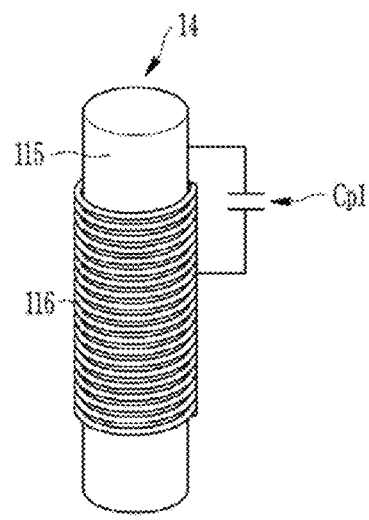
FIG. 5 is a view illustrating an inductor unit of the stylus pen in detail.

FIG. 5 is a conceptual view illustrating the inductor unit of the stylus pen in detail in FIGS. 4A and 4B.

Referring to FIG. 5, the inductor unit 14 includes a ferrite core 115 and a coil 116 wound around the ferrite core 115.

Here, an inductance of the inductor unit 14 is determined by <Equation 1> below.

$$L = \frac{\mu S N^2}{l} \quad [\text{Equation 1}]$$

As known from the <Equation 1>, an inductance L is proportional to a permeability of the ferrite core 115, a cross-sectional area of the coil 116, and the square of the number of windings and is inversely proportional to a winding length of the coil 116.

Figure 6:
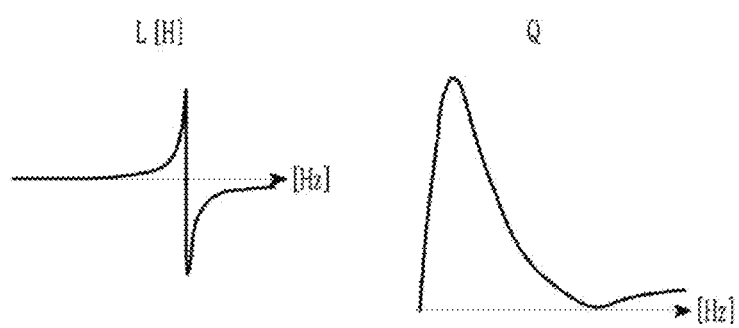
FIG. 6 is a graph representing an inductance and a Q value according to frequency variation.

A design of the inductor unit 14 in the resonance circuit unit 12 accommodated in the stylus pen illustrated in FIG. 4A and FIG. 4B is extremely important. In particular, in the design of the inductor unit 14, an inductance L and a Q value are extremely important parameters as illustrated in FIG. 6. Here, the Q value that is an amount of representing a coil characteristic as a resonance circuit element is expressed by an equation Q=2πfL/R. Here, L and R indicate an inductance and a resistance of the coil, respectively, and f indicates a frequency. As the Q value of the coil increases, sharpness of the resonance characteristic increases.

When the stylus pen illustrated in FIGS. 4A and 4B is designed, L may have a sufficiently large self-resonance frequency relative to a frequency to be used, and the Q value may have a maximum value at the frequency to be used. In order to satisfy this, a material of the ferrite core, the kind of a wire of the coil, and a winding scheme are required to be optimized. Also, a method for obtaining a high output signal while maintaining a thin diameter of the pen is required.

In embodiments below, a most optimized design method of the stylus pen in terms of materials of a plurality of ferrite cores, kinds of wires of the coil, and winding schemes will be described.

(1) Material of Ferrite Core

Manganese (Mn) and nickel (Ni) are used as a material of the ferrite core used in this embodiment.

(2) Kind of Wire

The wire of the coil used in this embodiment includes an enamel wire and a litz wire.

Figure 7:
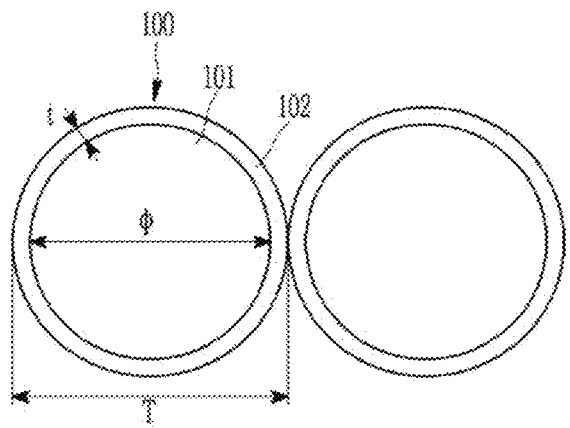
FIGS. 7 and 8 are views illustrating an enamel wire and litz wire, respectively.

As illustrated in FIG. 7, an enamel wire 100 that is a wire manufactured by coating a surface of a copper wire 101 with an insulating enamel 102 and heating the wire at a high temperature is used for windings or wirings of electrical devices, communication devices, and electrical instruments. In the embodiment, the enamel wire having a total thickness T of 0.2 mm, an wire diameter ϕ of 0.18 mm, and a coating thickness t of 0.01 mm is used.

Figure 8:
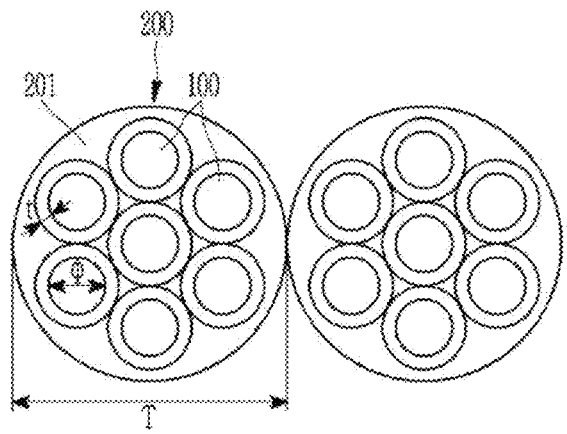

As illustrated in FIG. 8, a LITZ wire 200 is a specially insulating wire formed by twisting several thin insulating wires 100 (e.g., enamel wire) each having a diameter of about 0.1 mm into a single wire and performing insulation coating 201 on the single wire with nylon. The litz wire 200 may reduce a surface effect by increasing a surface area and be used for a coil of a high frequency circuit.

In the embodiment, the litz wire having a total thickness T of 0.2 mm, an wire diameter ϕ of 0.06 mm, and a coating thickness t of 0.007 mm is used.

(3) Winding Scheme

In the embodiment of the present invention, a winding scheme having a multilayer winding structure is used to obtain a sufficient inductance value (i.e., sufficient number of windings) in a limited space of the stylus pen. Specifically, as illustrated in FIGS. 9A and 9B, two kinds of multilayer winding schemes are used.

The winding scheme of FIG. 9A, which is a simplest winding scheme, is a sequential layer winding scheme by which a lower layer is wound and then an upper layer is wound. Here, the scheme of FIG. 9A is performed such that winding of a directly above layer starts at a point at which winding of a previous layer disposed directly below is finished. Hereinafter, this winding scheme is referred to as a U-type winding scheme.

The winding scheme of FIG. 9B that is an alternate layer winding scheme in which adjacent winding layers are alternately wound is performed such that winding of adjacent layers is inclined in a zigzag form. Hereinafter, this winding scheme is referred to as a zigzag-type winding scheme. Specifically, this winding scheme is performed such that winding of a second layer is sequentially wound on winding of a first layer and then winding of a third layer is wound between the winding of the first layer and the winding of the second layer, and winding of a fourth layer is wound on the winding of the second layer and then winding of a fifth layer is wound between the winding of the second layer and the winding of the fourth layer. The above-described zigzag winding scheme may minimize a voltage difference between the windings of adjacent layers to reduce a winding self-capacitance. Here, the winding self capacitance, which is a kind of parasitic capacitance, is a parameter representing electric field energy stored in the winding.

Comparative Experiment 1 (Comparison of Characteristic Value for Each Material)

The Q values are measured by changing the material of the ferrite core to manganese, nickel, and magnesium in a state in which the coil including the enamel wire is wound in the U-type of winding scheme.

As a result of the measurement, a difference between the characteristics of the Q values for each material of the core is insignificant, and the measured Q value is not enough to be implemented as a product.

Comparative Experiment 2 (Comparison of Characteristic Value for Each Winding Scheme)

The Q values are measured for an inductor 1 and an inductor 2, in which the enamel wire and the litz wire are respectively used as the wire of the coil, in a state in which the coil including the ferrite core made of manganese (Mn) is wound in the U-type of winding scheme.

Figure 10:
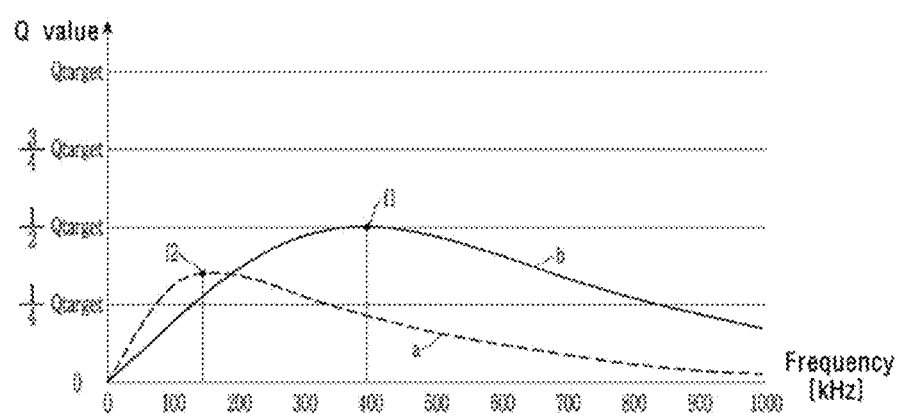
FIGS. 10 to 12 are graphs representing results of comparative experiments.

FIG. 10 is a view illustrating Q values of the inductors 1 and 2 measured while changing a frequency through an E4980A precision LCR meter manufactured by KEYSIGHT TECHNOLOGIES.

In FIG. 10, 'a' indicates a waveform showing a change of the Q value with respect to the frequency of the inductor 1 (manganese core/enamel wire/U-type winding scheme), and 'b' indicates a waveform showing a change of the Q value with respect to the frequency of the inductor 2 (manganese core/litz wire/U-type winding scheme).

The inductor 2 manufactured by using the litz wire has an almost maximum Q value at a frequency (frequency f1) of about 400 kHz, and the inductor 1 manufactured by using the enamel wire has an almost maximum Q value at a frequency (frequency f2) of about 150 kHz.

As a result of comparison between 'a' and 'b' in FIG. 10, it may be known that the maximum Q value of the inductor 2 is about 1.5 times greater than the maximum Q value of the inductor 1. Thus, it may be known that the litz wire is superior to the enamel wire as the coil of the inductor that forms the resonance circuit of the stylus pen.

However, the maximum Q value of the inductor 2 measured in the comparative experiment 2 is about ½ of a target value $Q_{target}$ required for commercialization.

Comparative Experiment 3 (Comparison of Characteristic Value for Each Winding Scheme)

The Q values are measured for inductors 3 to 5 manufactured such that the enamel wire and the litz wire are respectively used as the wires of the coils and the wires are wound in the U-type winding scheme and the zigzag-type winding scheme.

FIG. 10 is a view illustrating the Q values of the inductors 3 to 5 measured while changing a frequency through an E4980A precision LCR meter manufactured by KEYSIGHT TECHNOLOGIES.

Figure 11:
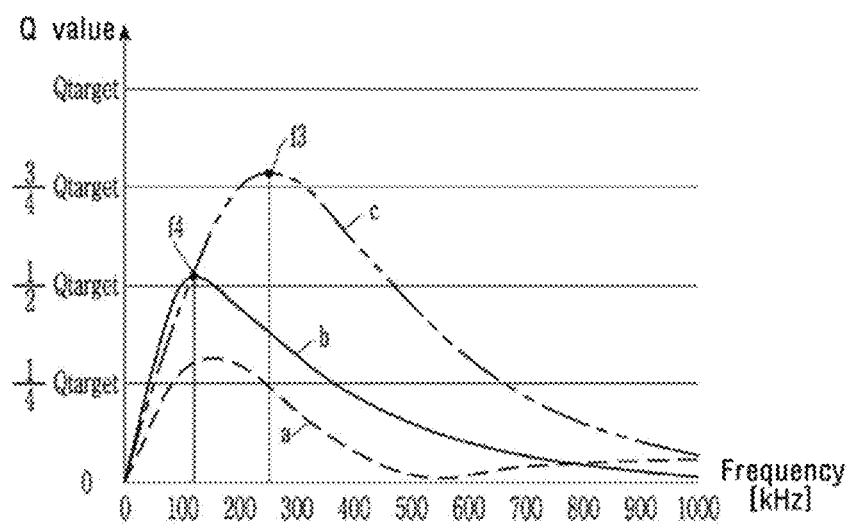

In FIG. 11, a indicates a waveform showing a change of the Q value with respect to the frequency of the inductor 3 (manganese core/enamel wire/U-type winding scheme), b indicates a waveform showing a change of the Q value with respect to the frequency of the inductor 4 (manganese core/enamel wire/zigzag-type winding scheme), and c indicates a waveform showing a change of the Q value with respect to the frequency of the inductor 5 (manganese core/litz wire/zigzag-type winding scheme).

As known from the waveform c of FIG. 11, the inductor 5 manufactured by the litz wire/zigzag-type winding scheme has an almost maximum Q value at a frequency (frequency f3) of about 300 kHz. Each of the inductor 4 manufactured by the enamel wire/zigzag-type winding scheme and the inductor 3 manufactured by the enamel wire/U-type winding scheme has an almost maximum Q value at a frequency (frequency f2) of about 150 kHz.

Also, as a result of comparison between a, b, and c of FIG. 11, it may be known that the maximum Q value of the inductor 5 is about 1.5 times greater than that of the inductor 4 and is two times or more greater than that of the inductor 3. Thus, it may be known that the zigzag-type winding scheme is superior to the U-type winding scheme in the winding scheme of the inductor that forms the resonance circuit of the stylus pen.

However, the maximum Q value of the inductor 5 (manganese core/litz wire/zigzag-type winding scheme) measured in the comparative experiment 2 is about 4 of the target value $Q_{target}$ required for commercialization.

Comparative Experiment 4 (Comparison of Characteristic Value for Each Material of Core)

In this embodiment, manganese and nickel are used as the material of the ferrite core, and it is generally known that nickel has permeability of 200 to 300 and manganese has permeability of 3000 to 5000.

Since the manganese used in this embodiment is approximately 15 times greater in permeability than nickel, assuming that the coils have the same cross-sectional area and length, the number of windings of manganese may be reduced by approximately four times from that of windings of nickel to obtain the same inductance value. Thus, in terms of the number of windings, it may be known that manganese is more effective to use than nickel.

Since the inductor unit 14 has a complicated structure including the coil wound around the core, a parasitic capacitance is additionally formed. Since the Q value decreases by the parasitic capacitance, an amplitude of a resonance signal may be reduced.

The parasitic capacitance formed in the inductor unit 14 may be formed between the wound coils or between the core and the coil. Here, as described above, the parasitic capacitance between the wound coils may be reduced by adopting the zigzag-type winding scheme.

In this embodiment, the material of the core having permittivity lower than that of manganese is tested to reduce the parasitic capacitance between the core and the coil. As a result of the test, it may be known that nickel is an optimum material for the ferrite core.

An important physical property in manganese and nickel, which are mainly used as the material of the ferrite core is permeability, which gives an important effect on the inductance value as shown in <Equation 1>. However, since the permittivity in manganese and nickel as the ferrite core element is not an important physical property, nickel substantially does not have relevant information in a data sheet provided by a manufacturer.

In this embodiment, the permittivity of manganese and nickel is measured by using the E4980A precision LCR meter of KEYSIGHT TECHNOLOGIES to check the permittivity of manganese and nickel, and measurement results are shown in table 1 below.

TABLE 1

| | Permittivity of manganese | Permittivity of nickel |
|---|---|---|
| Measurement 1 | 2400 | — |
| Measurement 2 | 8300 | 2 |

Measurement 1 and Measurement 2 are measured by using the same E4980A precision LCR meter manufactured by KEYSIGHT TECHNOLOGIES, and the Measurement 1 represents permittivity that is automatically calculated by measurement software. According to the Measurement 1, it may be known that while the permittivity of manganese is 2400, the permittivity of nickel is not measured.

The Measurement 2 is a method of calculating permittivity by measuring a capacitance, an area, and a distance between the ferrite cores, and according to Measurement 2, the permittivity of manganese is 8300 and the permittivity of nickel is 2.

It is confirmed that there is a big difference between permittivity measurement results of the Measurement 1 and the Measurement 2, and particularly the Measurement 2 shows a considerable error according to the capacitance, the area, and the distance. However, as the results of the Measurement 1 and the Measurement 2, it may be known that nickel has permittivity that is at least $\frac{1}{1000}$ less than that of manganese.

In the comparative experiment 4, the Q values are measured for inductors 6 and 7 manufactured by changing the winding type into the U-type and the zigzag-type in a state in which the material of the ferrite core is nickel, and the kind of the wire is the litz wire.

Figure 12:
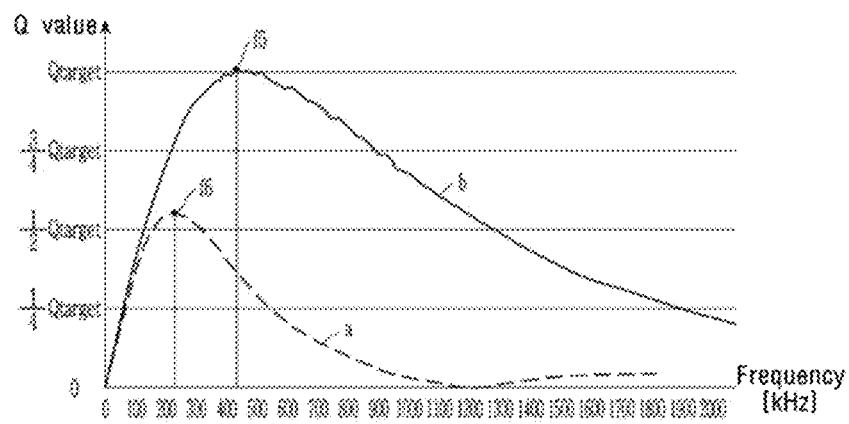

FIG. 12 is a view illustrating Q values of the inductors 6 and 7 measured while changing a frequency through an E4980A precision LCR meter manufactured by KEYSIGHT TECHNOLOGIES.

In FIG. 12, a indicates a waveform showing a change of the Q value with respect to the frequency of the inductor 6 (nickel core/litz wire/U-type winding scheme), and b indicates a waveform showing a change of the Q value with respect to the frequency of the inductor 7 (nickel core/litz wire/zigzag-type winding scheme).

As known from the waveform b of FIG. 12, the inductor 7 manufactured by the nickel core/litz wire/zigzag-type winding scheme has an almost maximum Q value at a frequency (frequency f5) of about 400 kHz. The inductor 7 manufactured by the nickel core/litz wire/U-type winding scheme has an almost maximum Q value at a frequency (frequency f6) of about 200 kHz. As a result of comparison between a and b in FIG. 11, it may be known that the maximum Q value of the inductor 7 is about two times greater than that of the inductor 6.

The maximum Q value of the inductor 7 (nickel core/litz wire/zigzag-type winding scheme) measured in the comparative experiment 4 almost reaches a target value Q target required for commercialization.

In the comparative experiments 1 to 4 described above, the Q values are tested by manufacturing the inductors while changing a combination of the material of the ferrite core, the kind of the wire of the coil, and the winding scheme, and the test results show that the highest Q value is obtained when the inductor unit of the capacitive resonance stylus pen is designed by using the nickel core, the litz wire, and the zigzag-type winding scheme. Also, it may be known that the maximum Q value of the inductor manufactured by the above-described combination reaches the target value $Q_{target}$ for commercialization.

Although the experiment is performed by using the nickel core as the ferrite core and the litz wire as the wire of the core in this embodiment, similar results may be obtained when a material with permittivity of 1000 or less is used as the ferrite core instead of the nickel core, and a wire in which a single wire surrounds two or more insulating strands is used instead of the litz wire.

Hereinafter, a reason why an output voltage Vout of CVA (Capacitor Voltage Amplitude) varies according to a position of the stylus pen on the touch screen will be described before the touch input device in the pen and touch input system according to an embodiment of the present invention is described in detail.

Figure 13:
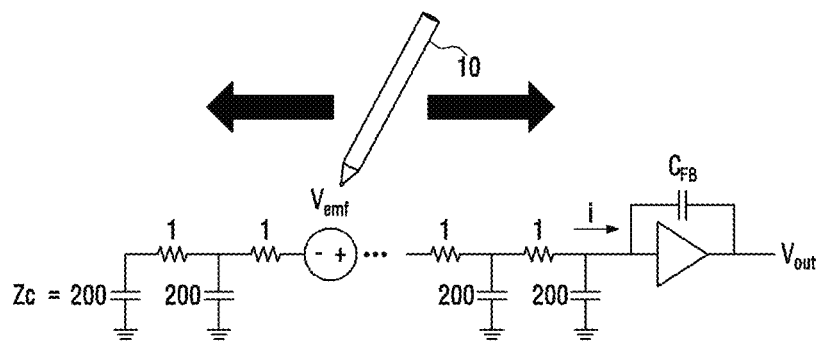
FIG. 13 is a schematic view for explaining that the output voltage Vout of a capacitor voltage amplitude (CVA) varies according to a position of the stylus pen 10 on a typical flexible display panel.

FIG. 13 is a schematic view for explaining that the output voltage (Vout) of CVA (Capacitor Voltage Amplitude) varies according to a position of the stylus pen 10 on a typical touch screen.

Referring to FIG. 13, a reason why an output of the CVA is different depending on the position of the stylus pen 10 on the touch screen is that impedance ratios of both sides with respect to the stylus pen 10 on a sensing line are different.

Based on a major axis of the typical touch screen, a resistance R of a metal mesh touch sensor is approximately 1.2 k ohm, and the capacitor C is approximately 250 pF.

Based on ten distributed models, at a driving frequency of 300 kHz, an impedance of the capacitor is approximately 200 times (120 ohm vs. $1/(2\pi*300$ k$*25$ pF)$=21$ k ohm) greater than a resistance thereof. Therefore, the capacitor is a main factor.

Figure 14:
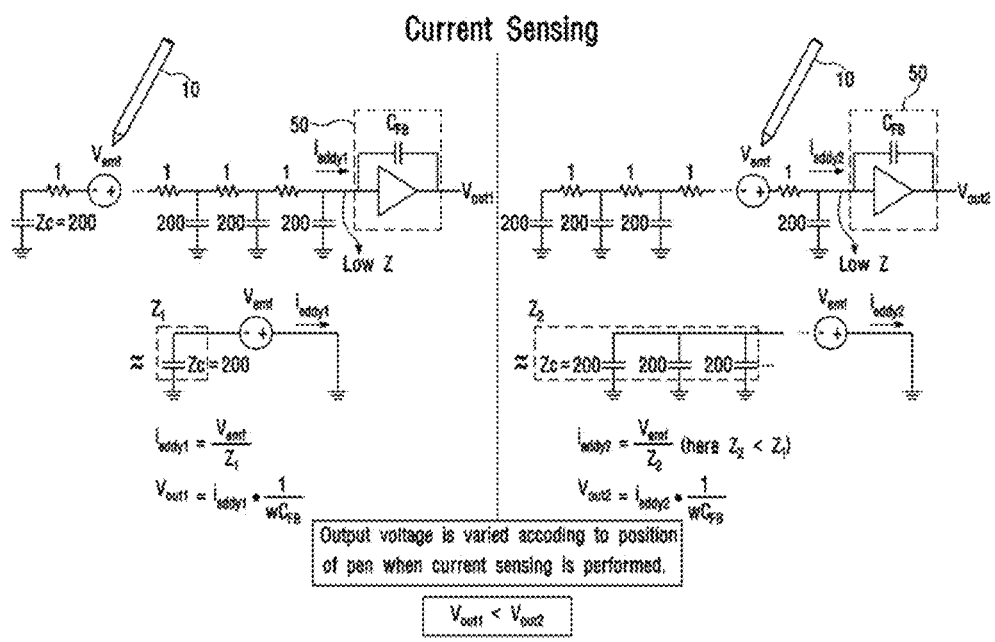
FIG. 14 is a view for explaining that output voltages Vout1 and Vout2 of the CVA are different according to the position of the stylus pen 10 in FIG. 13 through current sensing.
Figure 15:
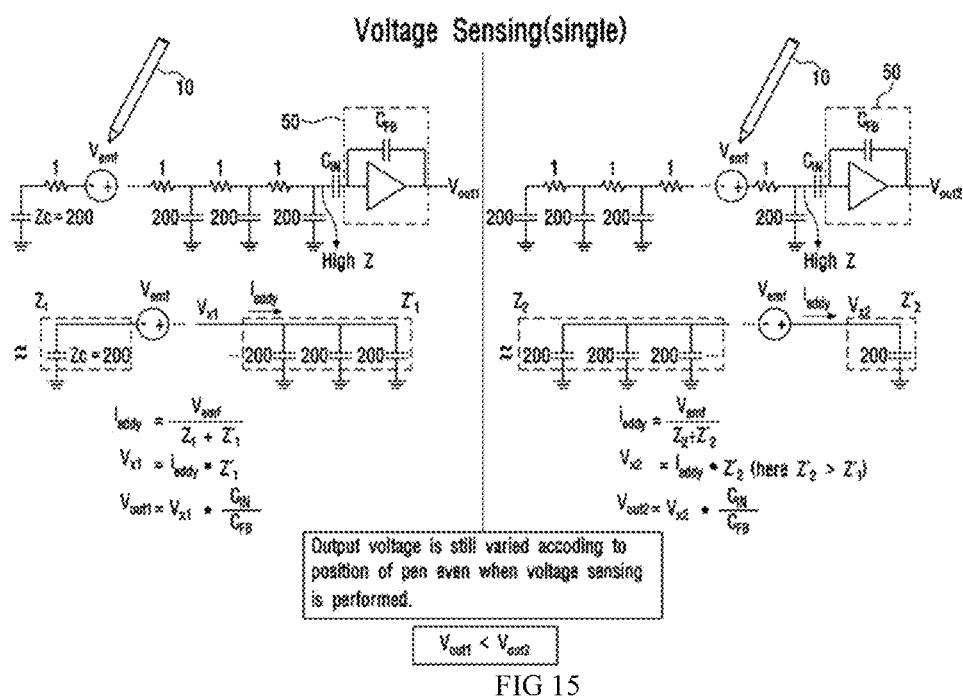
FIG. 15 is a view for explaining that the output voltages Vout1 and Vout2 of the CVA are different according to the position of the stylus pen 10 in FIG. 13 through voltage sensing.

FIG. 14 is a view for explaining that output voltages Vout1 and Vout2 of the CVA are different according to the position of the stylus pen 10 in FIG. 13 through current sensing, and FIG. 15 is a view for explaining that the output voltages Vout1 and Vout2 of the CVA are different according to the position of the stylus pen 10 in FIG. 13 through voltage sensing.

Referring to FIGS. 14 and 15, the output voltage of the CVA is different according to the position of the stylus pen 10 on the sensing line. That is, the output voltage of the CVA increases as the stylus pen 10 moves toward the sensing circuit unit 50 and decreases as the stylus pen 10 moves away from the sensing circuit unit 50.

Hereinafter, a touch input device according to various embodiments of the present invention will be described in detail with the accompanying drawings.

Figure 16:
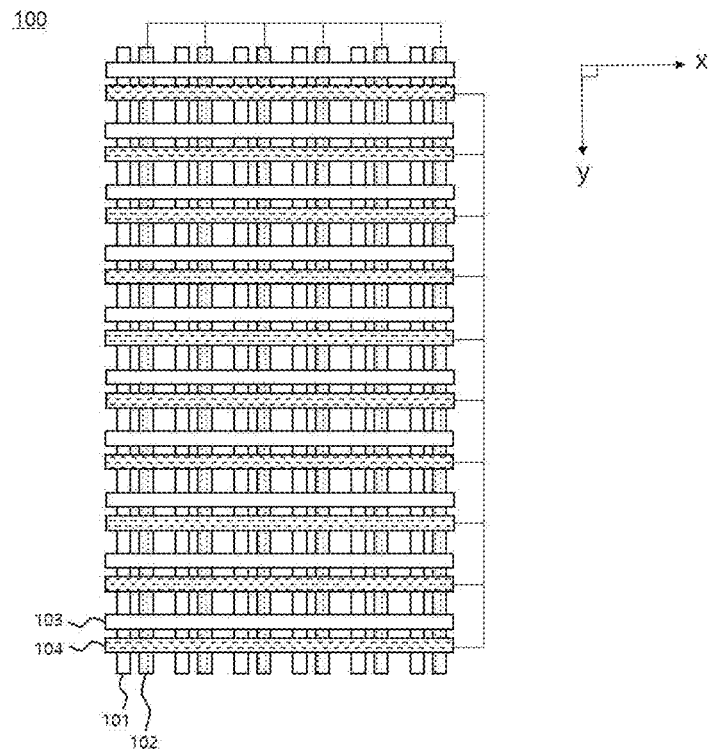
FIG. 16 is a schematic configuration view illustrating a sensor unit 100 according to a first embodiment of the present invention.

FIG. 16 is a schematic configuration view illustrating the sensor unit 100 according to a first embodiment of the present invention.

The touch input device according to the first embodiment of the present invention may be a portrait-type touch input device. In this portrait type touch input device, a width is smaller than a height, and a control unit (not shown) for controlling the sensor unit 100 may be disposed below the sensor unit 100. For example, the touch input device corresponds to a shape of a smartphone.

The sensor unit 100 may detect a position of an object such as a finger positioned on the screen, drive the stylus pen 10 in FIG. 1A, and detect a position of the stylus pen on the screen by detecting a signal (stylus pen signal) emitted from the stylus pen.

The sensor unit 100 includes a plurality of patterns (or a plurality of electrodes).

The sensor unit 100 may include a plurality of first to fourth patterns 101, 102, 103, and 104.

A first pattern 101 has a shape extending in an arbitrary first direction y. The first direction may be a major axis direction of the screen of the touch input device. The first pattern 101 may also be referred to as Active TX (ATX). The first pattern 101 has a predetermined shape in which an electrical path is formed along the arbitrary first direction y.

A second pattern 102 has a shape extending in the first direction y, is disposed adjacent to the first pattern 101, and is spaced a predetermined distance from the first pattern 101. The second pattern 102 may also be referred to as Dummy TX (DTX). The second pattern 102 may be disposed adjacent to the first pattern 101 and have a predetermined shape in which an electrical path is formed along the arbitrary first direction y.

The third pattern 103 has a shape extending in a second direction x different from the first direction. The second direction x may be a direction perpendicular to the first direction y, and may be a minor axis direction of the screen of the touch input device. The third pattern 103 may also be referred to as Active RX (ARX). The third pattern 103 has a predetermined shape in which an electrical path is formed along the arbitrary second direction x.

A fourth pattern 104 has a shape extending in the second direction x, is disposed adjacent to the third pattern 103, and is spaced a predetermined distance from the third pattern 103. The fourth pattern 104 may also be referred to as Dummy RX (DRX). The fourth pattern 104 may be disposed adjacent to the first pattern 103 and have a predetermined shape in which an electrical path is formed along the arbitrary second direction x.

The third and fourth patterns 103 and 104 are disposed on the first and second patterns 101 and 102 and are spaced a predetermined distance from the first and second patterns 101 and 102. The sensor unit in which the first to fourth patterns are disposed on the same layer will be described in detail with reference to FIG. 27.

A plurality of first patterns 101 are arranged in the second direction x, and a plurality of second patterns 102 are also arranged in the second direction x. A plurality of third patterns 103 are arranged in the first direction y, and a plurality of fourth patterns 104 are also arranged in the first direction y.

Since the first pattern 101 extends in the first direction y, the third pattern 103 extends in the second direction x, and the first direction y is longer than the second direction x, the number of the first plurality of patterns 101 is less than the number of the third plurality of patterns 103. Thus, the number of channels of the plurality of first patterns 101 is less than that of channels of the plurality of third patterns 103.

Here, the number of the plurality of first patterns 101 and the number of the plurality of third patterns 103 may increase or decrease according to a size of the screen of the touch input device.

The number of the plurality of second patterns 102 may be equal to that of the plurality of first patterns 101 in a one-to-one correspondence manner. The other ends (or second ends) of the plurality of second patterns 102 are electrically connected to each other through a conductive pattern. Here, the conductive pattern may be a metal mesh or a silver trace.

Figure 17:
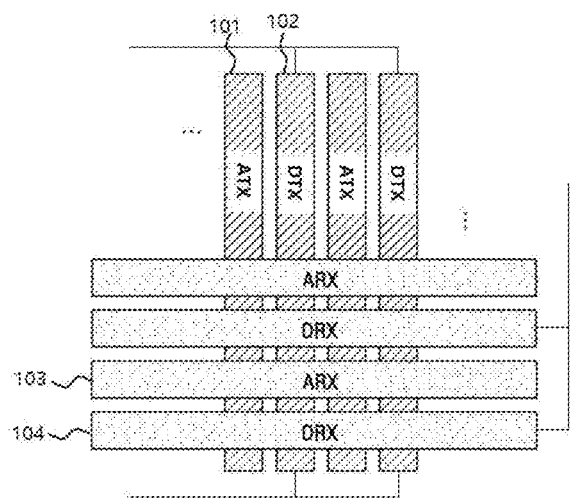
FIG. 17 is a schematic configuration view illustrating an example of the sensor unit 100 in FIG. 16.

One ends (or first ends) of the plurality of second patterns 102 may be electrically connected to a control unit (not shown). Here, as illustrated in FIG. 17, one ends of two or more second patterns 102 among the plurality of second patterns 102 may be electrically connected to each other through a conductive pattern. Due to this configuration, the number of channels of the plurality of second patterns 102 may be reduced to a half of the number of the channels of the plurality of first patterns 101. Here, two or more second patterns 102 among the plurality of second patterns 102 may be adjacent to each other.

Figure 18:
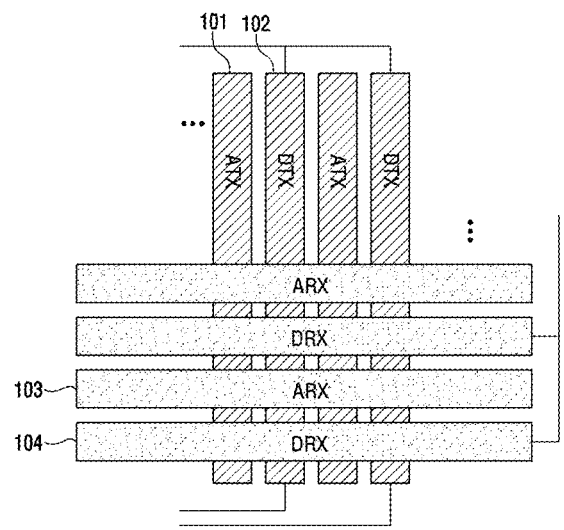
FIG. 18 is a schematic configuration view illustrating another example of the sensor unit 100 in FIG. 16.

As illustrated in FIG. 18, each of the one ends of the plurality of second patterns 102 may be individually connected to one conductive pattern.

Referring to FIG. 16 again, since the plurality of third patterns 103 are arranged in the first direction y, the number of the plurality of third patterns 103 is greater than that of the plurality of first patterns 101. Thus, the number of the channels of the plurality of third patterns 103 is greater than that of the channels of the plurality of first patterns 101.

The number of the plurality of fourth patterns 104 may be equal to that of the plurality of third patterns 103 in a one-to-one correspondence manner. The other ends (or second ends) of the plurality of fourth patterns 104 are electrically connected to each other through a conductive pattern.

In the sensor unit 100 of the touch input device in FIG. 16, the plurality of first patterns 101 and the plurality of third patterns 103 basically sense a touch of an object such as a finger. To this end, the plurality of first patterns 101 operate as touch driving electrodes (TX electrodes) to which a touch driving signal is applied, and the plurality of third patterns 103 operate as touch sensing electrodes (RX electrodes or touch receiving electrodes) to which a touch sensing signal is received, and vice versa.

Various combinations of the plurality of first to fourth patterns 101, 102, 103, and 104 may be used so that the sensor unit 100 of the touch input device shown in FIG. 16 drives and senses the stylus pen. The various combinations are shown in <Table 2> below. In <Table 2> below, '1' refers to the plurality of first patterns 101, '2' refers to the plurality of second patterns 102, '3' refers to the plurality of third patterns 103, and '4' refers to the plurality of fourth patterns 104.

plurality of second patterns 102, and a Y-axis driving may be performed by one of the plurality of third patterns 103 and the plurality of fourth patterns 104. The driving of the stylus pen may be performed by either the X-axis driving or the Y-axis driving or by both the X-axis driving and the Y-axis driving.

At least one or two of the plurality of first to fourth patterns 101, 102, 103, and 104 may operate as a sensing electrode for sensing a stylus pen signal emitted from the stylus pen. Since both X-axis sensing and Y-axis sensing are required to sense the stylus pen signal, two patterns of the plurality of first to fourth patterns 101, 102, 103, and 104 are used. An X-axis sensing may be performed by one of the plurality of first patterns 101 and the plurality of second

TABLE 2

| No. | Finger Touch Operation Driving Tx | Finger Touch Operation Sensing Rx | Stylus Operation Driving Major axis | Stylus Operation Driving Minor axis | Stylus Operation Sensing X-axis | Stylus Operation Sensing Y-axis | uplink signal magnitude Major axis | uplink signal magnitude Minor axis | downlink signal magnitude X-axis | downlink signal magnitude Y-axis | Stylus additional channel Driving | Stylus additional channel Sensing |
|---|---|---|---|---|---|---|---|---|---|---|---|---|
| 1  | 1 | 3 | 2 |   | 1 | 3 | Small |       | Small | Small | Yes | No  |
| 2  | 1 | 3 | 2 |   | 1 | 4 | Large |       | Small | Large | Yes | Yes |
| 3  | 1 | 3 | 2 |   | 2 | 3 | Large |       | Large | Small | Yes | Yes |
| 4  | 1 | 3 | 2 |   | 2 | 4 | Large |       | Large | Large | Yes | Yes |
| 5  | 1 | 3 |   | 4 | 1 | 3 |       | Large | Small | Small | Yes | No  |
| 6  | 1 | 3 |   | 4 | 1 | 4 |       | Large | Small | Large | Yes | Yes |
| 7  | 1 | 3 |   | 4 | 2 | 3 |       | Large | Large | Small | Yes | Yes |
| 8  | 1 | 3 |   | 4 | 2 | 4 |       | Large | Large | Large | Yes | Yes |
| 9  | 1 | 3 | 2 | 4 | 1 | 3 | Large | Large | Small | Small | Yes | No  |
| 10 | 1 | 3 | 2 | 4 | 1 | 4 | Large | Large | Small | Large | Yes | Yes |
| 11 | 1 | 3 | 2 | 4 | 2 | 3 | Large | Large | Large | Small | Yes | Yes |
| 12 | 1 | 3 | 2 | 4 | 2 | 4 | Large | Large | Large | Large | Yes | Yes |
| 13 | 1 | 3 | 1 |   | 1 | 3 | Small |       | Small | Small | No  | No  |
| 14 | 1 | 3 | 1 |   | 1 | 4 | Small |       | Small | Large | No  | Yes |
| 15 | 1 | 3 | 1 |   | 2 | 3 | Small |       | Large | Small | No  | Yes |
| 16 | 1 | 3 | 1 |   | 2 | 4 | Small |       | Large | Large | No  | Yes |
| 17 | 1 | 3 |   | 3 | 1 | 3 |       | Small | Small | Small | No  | No  |
| 18 | 1 | 3 |   | 3 | 1 | 4 |       | Small | Small | Large | No  | Yes |
| 19 | 1 | 3 |   | 3 | 2 | 3 |       | Small | Large | Small | No  | Yes |
| 20 | 1 | 3 |   | 3 | 2 | 4 |       | Small | Large | Large | No  | Yes |
| 21 | 1 | 3 | 1 | 3 | 1 | 3 | Small | Small | Small | Small | No  | No  |
| 22 | 1 | 3 | 1 | 3 | 1 | 4 | Small | Small | Small | Large | No  | Yes |
| 23 | 1 | 3 | 1 | 3 | 2 | 3 | Small | Small | Large | Small | No  | Yes |
| 24 | 1 | 3 | 1 | 3 | 2 | 4 | Small | Small | Large | Large | No  | Yes |
| 25 | 1 | 3 | 2 | 3 | 1 | 3 | Large | Small | Small | Small | Yes | No  |
| 26 | 1 | 3 | 2 | 3 | 1 | 4 | Large | Small | Small | Large | Yes | Yes |
| 27 | 1 | 3 | 2 | 3 | 2 | 3 | Large | Small | Large | Small | Yes | Yes |
| 28 | 1 | 3 | 2 | 3 | 2 | 4 | Large | Small | Large | Large | Yes | Yes |
| 29 | 1 | 3 | 1 | 4 | 1 | 3 | Small | Large | Small | Small | Yes | No  |
| 30 | 1 | 3 | 1 | 4 | 1 | 4 | Small | Large | Small | Large | Yes | Yes |
| 31 | 1 | 3 | 1 | 4 | 2 | 3 | Small | Large | Large | Small | Yes | Yes |
| 32 | 1 | 3 | 1 | 4 | 2 | 4 | Small | Large | Large | Large | Yes | Yes |

Referring to the <Table 2> above, in various combinations No. 1 to No. 32, the plurality of first patterns 101 and the plurality of third patterns 103 are used for sensing a touch of an object such as a finger. Specifically, the plurality of first patterns 101 operate as touch driving electrodes, and the plurality of third patterns 103 operate as touch receiving electrodes by the control, and vice versa.

At least one or two of the plurality of first to fourth patterns 101, 102, 103, and 104 may operate as a stylus driving electrode for driving the stylus pen. At least One or two of the plurality of first to fourth patterns 101, 102, 103, and 104 may be used to form a current loop for driving the stylus pen. For example, an X-axis driving may be performed by one of the plurality of first patterns 101 and the patterns 102, and a Y-axis sensing may be performed by one of the plurality of third patterns 103 and the plurality of fourth patterns 104.

In the <Table 2> above, the 'uplink signal magnitude' represents a magnitude of a driving signal for driving the stylus pen 10 of FIG. 1A. When the same stylus pen driving signal is applied to each of the plurality of first patterns 101 and the plurality of second patterns 102, and magnitudes of signals received by the stylus pen are compared, the uplink signal is relatively greater when the stylus pen driving signal is applied to the plurality of second patterns 102 than when the stylus pen driving signal is applied to the plurality of first patterns 101.

This is because the other ends (or second ends) of the plurality of first patterns 101 are not electrically connected not to form a current loop while the other ends (or the second end) of the plurality of second patterns 102 are electrically connected to form at least one current loop when two or more second patterns to which the stylus pen driving signal is applied are properly selected. When current flows through each first pattern 101, since RC of each first pattern 101 is charged, the current may not flow smoothly from one end (or the first end) to the other end (or the second end) of each first pattern 101. Also, a stylus pen driving signal applied through the plurality of first patterns 101 is transmitted to the plurality of second patterns 101 in which the current loop is formed through the capacitive coupling. Here, signal attenuation occurs by the capacitive coupling.

Likewise, the uplink signal is relatively greater when the stylus pen driving signal is applied to the plurality of fourth patterns 104 than when the stylus pen driving signal is applied to the plurality of third patterns 103.

In the <Table 2> above, the 'downlink signal magnitude' represents a magnitude of stylus pen signal received from the stylus pen 10 of FIG. 1A. When the same stylus pen driving signal is received by each of the plurality of first patterns 101 and the plurality of second patterns 102, and magnitudes of the signals are compared, the downlink signal is relatively greater when the stylus pen driving signal is received by the plurality of second patterns 102 than when the stylus pen driving signal is received by the plurality of first patterns 101.

This is because, although the other ends (the second end) of the plurality of second patterns 102 are electrically connected to form a current loop, the other ends (the first end) of the plurality of first patterns 101 are not electrically connected to each other, particularly, the stylus pen signal is transmitted to the plurality of first patterns 101 from the plurality of second patterns 101 in which the current loop is formed through the capacitive coupling, and thus attenuation of the downlink signal occurs.

Likewise, the downlink signal is relatively greater when the stylus pen signal is received through the plurality of fourth patterns 104 than when the stylus pen signal is received through the plurality of third patterns 103.

In the <Table 2> above, the 'stylus additional channel' represents whether an additional channel is necessary for the stylus pen in addition to the touch sensing. When the plurality of second patterns 102 and/or the plurality of fourth patterns 104 are used for driving or sensing the stylus pen, an additional channel is required (marked by 'Yes' in the <Table 2>). Also, when the plurality of first patterns 101 and/or the plurality of third patterns 103 for touch sensing are used for driving or sensing the stylus pen, an additional channel is not required (marked by 'No' in the <Table 2>).

Hereinafter, some examples of the various combinations No. 1 to. 32 of the <Table 2> above will be described in detail below. Here, combinations not described will be sufficiently understood by a person skilled in the art through the following detailed description.

In case of No. 1, the plurality of first patterns 101 are used as a touch driving electrode for sensing a touch of an object and a stylus sensing electrode for sensing a stylus pen signal. The plurality of second patterns 102 are used as a stylus driving electrode for driving the stylus pen. The plurality of third patterns 103 are used as the stylus sensing electrode for sensing the stylus pen signal as well as the touch sensing electrode for sensing the touch of the object. Also, the plurality of fourth patterns 104 are electrically floated. Here, the feature of being electrically floated may represent that only the other ends (second ends) of the plurality of fourth patterns 104 are electrically connected to each other, and one end (first ends) of the plurality of fourth patterns 104 are not connected to each other.

In case of No. 1, since the plurality of second patterns 102 are used as the stylus driving electrode, the uplink signal has a relatively large magnitude. Since the plurality of first patterns 101 and the plurality of third patterns 103 are used as the stylus sensing electrode, the downlink signal has a relatively small magnitude. Also, since the plurality of second patterns 102 are separately used as the stylus driving electrode, an additional channel for driving the stylus pen is required, but an additional channel for sensing the stylus pen is not required.

In case of No. 4, the plurality of first patterns 101 are used as the touch driving electrode for sensing the touch of the object. The plurality of second patterns 102 are used as the stylus sensing electrode for sensing the stylus pen signal as well as the stylus driving electrode for driving the stylus pen. The plurality of third patterns 103 are used as the touch sensing electrode for sensing the touch of the object. The plurality of fourth patterns 104 are used as the stylus sensing electrode for sensing the stylus pen signal.

In case of No. 4, since the plurality of second patterns 102 are used as the stylus driving electrode, the uplink signal has a relatively large magnitude. The plurality of second patterns 102 and the plurality of fourth patterns 104 are used as the stylus sensing electrode, the downlink signal has a relatively large magnitude. Also, since the plurality of second patterns 102 are separately used as the stylus sensing electrode and the stylus sensing electrode, and the plurality of fourth patterns 104 are separately used as the stylus sensing electrode, a separate additional channel is required for driving and sensing the stylus pen.

In case of No. 8, the plurality of first patterns 101 are used as the touch driving electrode for sensing the touch of the object. The plurality of second patterns 102 are used as the stylus sensing electrode for sensing the stylus pen signal. The plurality of third patterns 103 are used as the touch sensing electrode for sensing the touch of the object. Also, the plurality of fourth patterns 104 are used as the stylus sensing electrode for sensing the stylus pen signal as well as the stylus driving electrode for driving the stylus pen.

In the case of No. 8, since the plurality of fourth patterns 104 are used as the stylus driving electrode, the uplink signal has a relatively large magnitude. The plurality of second patterns 102 and the plurality of fourth patterns 104 are used as the stylus sensing electrode, the downlink signal has a relatively large magnitude. Also, since the plurality of second patterns 102 are separately used as the stylus sensing electrode, and the plurality of fourth patterns 104 are separately used as the stylus driving electrode and the stylus sensing electrode, a separate additional channel is required for driving and sensing the stylus pen.

In case of No. 12, the plurality of first patterns 101 are used as the touch driving electrode for sensing the touch of the object. The plurality of second patterns 102 are used as the stylus sensing electrode for sensing the stylus pen signal as well as the stylus driving electrode for driving the stylus pen. The plurality of third patterns 103 are used as the touch sensing electrode for sensing the touch of the object. Also, the plurality of fourth patterns 104 are used as the stylus sensing electrode for sensing the stylus pen signal as well as the stylus driving electrode for driving the stylus pen.

In case of No. 12, since the plurality of second and fourth patterns 102 and 104 are used as the stylus driving electrode, the uplink signal has a relatively large magnitude. The plurality of second patterns 102 and the plurality of fourth patterns 104 are used as the stylus sensing electrode, the downlink signal has a relatively large magnitude. Also, since the plurality of second patterns 102 are separately used as the stylus driving electrode and the stylus sensing electrode, and the plurality of fourth patterns 104 are separately used as the stylus driving electrode and the stylus sensing electrode, a separate additional channel is required for driving and sensing the stylus pen.

In case of No. 13, the plurality of first patterns 101 are used as the touch driving electrode for sensing the touch of an object, the stylus driving electrode for driving the stylus pen, and the stylus sensing electrode for sensing the stylus pen signal. The plurality of third patterns 103 are used as the stylus sensing electrode for sensing the stylus pen signal as well as the touch sensing electrode for sensing the touch of the object. Also, the plurality of second and fourth patterns 102 and 104 are electrically floated.

In case of No. 13, since the plurality of first patterns 101 are used as the stylus driving electrode, the uplink signal has a relatively large magnitude. Since the plurality of first patterns 101 and the plurality of third patterns 103 are used as the stylus sensing electrode, the downlink signal has a relatively small magnitude. Also, since the plurality of first patterns 101 are used as the stylus driving electrode and the stylus sensing electrode, and the plurality of fourth patterns 103 are used as the stylus sensing electrode, a separate additional channel is not required for driving and sensing the stylus pen.

In case of No. 17, the plurality of first patterns 101 are used as the touch driving electrode for sensing the touch of the object and a stylus sensing electrode for sensing the stylus pen signal. The plurality of third patterns 103 are used as the touch sensing electrode for sensing the touch of the object, the stylus driving electrode for driving the stylus pen, and the stylus sensing electrode for sensing the stylus pen signal. Also, the plurality of second and fourth patterns 102 and 104 are electrically floated.

In the case of No. 17, since the plurality of fourth patterns 104 are used as the stylus driving electrode, the uplink signal has a relatively small magnitude. Since the plurality of first patterns 101 and the plurality of third patterns 103 are used as the stylus sensing electrode, the downlink signal has a relatively small magnitude. Also, since the plurality of second patterns 102 are separately used as the stylus sensing electrode, and the plurality of fourth patterns 103 are used as the stylus driving electrode and the stylus sensing electrode, a separate additional channel is not required for driving and sensing the stylus pen.

In case of No. 21, the plurality of first patterns 101 are used as the touch driving electrode for sensing the touch of an object, the stylus driving electrode for driving the stylus pen, and the stylus sensing electrode for sensing the stylus pen signal. The plurality of third patterns 103 are used as the touch sensing electrode for sensing the touch of the object, the stylus driving electrode for driving the stylus pen, and the stylus sensing electrode for sensing the stylus pen signal. Also, the plurality of second and fourth patterns 102 and 104 are electrically floated.

In case of No. 21, since the plurality of first and third patterns 101 and 103 are used as the stylus driving electrode, the uplink signal has a relatively small magnitude. Since the plurality of first patterns 101 and the plurality of third patterns 103 are used as the stylus sensing electrode, the downlink signal has a relatively small magnitude. Also, since the plurality of second patterns 102 are used as the stylus driving electrode and the stylus sensing electrode, and the plurality of third patterns 103 are used as the stylus driving electrode and the stylus sensing electrode, a separate additional channel is not required for driving and sensing the stylus pen.

Among the various combinations No. 1 to No. 32 in the <Table 2> above, in Nos. 1, 5, 9, 25, and 29, driving is 'Yes' and sensing is 'No' in a column of 'Stylus additional channel'. The Nos. 1, 5, 9, 25, and 29 use the plurality of first and third patterns 101 and 103 for sensing the stylus pen and the plurality of second and/or fourth patterns 102 and 104 for driving the stylus pen. When the stylus pen is driven, since formation of a magnetic field for resonating the stylus pen may be somewhat difficult although the plurality of second and/or fourth patterns 102 and 104 are used, as illustrated in FIG. 17 two or more adjacent one ends (the first end) of the second patterns may be electrically connected to each other. Likewise, two or more adjacent one ends (the first end) of the fourth patterns may be electrically connected to each other. This configuration has an advantage of reducing the additional channel for driving the stylus pen.

The control unit (not shown) or the controller (not shown) controls the sensor unit 100 The controller (not shown) may be electrically connected to the sensor unit 100 and control an operation of the sensor unit 100. The controller (not shown) and the sensor unit 100 may be electrically connected to each other through a conductive trace.

Here, although the controller (not shown) is the touch controller 262 illustrated in FIG. 3, the embodiment of the present invention is not limited thereto. The controller (not shown) may be obtained by: integrating the touch controller 262 and the display controller 252 in FIG. 3; integrating the touch controller 262 and the control unit 270 in FIG. 3; or integrating the touch controller 262, the display controller 252, and the control unit 270 in FIG. 3. Alternatively, the controller (not shown) may be a separate controller contained in the sensor unit 100. Thus, the controller (not shown) according to the present invention is not limited to the touch controller 262 or the control unit 270 in FIG. 3, and a component capable of controlling a sensor unit according to following embodiments in addition to the sensor unit 100 may be referred to as a 'controller'.

Specifically, as shown in No. 1 to No. 32 of the <Table 2> above, the control unit (not shown) may apply a touch driving signal to the plurality of first patterns 101 and receive a touch sensing signal from the plurality of third patterns 103.

As shown in No. 1 to No. 32 of the <Table 2> above, the control unit (not shown) may apply a stylus pen driving signal to at least one of the plurality of first to fourth patterns 101 to 104 and receive a stylus pen sensing signal from at least one of the plurality of first to fourth patterns 101 to 104.

As shown in No. 1 to No. 32 of the <Table 2> above, the control unit (not shown) may apply a stylus pen driving signal to at least one of the plurality of first patterns 101 or the plurality of third patterns 103.

As shown in Nos. 1 to 3, 5 to 7, 9 to 11, 13 to 15, 17 to 19, 21 to 23, 25 to 27, and 29 to 31 of the <Table 2> above, the control unit (not shown) may apply a stylus pen sensing signal to at least one of the plurality of first patterns 101 or the plurality of third patterns 103.

As shown in Nos. 1 to 12 and 25 to 32 of the <Table 2> above, the control unit (not shown) may apply a stylus pen driving signal to at least one of the plurality of second patterns 102 or the plurality of fourth patterns 104.

As shown in Nos. 2 to 4, 6 to 8, 10 to 12, 14 to 16, 19 to 20, 22 to 24, 26 to 28, and 30 to 32 of the <Table 2> above, the control unit (not shown) may apply a stylus pen sensing signal to at least one of the plurality of second patterns 102 or the plurality of fourth patterns 104.

The control unit (not shown) may select at least one of the plurality of first to fourth patterns 101 to 104 as a pen driving electrode and apply a stylus pen driving signal to the selected pen driving electrode. Here, the feature of selecting at least one of the plurality of first to fourth patterns 101 to 104 as the pen driving electrode may be varied according to a position of the stylus pen 10 on the touch screen 20 of the touch input device 2 of FIG. 1A. A pattern selected when the stylus pen is in a hover state may be different from a pattern selected when the stylus pen is in a contact state. For example, the control unit (not shown) may select one of the first and second patterns 101 and 102 as the pen driving electrode when the stylus pen is in the hover state and one of the third and fourth patterns 103 and 104 as the pen driving electrode when the stylus pen is in the contact state, and vice versa.

The control unit (not shown) may select at least two of the plurality of first to fourth patterns 101 to 104 as the pen sensing electrode to sense the stylus pen signal emitted from the stylus pen through the selected pen sensing electrode. Here, the feature of selecting at least two of the plurality of first to fourth patterns 101 to 104 as the pen sensing electrode may be varied according to a position of the stylus pen 10 on the touch screen 20 of the touch input device 2 of FIG. 1A. A pattern selected when the stylus pen is in the hover state may be different from a pattern selected when the stylus pen is in the contact state. For example, the control unit (not shown) may select one of the first and second patterns 101 and 102 as the pen driving electrode when the stylus pen is in the hover state and one of the third and fourth patterns 103 and 104 as the pen driving electrode when the stylus pen is in the contact state, and vice versa.

Figure 19:
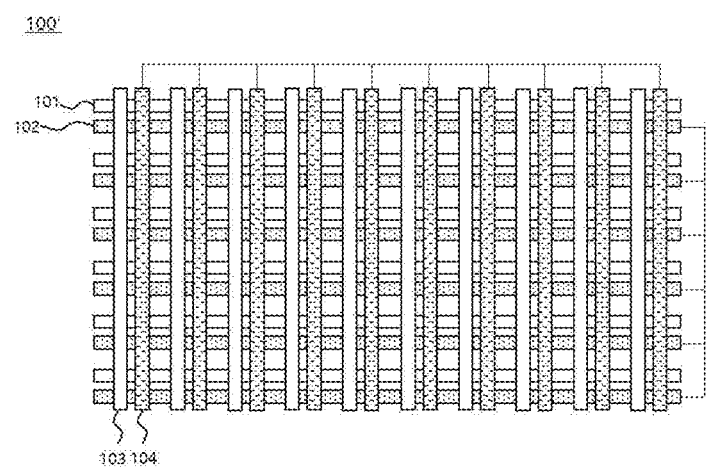
FIG. 19 is a schematic configuration view illustrating a sensor unit 100' according to a second embodiment of the present invention.

FIG. 19 is a schematic configuration view illustrating a sensor unit 100' according to a second embodiment of the present invention;

The touch input device according to the second embodiment of the present invention may be a landscape-type touch input device. In this landscape-type touch input device, a width is greater than a height, and a control unit (not shown) for controlling the sensor unit 100' may be disposed below the sensor unit 100'. For example, the touch input device may correspond to a shape of a tablet PC.

The sensor unit 100' of the touch input device according to the second embodiment of the present invention has the same configuration as that of the sensor unit 100 of the touch input device according to the first embodiment in FIG. 16, and the sensor unit 100' only rotates at 90° from the sensor unit 100.

The sensor unit 100' of the touch input device according to the second embodiment of the present invention includes a plurality of first to fourth patterns 101, 102, 103, and 104. The first pattern 101 and the second pattern 102 are adjacent to each other and each have a shape extending in one direction. Alternatively, each of the first pattern 101 the second pattern 101 may have a predetermined shape in which an electrical path is formed along the one direction. The third pattern 103 and the fourth pattern 104 are adjacent to each other and each have a shape extending in a different direction from the one direction. Alternatively, each of the third pattern 103 and the fourth pattern 104 may have a predetermined shape in which an electrical path is formed in the different direction. The other ends (second ends) of the plurality of second patterns 102 are electrically connected to each other, and the other ends (second ends) of the plurality of fourth patterns 104 are also electrically connected to each other.

When the sensor unit 100' of the touch input device according to the second embodiment in FIG. 19 has a size of about 10 to 14 inches, which is the size of a landscape-type tablet PC, and is implemented as with an example of No. 1 in the <Table 2> above, the number of total channels and the number of driving trace channels (TX Trace Channels) of the sensor unit 100' are summarized in <Table 3> below.

TABLE 3

|  | Number of channels (about 10 inches or more) |
|---|---|
| Finger TX (101) | 42 |
| Finger RX (103) | 56 |
| Stylus TX (102) | 21 |
| Top channel (101 + 102 + 103) | 119 |
| TX Trace channel (101 + 102) | 63 |

Figure 20:
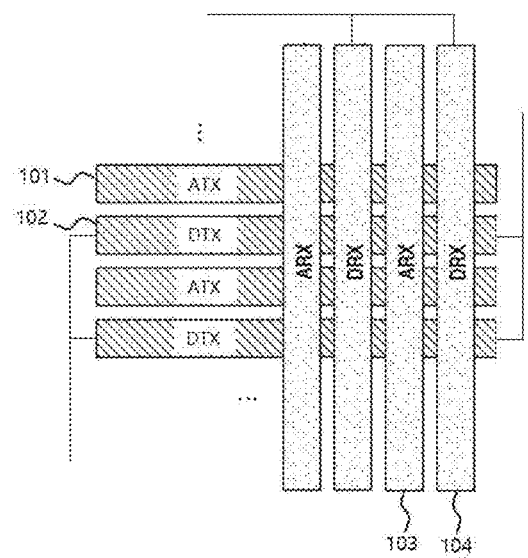
FIG. 20 is a schematic configuration view illustrating an example of the sensor unit 100' in FIG. 19.

In the <Table 3> above, the number of channels of Stylus TX is a value obtained by dividing the number of the plurality of first patterns 101 by 2. This is because the number of channels are reduced by half as two adjacent one ends of one ends (first ends) of the plurality of second patterns 102 are electrically connected while the number of the plurality of second patterns 102 is equal to that of the plurality of first patterns 101 as illustrated in FIG. 20.

In the <Table 3> above, the number of TX Trace channels is a sum of the number of channels of Finger TX and the number of channels of Stylus TX. The number of the TX Trace channels is a key factor in determining a thickness of a bezel in a width direction of the touch input device according to the second embodiment. This is because the control unit (not shown) is disposed below (or above) the sensor unit 100' in the touch input device according to the second embodiment. As the number of the TX Trace channels is reduced, the thickness of the bezel in the width direction of the touch input device may be reduced.

While there is no problem when the screen of the touch input device shown in FIG. 19 has a size of a screen of a smartphone, e.g., 6.9 inches, when the size of the screen of the touch input device shown in FIG. 19 increases to 11 inches or 12.9 inches that is a size of a screen of a tablet PC, lengths of the first to fourth patterns 101, 102, 103, and 104 of the sensor unit 100' also increase, so that a resistance value and a capacitance value of the sensor unit increase. Since the increase of the resistance and capacitance values allows an operating frequency bandwidth of each of the touch driving signal applied to one pattern used as the touch driving electrode among the first to third patterns and the stylus driving signal for driving the stylus pen to decrease, an operating frequency bandwidth required for a design may not be obtained. The resistance and capacitance values may be reduced to solve the above-described limitation. However, the feature of reducing the resistance and capacitance values is limited, and the above-described limitation is not still solved although the values are maximally reduced.

Also, the stylus pen signal received from the stylus pen and inputted to the control unit of the touch input device is attenuated as much as the sensor unit 100' increases. Particularly, as the stylus pen sensing signal is attenuated in a process of being transmitted to the control unit from a portion spaced farthest from the control unit in the first to fourth patterns 101, 102, 103, and 104 of the sensor unit 100', a voltage value required for a design is not outputted.

The above-described limitations may be solved by using the plurality of second patterns 102 as the stylus pen sensing electrode for sensing the stylus pen signal as with examples of Nos. 3, 4, 7, 8, 11, 12, 15, 16, 19, 20, 23, 24, 27, 28, 31, and 32 of the <Table 2> or by using the plurality of fourth patterns 104 as the stylus pen sensing electrode for sensing the stylus pen signal as with examples of Nos. 2, 4, 6, 8, 10, 12, 14, 16, 18, 20, 22, 24, 26, 28, 30, and 32 of the <Table 2>. In the above examples, since the plurality of second and fourth patterns 102 and 104 directly receive electromotive force through electromagnetic induction caused by the stylus pen, there is no signal attenuation through capacitive coupling from the second pattern 102 to the first pattern 101 and from the fourth pattern 104 to the third pattern 103.

As a specific example, the sensor unit 100' of the touch input device according to the second embodiment has a size of about 10 to 14 inches, which is the size of the landscape-type tablet PC, and when the sensor unit 100' is implemented as with an example of No. 3 in the <Table 2> above, the number of total channels and the number of driving trace channels (TX Trace Channels) of the sensor unit 100' are summarized in <Table 4> below.

TABLE 4

| | Number of channels (about 10 inches or more) |
|---|---|
| Finger TX | 42 |
| Finger RX | 56 |
| Stylus TX | 42 |
| Top channel | 140 |
| TX Trace channel | 84 |

Figure 21:
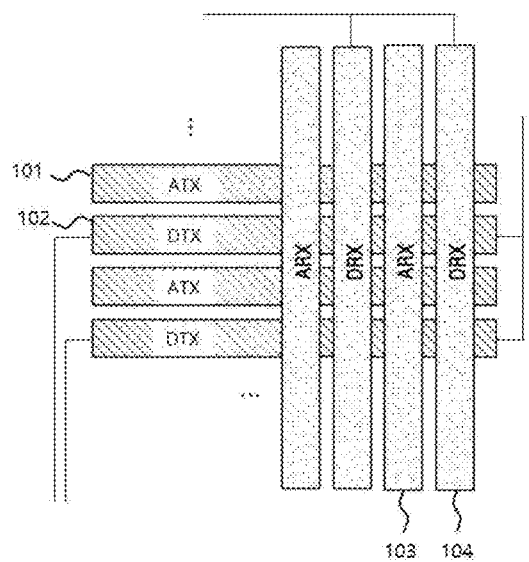
FIG. 21 is a schematic configuration view illustrating another example of the sensor unit 100' in FIG. 19.

In the <Table 4> above, the number of channels of Stylus TX is equal to that of the plurality of second patterns 102. This is because the number of the plurality of second patterns 102 is equal to that of the plurality of first patterns 101, and each of one ends of the plurality of second patterns 102 is individually connected to one conductive pattern as illustrated in FIG. 21.

In the <Table 4> above, the number of TX Trace channels is a sum of the number of channels of Finger TX and the number of channels of Stylus TX. The number of the TX Trace channels is a key factor in determining a thickness of a bezel in a minor axis of the touch input device. As the number of the TX Trace channels is reduced, the thickness of the bezel in the minor axis of the touch input device may be reduced.

The example of the above <Table 4> has a disadvantage in that the number of channels slightly increases compared to the above <Table 3>, but has an advantage in that a voltage value of the stylus sensing signal received by the control unit increases because the pen sensing signal emitted from the stylus pen is received through the plurality of second patterns 102. The present applicant confirms through experiments that the voltage value of the stylus sensing signal received by the control unit is approximately two times greater than that in the <Table 3>.

Also, since each of the plurality of second patterns 102 is one channel, when the plurality of second patterns 102 are used as the stylus driving electrode (Stylus TX), a distance between the channels is reduced by half, and a stylus driving resolution is improved.

As another specific example, when the sensor unit 100' of the touch input device according to the second embodiment has a size of about 10 to 14 inches, which is the size of the landscape-type tablet PC, and is implemented as with an example of No. 8 in the <Table 2> above, the number of total channels and the number of driving trace channels (TX Trace Channels) of the sensor unit 100' are summarized in <Table 5> below.

TABLE 5

| | Number of channels (about 10 inches or more) |
|---|---|
| Finger TX | 42 |
| Finger RX | 56 |
| Stylus TX | 56 |
| Top channel | 154 |
| TX Trace channel | 42 |

Figure 22:
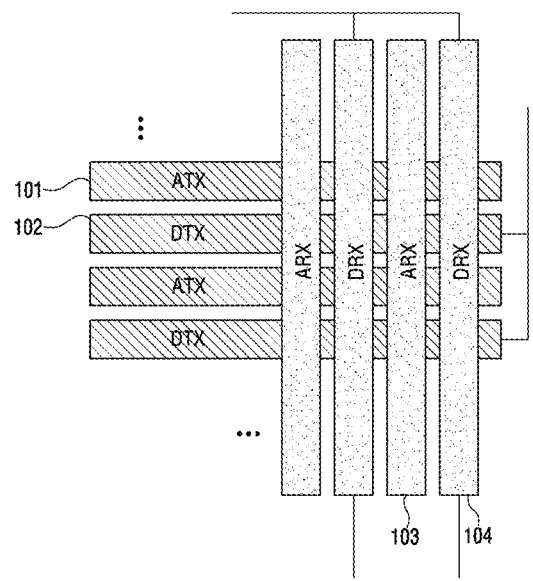
FIG. 22 is a schematic configuration view illustrating another example of the sensor unit 100' in FIG. 19.

In the <Table 5> above, the number of channels of the Stylus TX is equal to that of the plurality of fourth patterns 104. This is because the number of the plurality of fourth patterns 104 is equal to that of the plurality of third patterns 103, and each of one ends of the plurality of fourth patterns 104 is individually connected to one conductive pattern as illustrated in FIG. 22.

In the <Table 5> above, the number of the TX Trace channels is equal to that of the number of channels of the Finger TX. The number of the TX Trace channels is a key factor in determining a thickness of the bezel in the minor axis of the touch input device. As the number of the TX Trace channels is reduced, the thickness of the bezel in the minor axis of the touch input device may be reduced.

The example of the above <Table 5> has a disadvantage in that the number of total channels slightly increases compared to the above <Table 3>, but has an advantage in that a voltage value of the stylus pen sensing signal received by the control unit increases because the pen sensing signal emitted from the stylus pen is received through the plurality of fourth patterns 104.

Also, since each of the plurality of fourth patterns 104 is one channel, when the plurality of fourth patterns 104 are used as the stylus driving electrode (Stylus TX), a distance between the channels is reduced by half, and the stylus driving resolution is improved.

Also, since the number of the TX trace channels may be reduced to ¼ to ⅓ compared to the example in the <Table 3>, a thickness of a bezel B in the width direction of the touch input device may be reduced.

Figure 23:
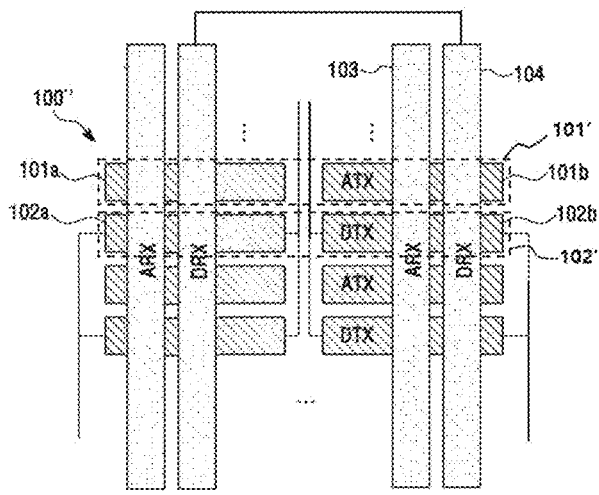
FIG. 23 is a schematic configuration view illustrating another example of the sensor unit 100' in FIG. 19.

FIG. 23 is a schematic configuration view illustrating another example of the sensor unit 100' in FIG. 19.

In a sensor unit 100" of FIG. 23, each first pattern 101' includes at least two or more first-a patterns 101a and first-b patterns 101b, and each second pattern 102' includes at least two or more second-a patterns 102a and second-b patterns 102b. A plurality of third and fourth patterns 103 and 104 are the same as those of the sensor unit 100 of FIG. 19.

The first-a pattern 101a and the first-b pattern 101b are arranged in an extension direction of the first pattern 101'. The second-a pattern 102a and the second-b pattern 102b are arranged in an extension direction of the second pattern 102'.

The other ends of the plurality of second-a patterns 102a are electrically connected, and the other ends of the plurality of second-b patterns 102b are electrically connected. Here, the other ends of the plurality of second-a patterns 102*a* face the other ends of the plurality of second-b patterns 102*b*.

Figure 9:
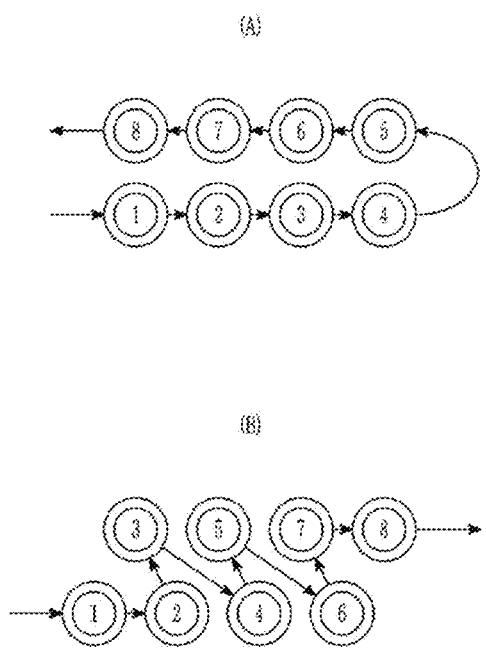
FIG. 9 is a view illustrating a winding scheme of a plurality of layers.

One ends of two or more adjacent second-a patterns of the plurality of second-a patterns 102*a* may be electrically connected to each other. One ends of two or more adjacent second-b patterns of the plurality of second-b patterns 102*b* may be electrically connected to each other. Here, each of the one ends of the plurality of second-a patterns and the one ends of the plurality of second-b patterns is individually connected to a conductive pattern as illustrated in FIG. 9

As a specific example, when the sensor unit 100" in FIG. 23 has a size of about 10 to 14 inches, which is the size of the landscape-type tablet PC, and is implemented as with the example of No. 1 in the <Table 2> above, the number of total channels and the number of driving trace channels (TX Trace Channels) of the sensor unit 100" are summarized in <Table 6> below.

TABLE 6

|  | Number of channels (about 10 inches or more) |
|---|---|
| Finger TX | 84 |
| Finger RX | 56 |
| Stylus TX | 42 |
| Top channel | 182 |
| TX Trace channel | 126 |

In the <Table 6> above, the number of channels of Stylus TX is a value obtained by dividing the number of the plurality of second patterns 102' by 2. This is because the number of the plurality of second patterns 102' is equal to that of the plurality of first patterns 101', and two adjacent second patterns of the plurality of second patterns 102' are electrically connected to each other.

In the <Table 6> above, the number of TX Trace channels is a sum of the number of channels of Finger TX and the number of channels of Stylus TX. The number of TX Trace channels is a key factor in determining a thickness of the bezel in the minor axis of the touch input device. As the number of the TX Trace channels is reduced, the thickness of the bezel in the minor axis of the touch input device may be reduced.

The above <Table 6> has a disadvantage in that the number of channels slightly increases compared to the example of the <Table 3> above, but has an advantage in that an operating frequency bandwidth of each of the touch driving signal applied to the touch driving electrode and the pen driving signal for driving the stylus pen is widened by reducing a resistance value and a capacitance value of the sensor unit 100" because a length of each of the first pattern 101' and the second pattern 102' is reduced by half.

Figure 24:
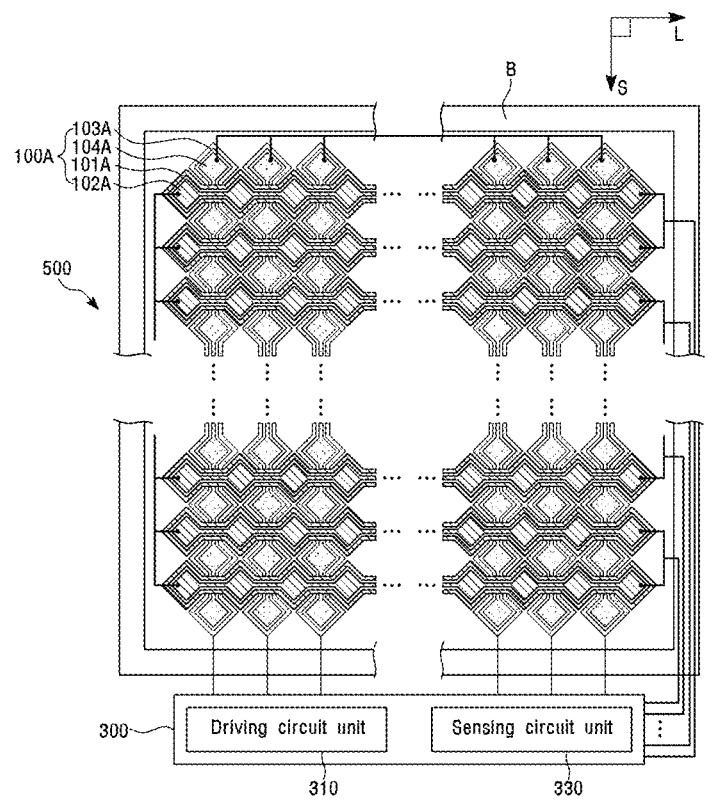
FIG. 24 is a view illustrating the touch input device in FIG. 20 in detail.

FIG. 24 is a view illustrating the touch input device in FIG. 20 in detail.

Referring to FIG. 24, a touch input device 500 may include a sensor unit 100A and a control unit 300 for controlling the sensor unit 100A.

The sensor unit 100A is an example of the sensor unit 100' in FIG. 20. Thus, the sensor unit 100A includes a plurality of first to fourth patterns 101A, 102A, 103A, and 104A.

The first pattern 101A has a shape extending in a first direction (or width direction). The first direction may be a major axis direction L of a screen of the touch input device. The first pattern 101A may also be referred to as Active TX (ATX).

The first pattern 101A may includes a plurality of main pattern parts and a connection pattern part connecting two adjacent main pattern parts among the plurality of main pattern parts. Here, although the main pattern part may have a diamond shape, the embodiment of the present invention is not limited thereto. For example, the main pattern part may have various shapes that are different from that of the connection pattern part.

The first pattern 101A may have an opening in which the second pattern 102A is disposed. The opening may have a shape corresponding to an outer shape of the first pattern 101A. The first pattern 101A may have a structure surrounding the second pattern 102A. The first pattern 101A is spaced a predetermined distance from the second pattern 102A.

The second pattern 102A has a shape extending in the first direction, is disposed adjacent to the first pattern 101A and is spaced a predetermined distance from the first pattern 101A. The second pattern 102A may also be referred to as Dummy TX (DTX).

The second pattern 102A is disposed in the first pattern 101A.

The second pattern 102A may includes a plurality of main pattern parts and a connection pattern part connecting two adjacent main pattern parts among the plurality of main pattern parts. Here, although the main pattern part may have a diamond shape, the embodiment of the present invention is not limited thereto. For example, the main pattern part may have various shapes that are different from that of the connection pattern part.

The main pattern part of the second pattern 102A may have a shape corresponding to that of the main pattern part of the first pattern 101A, and the connection pattern part of the second pattern 102A may have a shape corresponding to that of the connection pattern part of the first pattern 101A.

The third pattern 103A has a shape extending in a second direction different from the first direction. The second direction may be a direction perpendicular to the first direction, and may be a minor axis direction of the screen of the touch input device. The third pattern 103A may also be referred to as Active RX (ARX).

The third pattern 103A may includes a plurality of main pattern parts and a connection pattern part connecting two adjacent main pattern parts among the plurality of main pattern parts. Here, although the main pattern part may have a diamond shape, the embodiment of the present invention is not limited thereto. For example, the main pattern part may have various shapes that are different from that of the connection pattern part.

The third pattern 103A may have an opening in which the fourth pattern 104A is disposed. The opening may have a shape corresponding to an outer shape of the third pattern 103A. The third pattern 103A may have a structure surrounding the fourth pattern 104A. The third pattern 103A is spaced a predetermined distance from the fourth pattern 104A.

The fourth pattern 104A has a shape extending in the second direction, is disposed adjacent to the third pattern 103A, and is spaced a predetermined distance from the third pattern 103A. The fourth pattern 104A may also be referred to as Dummy RX (DRX).

The fourth pattern 104A is disposed in the third pattern 103A.

The fourth pattern 104A may includes the plurality of main pattern parts and the connection pattern part connecting two adjacent main pattern parts among the plurality of main pattern parts. Here, although the main pattern part may have a diamond shape, the embodiment of the present invention is not limited thereto. For example, the main pattern part may have various shapes that are different from that of the connection pattern part.

The main pattern part of the fourth pattern 104A may have a shape corresponding to that of the main pattern part of the third pattern 103A, and the connection pattern part of the fourth pattern 104A may have a shape corresponding to that of the connection pattern part of the third pattern 103A.

The third and fourth patterns 103A and 104A are disposed on the first and second patterns 101A and 102A and are spaced a predetermined distance from the first and second patterns 101A and 102A. The sensor unit in which the first to fourth patterns are disposed on the same layer will be described in detail with reference to FIG. 30.

Although not shown in the drawing, one ends (first ends) of the plurality of first patterns 101A are electrically connected to the control unit 300, and the other ends (second ends) are electrically opened. Here, each of the one ends (first end) is relatively close to the control unit 300, and each of the other ends (second end) is relatively far from the control unit 300.

Although not shown in the drawing, each of the one ends of the plurality of first patterns 101A may be electrically connected to each other through the control unit 300 and the conductive pattern. The conductive patterns connecting the plurality of first patterns 101A and the control unit 300 may be arranged in the bezel B of a width direction of the touch input device 500.

Two adjacent one ends of the one ends (first ends) of the plurality of second patterns 102A may be electrically connected to each other by a first conductive pattern and then electrically connected to the control unit 300 through a second conductive pattern. The other ends (second ends) of the plurality of second patterns 102A are electrically connected to each other through the conductive pattern. Here, each of the one ends (first end) is relatively close to the control unit 300, and each of the other ends (second end) is relatively far from the control unit 300.

The second conductive patterns connecting the plurality of second patterns 102A and the control unit 300 may be arranged in the bezel B of the width direction of the touch input device 500 as illustrated in FIG. 24 Here, the second conductive patterns connecting the plurality of second patterns 102A and the control unit 300 may be arranged in the bezel B of the width direction of the touch input device 500 together with conductive patterns (not shown) connecting the plurality of first patterns 101A and the control unit 300.

When the other ends of the plurality of second patterns 102A are electrically connected to each other, a total impedance is reduced because capacitances for respective second patterns 102A are added. Thus, an effect in which each of the other ends of the plurality of second patterns 102A is AC GND is obtained.

Although not shown in the drawings, the other ends of the plurality of second patterns 102A, which are electrically connected to each other, may be grounded. Also, although not shown in the drawings, the other ends of the plurality of second patterns 102A may not be electrically connected to each other, and a predetermined capacitor may be connected to each of the other ends of the second patterns 102A.

The plurality of first patterns 101A and the plurality of second patterns 102A may be disposed on the same layer. The first pattern 101A and the second pattern 102A may be formed on the same layer by using a metal mesh.

Although not shown in the drawing, one ends (first ends) of the plurality of third patterns 103A are electrically connected to the control unit 300, and the other ends (second ends) are electrically opened. Here, each of the one ends (first end) is relatively close to the control unit 300, and each of the other ends (second end) is relatively far from the control unit 300. The one ends of the plurality of third patterns 103A may be electrically connected to the control unit 300 through a conductive pattern.

One ends (or first ends) of the plurality of fourth patterns 104A may be electrically opened. Here, the other ends (second ends) of the plurality of fourth patterns 104A may be electrically connected to each other in the same manner as the plurality of second patterns 102A. Here, each of the one ends (first end) is relatively close to the control unit 300, and each of the other ends (second end) is relatively far from the control unit 300.

Although not shown in the drawings, the other ends of the plurality of second patterns 104A, which are electrically connected to each other, may be grounded. Also, the other ends of the plurality of fourth patterns 104A may not be electrically connected to each other, and a predetermined capacitor may be connected to each of the other ends of the fourth patterns 104A.

The plurality of third patterns 103A and the plurality of fourth patterns 104A may be disposed on the same layer. The third pattern 103A and the fourth pattern 104A may be formed on the same layer by using a metal mesh. Here, the third pattern 103A and the fourth pattern 104A may be disposed on a layer different from that of the first pattern 101A and the second pattern 102A. For example, the third pattern 103A and the fourth pattern 104A may be disposed on a first layer, and the first pattern 101A and the second pattern 102A may be disposed on a second layer that is different from the first layer. The sensor unit in which the first to fourth patterns are disposed on the same layer will be described in detail with reference to FIG. 30.

The control unit 300 may be electrically connected to the sensor unit 100A and control an operation of the sensor unit 100A. The control unit 300 and the sensor unit 100A may be electrically connected to each other through a conductive pattern. Here, although the control unit (or controller) 300 is a touch controller 262 illustrated in FIG. 3, the embodiment of the present invention is not limited thereto. The control unit 300 may be obtained by: integrating the touch controller 262 and the display controller 252 in FIG. 3; integrating the touch controller 262 and the control unit 270 in FIG. 3; or integrating the touch controller 262, the display controller 252, and the control unit 270 in FIG. 3. Alternatively, the controller 300 may be a separate controller contained in the sensor unit 100. Thus, the controller 300 according to the present invention is not limited to the touch controller 262 or the control unit 270 in FIG. 3, and a component capable of controlling a sensor unit according to following embodiments in addition to the sensor unit 100 may be referred to as a 'controller'.

The control unit 300 may include a plurality of driving circuit units 310 and a plurality of sensing circuit units 330. Here, although not shown in the drawing, at least one of the plurality of driving circuit units 310 and the plurality of sensing circuit units 330 may not be contained in the control unit 300 and may be disposed outside the control unit 300.

The plurality of driving circuit units 310 may include a driving circuit unit providing a touch sensing signal for sensing a position of a touch of an object such as a finger to the plurality of first patterns 101A and a driving circuit unit providing a pen driving signal for driving the stylus pen.

The plurality of sensing circuit units 330 may include a sensing circuit unit for detecting a position of a touch of an object such as a finger by receiving a sensing signal through the plurality of third patterns 103A and a sensing circuit unit for sensing the stylus pen. Here, some sensing circuit units among the plurality of sensing circuit units may perform touch position sensing in addition to stylus pen sensing.

The control unit 300 may control the sensor unit 100A to operate in one of the touch sensing mode, the antenna driving mode, and the stylus pen sensing mode. The control unit 300 may selectively electrically connect the plurality of driving/sensing circuit units 310 and 330 to the sensor unit 100A according to each mode. To this end, the control unit 300 may include a plurality of switches electrically connecting the plurality of driving/sensing circuit units 310 and 330 to the sensor unit 100A according to a command of the control unit 300.

An operation mode of the touch input device 500 in FIG. 24 will be described in detail. Here, since the example of No. 1 in the above <Table 2> is illustrated in FIG. 24, a description will be provided based on the example.

In the touch driving/sensing mode, the control unit 300 may electrically connect the plurality of driving circuit units 310 to the plurality of first patterns 101A of the sensor unit 100A to sense a position of a touch of an object such as a finger. The control unit 300 may control a plurality of switches to electrically connect the conductive patterns connected to the plurality of first patterns 101A with the plurality of driving circuit units 310.

Also, the control unit 300 may electrically connect the plurality of sensing circuit units 330 for touch position sensing to the plurality of third patterns 103A of the sensor unit 100A. The control unit 300 may control a plurality of switches to electrically connect the conductive patterns connected to the plurality of third patterns 103A with the plurality of sensing circuit units 330.

In the driving/touch sensing mode, the control unit 300 simultaneously or sequentially applies a driving signal (or touch driving signal) for touch sensing to the plurality of first patterns 101A and receives a sensing signal (or touch sensing signal) received from the plurality of third patterns 103A. The plurality of sensing circuit units of the control unit 300 electrically connected to the plurality of third patterns 103A may output information on capacitance variation contained in the input sensing signal as a predetermined voltage value. The control unit 300 may process the outputted voltage value to detect a touch position.

In the touch driving/sensing mode, the control unit 300 may electrically connect the plurality of driving circuit units 310 to the plurality of second patterns 102A to prevent capacitive coupling from being generated between the plurality of first patterns 101A and the plurality of second patterns 102A. Here, the control unit 300 may control the same driving signal as the driving signal applied to the plurality of first patterns 101A to be applied to the plurality of second patterns 102A. Also, the control unit 300 may control a predetermined reference potential to be applied to the plurality of second patterns 102A when the driving signal is applied to the plurality of first patterns 101A.

In the antenna driving mode (or stylus driving mode, or stylus uplink mode), the control unit 300 electrically connect the plurality of driving circuit units 310 for driving the antenna to the plurality of second patterns 102A of the sensor unit 100A. The control unit 300 may control the plurality of switches to electrically connect the conductive patterns connected to the plurality of second patterns 102A with the plurality of driving circuit units 310.

The control unit 300 may control a driving signal (or pen driving signal) outputted from each driving circuit unit 310 connected to the plurality of second patterns 102A. For example, the control unit 300 may control: a pulse signal having a predetermined frequency to be outputted from a first driving circuit unit; any pulse signal not to be outputted from a second driving circuit unit; and a reverse pulse signal having a phase opposite to that of the pulse signal outputted from the first driving circuit unit to be outputted from the third driving circuit unit, among the plurality of driving circuit units connected to the plurality of second patterns 102A. In this case, a current loop is formed by the second pattern electrically connected to the first driving circuit unit and the second pattern electrically connected to the third driving circuit unit. A magnetic field is generated by the formed current loop, and the stylus pen adjacent to the sensor unit 100A may be driven by the magnetic field.

The control unit 300 may control opposite driving signals to be outputted from two random driving circuit units among the plurality of driving circuit units 310 electrically connected to the plurality of second patterns 102A. Thus, the control unit 300 may variously change and set a size and a position of the current loop. For example, when the control unit 300 detects a position of the stylus pen adjacent to the sensor unit 100A, the control unit 300 may control opposite driving signals to be outputted from the driving circuit unit electrically connected to two second patterns disposed around the position of the stylus pen, and when the control unit 300 does not detect the position of the stylus pen, the control unit 300 may control opposite driving signals to be outputted from the driving circuit unit electrically connected to two second patterns disposed both outermost portions among the plurality of second patterns 102A.

Figure 25:
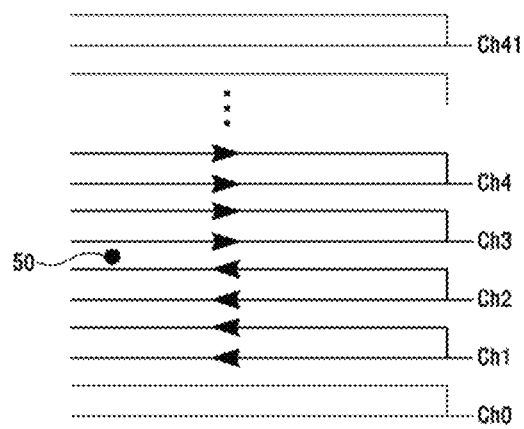
FIG. 25 is a view for explaining a method by which a control unit 300 applies a pen driving signal for driving the stylus pen to a plurality of second patterns 102A.

FIG. 25 is a view for explaining a method by which the control unit 300 applies a pen driving signal for driving the stylus pen to the plurality of second patterns 102A; For reference, in FIG. 25, one second pattern 102A in FIG. 24 is simply illustrated as one line Ch, and each line Ch is one channel As illustrated in FIG. 25, two adjacent second patterns are electrically connected to form one channel. In this configuration, the same signal is applied to the two electrically connected second patterns. FIG. 25 is a view illustrating a state in which 84 second patterns are connected by two to form 42 channels Ch0, Ch1, . . . . Ch41.

For example, when the stylus pen 50 is disposed between a second channel Ch2 and a third channel Ch3 among the 42 channels Ch0, Ch1, . . . . Ch41, the control unit 300 may control a pen driving signal to be outputted to one or more channels disposed at a side of the second channel Ch2 based on the stylus pen 50 and a pen driving signal having an inverted phase of the above-described pen driving signal to one or more channels disposed at a side of the third channel Ch3 based on the stylus pen 50.

In the stylus sensing mode (or stylus downlink mode), the control unit 300 may electrically connect the plurality of sensing circuit units 330 for stylus sensing to the plurality of first patterns 101A and the plurality of third patterns 103A of the sensor unit 100A. The control unit 300 may control the plurality of switches to electrically connect the conductive patterns connected to the plurality of first and third patterns 101A and 103A with the plurality of sensing circuit units 330.

The touch input device 500 according to an embodiment of the present invention has an advantage in that an output voltage value of the plurality of sensing circuit units 330 is hardly changed according to the position of the stylus pen on the sensor unit 100A in the stylus sensing mode due to the configuration of the sensor unit 100A. A specific principle for this will be described with reference to elements a, b, c, d, e, and f of FIG. 26.

Figure 26:
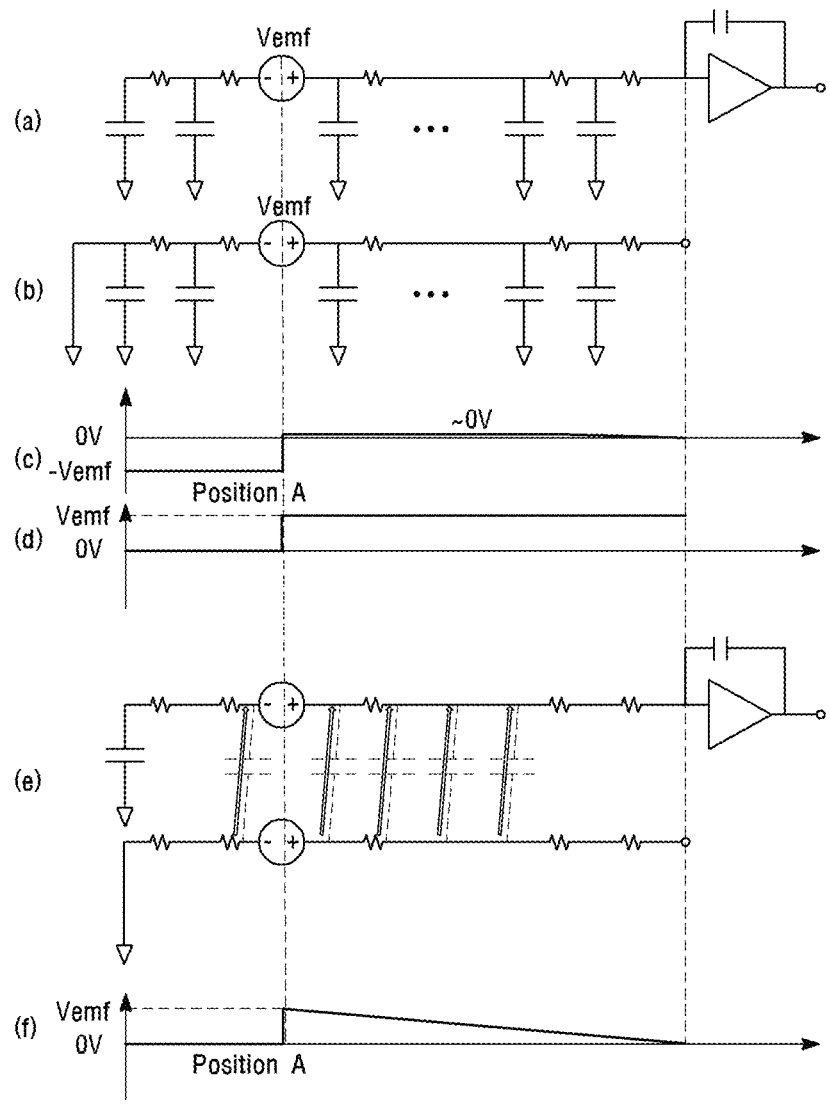
FIG. 26 is a schematic view for explaining an operation principle of the stylus sensing mode in the touch input device of FIG. 24.

FIG. 26 is a schematic view for explaining an operation principle of the stylus sensing mode in the touch input device of FIG. 24.

FIG. 26 element a is a schematic circuit diagram of modeling one first pattern 101A in FIG. 24 and the sensing circuit unit of the control unit 300 electrically connected thereto, and FIG. 26 element b is a schematic circuit diagram of modeling the second pattern 102A disposed in one first pattern 101A. FIG. 26 element c is a voltage distribution graph in the circuit diagram of FIG. 26 element a, and FIG. 26 element d is a voltage distribution graph in the circuit diagram of FIG. 26 element b.

Referring to element a and element c of FIG. 26, when the stylus pen approaches an arbitrary point A spaced away from the sensing circuit unit 330 on the first pattern 101A, a voltage Vemf (hereinafter, referred to as an 'induced voltage') induced by a signal emitted from the stylus pen is generated at the corresponding point A. When the induced voltage Vemf is generated at the point A, since an equivalent capacitance of the first pattern 101A viewed from the point A to the left side decreases, an equivalent impedance increases. Thus, as most of the induced voltage Vemf is applied to the left side of the point A, and a voltage of about 0 V is applied to the right side of the point A, almost no current flows. Furthermore, as the voltage of about 0 V applied to the right side of the point A gradually decreases by equivalent resistances of the first pattern 101A, almost no voltage is applied to an input terminal of the sensing circuit unit.

Referring to element b and element d of FIG. 26, when the induced voltage Vemf is generated at the point A, since the other ends of each second pattern 102A are electrically connected to each other on the left side of the point A, an equivalent capacitance viewed from the point A to the left side increases, and an equivalent impedance approaches almost 0. Thus, a voltage of 0 V is applied to the left side of the point A, and the voltage Vemf is applied to the right side of the point A without causing a voltage drop at equivalent resistors because one end of the second pattern 102A is opened.

When element c and element d of FIG. 26 are compared, it may be known that a potential difference as much as the voltage Vemf exists at any position between the first pattern 101A and the second pattern 102A. The potential difference as much as the voltage Vemf between the first pattern 101A and the second pattern 102A causes capacitive coupling between the first pattern 101A and the second pattern 102A. As illustrated in FIG. 26 element e, current flows from the second pattern 102A to the first pattern 101A by the capacitive coupling. Although current generated from the first pattern 101A itself gradually decreases as a distance from the position of the stylus pen to the sensing circuit unit of the control unit 300 increases, since current is introduced to the first pattern 101A from the second pattern 102A, current outputted from the first pattern 101A to the sensing circuit unit 330 of the control unit 300 has almost no difference from the position of the pen. Thus, the control unit 300 may sense the position of the stylus pen through the sensing circuit unit 330 electrically connected to the first pattern 101A.

As illustrated in element a, element b, element c, element d, and element e of FIG. 26, it may be known that a potential difference between the first pattern 101A and the second pattern 102A is constant as the voltage Vemf although the point A moves to the left or right side. Thus, the control unit 300 may sense the stylus pen from a constant signal outputted from the sensing circuit unit 330 regardless of whether the position of the stylus pen on the sensor unit 100A is close to or far from the sensing circuit unit.

Although the current is introduced to the first pattern 101A from the second pattern 102A by the capacitive coupling in a description of FIG. 26 element e, the embodiment of the present invention is not limited thereto. For example, current may be also introduced to the first pattern 101A from the second pattern 102A by magnetic coupling (magnetic field coupling).

The principle of element a, element b, element c, element d, and element e of FIG. 26 described above is directly applied to any one of the third pattern 103 and the fourth pattern 104 in the second direction. Also, the principle is directly applied to the touch input device according to the first embodiment in FIG. 16.

FIG. 26 element f is a voltage distribution graph when the sensing circuit unit 330 is connected to a right open terminal of the modeled circuit diagram of the second pattern 102A in FIG. 26 element b. That is, the voltage distribution graph of FIG. 26 element f illustrates a case in which one end of the second pattern 102A is connected to the sensing circuit unit 330 of the control unit 300. When element f and element d of FIG. 26 are compared, in case of FIG. 26 element f, a voltage drop is gradually generated by equivalent resistors in a direction toward the right side of the point A. Thus, in the case of FIG. 26 element f, since a potential difference as much as the voltage Vemf between the first pattern and the second pattern is not maintained, current may not flow from the second pattern to the first pattern as with FIG. 26 element e. Thus, the current outputted from the first pattern gradually decreases as the position of the pen moves away from the control unit 300. In the stylus sensing mode, one end of the second pattern 102A may be opened and floated.

While there is no problem when the screen of the touch input device in FIG. 26 has a size of the screen of the smartphone, e.g., 6.9 inches, when the size of the screen of the touch input device in FIG. 26 increases to 10 inches or 14 inches that is the size of the screen of a tablet PC, the sensor unit 100A also increases, so that a resistance value and a capacitance value of the sensor unit 100A increase. The increase in the resistance and capacitance values causes the operating frequency bandwidth of each of the touch drive signal applied to the touch drive electrode and the pen drive signal for driving the stylus pen to be much narrower than that of the smartphone (6.9 inches). Thus, an operating frequency bandwidth required for design is not obtained.

In addition, the pen sensing signal received from the stylus pen is also attenuated as much as the sensor unit 100A increases. In particular, a voltage value necessary for design is not outputted from the sensor unit 100A because the pen sensing signal at a portion farthest from the control unit 300 is attenuated in a process of being transmitted to the control unit 300.

Hereinafter, touch input devices capable of solving the above-described limitations will be described.

Figure 27:
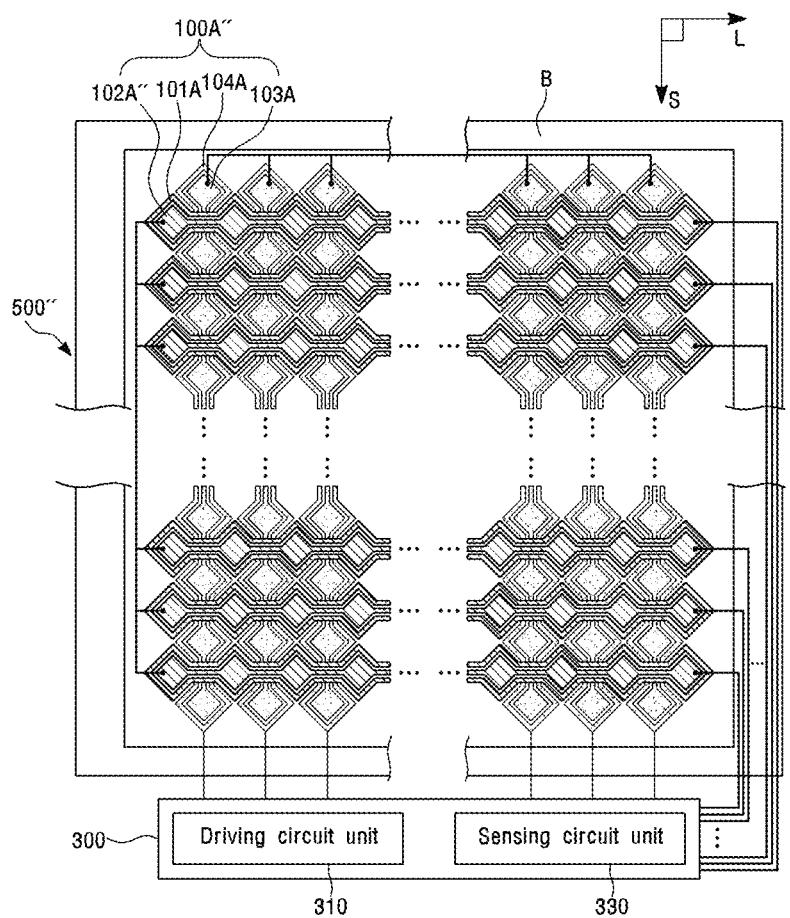
FIG. 27 is a view illustrating the touch input device in FIG. 21 in detail.

FIG. 27 is a view illustrating the touch input device in FIG. 21 in detail.

Referring to FIG. 27, a touch input device 500" may include a sensor unit 100A" and the control unit 300 for controlling the sensor unit 100A".

The sensor unit 100A" includes the plurality of first to fourth patterns 101A, 102A", 103A, and 104A. Here, since the plurality of first, third, and fourth patterns 101A, 103A, and 104A are the same as the plurality of first, third, and fourth patterns 101A, 103A, and 104A illustrated in FIG. 24, a description thereof will be omitted.

Hereinafter, the plurality of second patterns 102A" will be described, a description on the same portion as the plurality of second patterns 102A of FIG. 12 will be omitted for convenience.

Each of one ends (first ends) of the plurality of second patterns 102A" may be electrically connected to the control unit 300 by a conductive pattern. This aspect is different from the plurality of second patterns 102A.

The other ends (second ends) of the plurality of second patterns 102" are electrically connected to each other through a conductive pattern. Here, each of the one ends is relatively close to the control unit 300, and each of the other ends is relatively far from the control unit 300.

An operation mode of the touch input device 500" in FIG. 27 will be described in detail.

In the touch driving/sensing mode, the control unit 300 may electrically connect the plurality of driving circuit units 310 to the plurality of first patterns 101A of the sensor unit 100A" for sensing a position of a touch of an object such as a finger. The control unit 300 may control a plurality of switches to electrically connect the conductive patterns connected to the plurality of first patterns 101A with the plurality of driving circuit units 310.

Also, the control unit 300 may electrically connect the plurality of sensing circuit units 330 for sensing a position of a touch to the plurality of third patterns 103A of the sensor unit 100A". The control unit 300 may control a plurality of switches to electrically connect the conductive patterns connected to the plurality of third patterns 103A with the plurality of sensing circuit units 330.

In the driving/touch sensing mode, the control unit 300 simultaneously or sequentially applies a driving signal (or touch driving signal) for touch sensing to the plurality of first patterns 101A and receives a sensing signal (or touch sensing signal) received from the plurality of third patterns 103A. The plurality of sensing circuit units of the control unit 300 electrically connected to the plurality of third patterns 103A may output information on capacitance variation contained in the input sensing signal as a predetermined voltage value. The control unit 300 may process the outputted voltage value to detect a touch position.

In the antenna driving mode (or stylus driving mode, or stylus uplink mode), the control unit 300 may electrically connect the plurality of driving circuit units 310 for antenna driving to the plurality of second patterns 102A" of the sensor unit 100A". The control unit 300 may control a plurality of switches to electrically connect the conductive patterns connected to the plurality of second patterns 102A" with the plurality of driving circuit units 310.

The control unit 300 may control a driving signal (or pen driving signal) outputted from each driving circuit unit 310 connected to the plurality of second patterns 102A". The control unit 300 may control opposite pulse signals to be outputted from two random driving circuit units among the plurality of driving circuit units 310 electrically connected to the plurality of second patterns 102A". Thus, the control unit 300 may variously change and set a size and a position of the current loop.

In the stylus sensing mode (or stylus downlink mode), the control unit 300 may electrically connect the plurality of sensing circuit units 330 for stylus sensing to the plurality of second patterns 101A" and the plurality of third patterns 103A of the sensor unit 100A". This aspect is different from the stylus sensing mode of the touch input device in FIG. 12.

The control unit 300 may control a plurality of switches to electrically connect the conductive patterns connected to the plurality of second patterns 101A" and the plurality of third patterns 103A with the plurality of sensing circuit units 330.

When compared with the touch input device in FIG. 24, the touch input device 500" in FIG. 27 is different in that the plurality of second patterns 102A" of the sensor unit 100A" is connected to the control unit 300. That is, the plurality of second patterns 102A of FIG. 24 are connected to the control unit 300 through the second conductive pattern after two adjacent second patterns are electrically connected by the first conductive pattern, each of the plurality of second patterns 102A" of FIG. 27 is connected to the control unit 300 by a conductive pattern. This configuration feature has a disadvantage in that the number of channels of the touch input device 500" in FIG. 27 increases compared to the touch input device 500 in FIG. 24, but has an advantage of reducing power consumption because the pen driving signal is applied only to a specific portion at which the stylus pen is disposed in the antenna mode for driving the stylus pen.

Also, while in the touch input device 500 in FIG. 24, in the stylus sensing mode, a pattern for sensing a signal emitted from the stylus pen is the plurality of first patterns 101A in the major axis direction L and the plurality of third patterns 103A in the minor axis direction S, in the touch input device 500" in FIG. 27, in the stylus sensing mode, a pattern for sensing a signal emitted from the stylus pen is the plurality of second patterns 102A" in the major axis direction L and the plurality of third patterns 103A in the minor axis direction S.

When the in the touch input device 500" in FIG. 27, in the stylus sensing mode, a pattern for sensing a signal emitted from the stylus pen is the plurality of second patterns 102A" in the major axis direction L instead of the plurality of first patterns 101A, coupling capacitance between the first patterns 101A and the second patterns 102A" may be reduced compared to the touch input device 500 in FIG. 24. Thus, an operating frequency bandwidth of the touch driving signal and the touch sensing signal for sensing a touch position may be improved, and an operating frequency bandwidth of the pen driving signal for driving the stylus pen may be improved.

Also, since the control unit 300 receives the pen sensing signal from the stylus pen through the plurality of second patterns 102A" in the stylus pen sensing mode, a voltage value of the received pen sensing signal is relatively high. Particularly, since, in the major axis direction L, a voltage value of the pen sensing signal received from a point spaced farthest from the control unit 300 is relatively greater than that in case of FIG. 24, sensing sensitivity may be improved. This is because the capacitive coupling between the first pattern 101A and the second pattern 102A is unnecessary to be considered. Specifically, in case of FIG. 24, as described above in FIG. 26 element a, since current flows from the second pattern 102A to the first pattern 101A by the capacitive coupling between the first pattern 101A and the second pattern 102A, the pen sensing signal inputted to the control unit 300 through the first pattern 101A is attenuated. However, since in the touch input device 500" in FIG. 27, the pen sensing signal is directly inputted to the control unit 300 through the second pattern 102A" instead of the first pattern 101A without the capacitive coupling, the attenuation of the pen sensing signal caused by the capacitive coupling does not occur.

Also, since each of the plurality of second patterns 102A" is one channel, when the plurality of second patterns 102A"

are used as the stylus driving electrode (Stylus TX), a distance between the channels is reduced by half, and the stylus driving resolution is improved.

Figure 28:
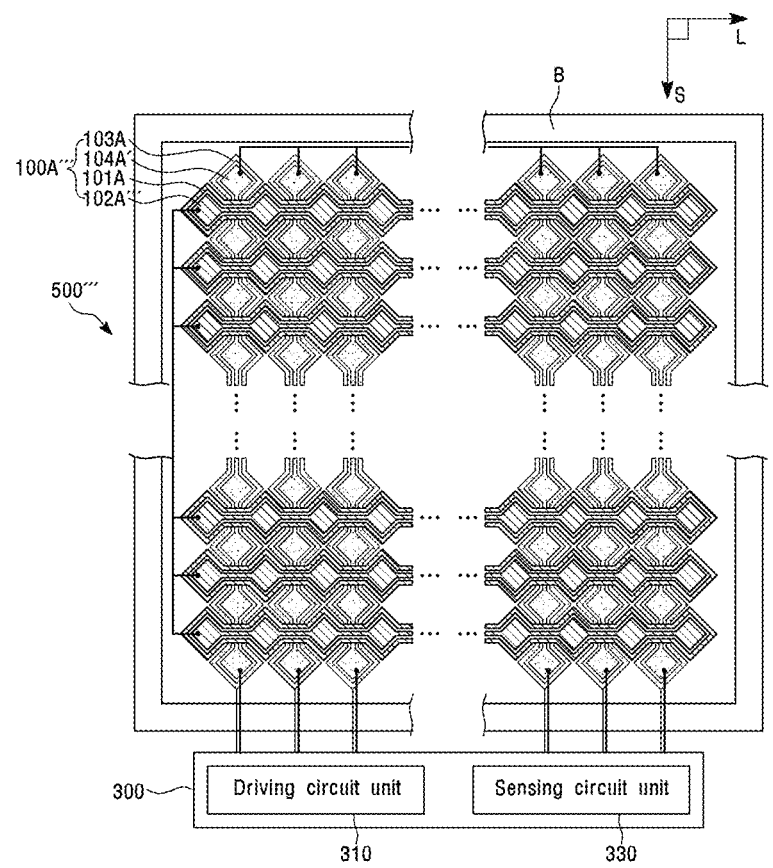
FIG. 28 is a view illustrating the touch input device in FIG. 22 in detail.

FIG. 28 is a view illustrating the touch input device in FIG. 22 in detail.

Referring to FIG. 28, a touch input device 500''' may include a sensor unit 100A''' and a control unit 300 for controlling the sensor unit 100A'''.

The sensor unit 100A''' includes a plurality of first to fourth patterns 101A, 102A''', 103A, and 104A'. Here, since the plurality of first and third patterns 101A and 103A are the same as the plurality of first and third patterns 101A and 103A in FIG. 24, a description thereof will be omitted.

Hereinafter, while the plurality of second and fourth patterns 102A''' and 104A' are described, a description on the same portions as the plurality of second and fourth patterns 102A and 104A of FIG. 24 will be omitted for convenience.

One ends of the plurality of second patterns 102A''' are floated, the other ends of the plurality of second pattern 102A''' may be electrically connected to each other through a conductive pattern. Here, each of the one ends is relatively close to the control unit 300, and each of the other ends is relatively far from the control unit 300.

Each of one ends of the plurality of fourth patterns 104A' is electrically connected to the control unit 300 through a conductive pattern, the other ends of the plurality of fourth patterns 104A' are electrically connected to each other through a conductive pattern. Here, each of the one ends is relatively close to the control unit 300, and each of the other ends is relatively far from the control unit 300.

An operation mode of the touch input device 500" in FIG. 28 will be described in detail.

In the touch driving/sensing mode, the control unit 300 may electrically connect the plurality of driving circuit units 310 to the plurality of first patterns 101A of the sensor unit 100A''' for sensing a position of a touch of an object such as a finger. The control unit 300 may control a plurality of switches to electrically connect the conductive patterns connected to the plurality of first patterns 101A with the plurality of driving circuit units 310.

Also, the control unit 300 may electrically connect the plurality of sensing circuit units 330 for sensing a position of a touch to the plurality of third pattern 103A of the sensor unit 100A'''. The control unit 300 may control a plurality of switches to electrically connect the conductive patterns connected to the plurality of third patterns 103A with the plurality of sensing circuit units 330.

In the driving/touch sensing mode, the control unit 300 simultaneously or sequentially applies a driving signal (or touch driving signal) for touch sensing to the plurality of first patterns 101A and receives a sensing signal (or touch sensing signal) received from the plurality of third patterns 103A. The plurality of sensing circuit units of the control unit 300 electrically connected to the plurality of third patterns 103A may output information on capacitance variation contained in the input sensing signal as a predetermined voltage value. The control unit 300 may process the outputted voltage value to detect a touch position.

In the antenna driving mode (or stylus driving mode, or stylus uplink mode), the control unit 300 may electrically connect the plurality of driving circuit units 310 for antenna driving to the plurality of fourth patterns 104A' of the sensor unit 100A'''. The control unit 300 may control a plurality of switches to electrically connect the conductive patterns connected to the plurality of fourth patterns 104A' with the plurality of driving circuit units 310.

The control unit 300 may control a driving signal (or pen driving signal) outputted from each driving circuit unit 310 connected to the plurality of fourth patterns 104A'. The control unit 300 may control opposite driving signals to be outputted from two random driving circuit units among the plurality of driving circuit units 310 electrically connected to the plurality of fourth 104A'. Thus, the control unit 300 may variously change and set a size and a position of the current loop.

In the stylus sensing mode (or stylus downlink mode), the control unit 300 may electrically connect the plurality of sensing circuit units 330 for stylus sensing to the plurality of first patterns 101A of the sensor unit 100A''' and the plurality of fourth patterns 104A'. This aspect is different from the stylus sensing mode of the touch input device in FIG. 24.

The control unit 300 may control a plurality of switches to electrically connect the conductive patterns connected to the plurality of first patterns 101A and the plurality of fourth patterns 104A' with the plurality of sensing circuit units 330.

When compared with the touch input device in FIG. 24, the touch input device 500''' in FIG. 28 is different in that the plurality of second patterns 102A''' of the sensor unit 100A''' are not used to electrically float and drive the stylus pen through the plurality of fourth patterns 104A'. This configuration has a disadvantage in that the number of channels of the touch input device 500''' in FIG. 28 increases compared to that of the touch input device 500 in FIG. 24, but has an advantage in that conductive patterns connected to the one ends of the plurality of second patterns 102A are not provided because the plurality of second patterns 102A are not used. Thus, a thickness of the left/right bezel B may be remarkably reduced compared to that of FIG. 24.

The touch input device in FIG. 28 has a disadvantage in that the number of total channels slightly increases compared to the touch input device in FIG. 24, but has an advantage in that a voltage value of the stylus pen sensing signal received by the control unit 300 increases because the pen sensing signal emitted from the stylus pen is directly received through the plurality of fourth patterns 104A'. The voltage value of the pen sensing signal received by the control unit 300 of the touch input device in FIG. 24 increases by approximately two times.

Also, since each of the plurality of fourth patterns 104A' is one channel, when the plurality of fourth patterns 104A' are used as the stylus driving electrode (Stylus TX), a distance between the channels is reduced by half than the touch input device of FIG. 24, and the stylus driving resolution is improved.

Also, since the number of the TX trace channels may be reduced to ¼ to ⅓ compared to the touch input device in FIG. 24, a thickness of a bezel B may be reduced.

Figure 29:
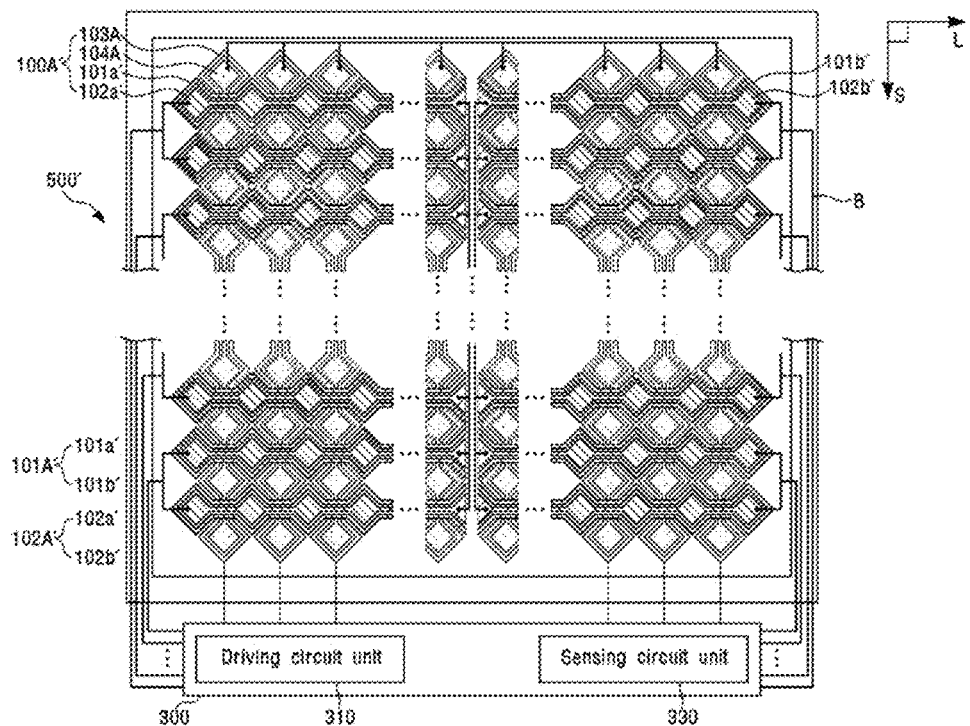
FIG. 29 is a view illustrating the touch input device in FIG. 23 in detail.

FIG. 29 is a view illustrating the touch input device in FIG. 23 in detail.

Referring to FIG. 29, a touch input device 500' may include a sensor unit 100A" and the control unit 300 for controlling the sensor unit 100A'

The sensor unit 100A" includes the plurality of first to fourth patterns 101A', 102A', 103A, and 104A. Here, since the plurality of third and fourth patterns 103A and 104A are the same as the plurality of third and fourth patterns 103A and 104A in FIG. 24, a description thereof will be omitted.

Hereinafter, the plurality of second patterns 102A" will be described, an a description on the same portion as the plurality of second patterns 101A, 102A of FIG. 24 will be omitted for convenience.

The first pattern 101A' has a shape extending in the first direction. The first direction may be a major axis direction L of the screen of the touch input device. The first pattern 101A' includes a first-a pattern 101*a*' and a first-b pattern 101*b*'. The first-a pattern 101*a*' and the first-b 101*b*' are arranged along the first direction and spaced a predetermined distance from each other. The first pattern 101A' including the first-a pattern 101*a*' and the first-b 101*b*' may be referred to as Active TX (ATX).

The second pattern 102A' has a shape extending in the first direction, is disposed adjacent to the first pattern 101A' and is spaced a predetermined distance from the first pattern 101A'. The second pattern 102A' includes a second-a pattern 102*a*' and a second-b pattern 102*b*'. The second-a pattern 102*a*' and the second-b 102*b*' are arranged along the first direction and spaced a predetermined distance from each other. The second pattern 102A' including the second-a pattern 102*a*' and the second-b 102*b*' may be referred to as Dummy TX (DTX).

In the plurality of first patterns 101A', a plurality of first-a patterns 101*a*' have one ends electrically connected to the control unit 300 and the other ends that are electrically opened. Also, a plurality of first-b patterns 101*b*' have one ends electrically connected to the control unit 300 and the other ends that are electrically opened. Here, each of the one ends is relatively close to the control unit 300, and each of the other ends is relatively far from the control unit 300.

The respective one ends of the plurality of first-a patterns 101*a*' may be electrically connected to each other through the control unit 300 and a conductive pattern. The conductive patterns connecting the plurality of first-a patterns 101*a*' and the control unit 300 may be arranged along a minor axis direction S in the bezel B of the touch input device 500'.

The one ends of the plurality of first-b patterns 101*b*' may be electrically connected to each other through the control unit 300 and a conductive pattern. The conductive patterns connecting the plurality of first-b patterns 101*b*' and the control unit 300 may be arranged along the minor axis S in the bezel B of the touch input device 500.

In the plurality of second patterns 102A', two adjacent one ends of the one ends of the plurality of second-a patterns 102*a*' are electrically connected to each other by a first conductive pattern and then electrically connected to the control unit 300 through a second conductive pattern, and the other ends of the plurality of second-a patterns 102*a*' are electrically connected to each other through the conductive pattern. Likewise, two adjacent one ends of the one ends of the plurality of second-b patterns 102*b*' are electrically connected to each other and then electrically connected to the control unit 300 through the second conductive pattern, and the other ends of the plurality of second-b patterns 102*b*' are electrically connected to each other through the conductive pattern. Here, each of the one ends is relatively close to the control unit 300, and each of the other ends is relatively far from the control unit 300.

The second conductive patterns connecting the plurality of second-a and second-b patterns 102*a*' and 102*b*' and the control unit 300 are arranged along the minor axis direction S in the bezel B of the touch input device 500'. Here, the second conductive patterns connecting the plurality of second-a and second-b patterns 102*a*' and 102*b*' and the control unit 300 may be arranged in the bezel B of the of the touch input device 500' together with conductive patterns (not shown) connecting the plurality of first patterns 101A' and the control unit 300.

When the other ends of the plurality of second-a patterns 102*a*' are electrically connected to each other, a total impedance is reduced because capacitances for respective second-a patterns 102*a*' are added. Thus, an effect in which each of the other ends of the plurality of second-a patterns 102*a*' is AC GND is obtained. Likewise, when the other ends of the plurality of second-b patterns 102*b*' are electrically connected to each other, a total impedance is reduced because capacitances for respective second-b patterns 102*b*' are added. Thus, an effect in which each of the other ends of the plurality of second-b patterns 102*b*' is AC GND is obtained.

An operation mode of the touch input device 500' in FIG. 29 will be described in detail.

In the touch driving/sensing mode, the control unit 300 may electrically connect the plurality of driving circuit units 310 to the plurality of first patterns 101A' of the sensor unit 100A' for sensing a position of a touch of an object such as a finger. The control unit 300 may control a plurality of switches to electrically connect the conductive patterns connected to the plurality of first patterns 101A' with the plurality of driving circuit units 310.

Also, the control unit 300 may electrically connect the plurality of sensing circuit units 330 for sensing a position of a touch to the plurality of third patterns 103A of the sensor unit 100A'. The control unit 300 may control a plurality of switches to electrically connect the conductive patterns connected to the plurality of third patterns 103A with the plurality of sensing circuit units 330.

In the touch driving/sensing mode, the control unit 300 simultaneously or sequentially applies a driving signal (or touch driving signal) for touch sensing to the plurality of first patterns 101A' and receives a sensing signal (or touch sensing signal) received from the plurality of third patterns 103A. The plurality of sensing circuit units of the control unit 300 electrically connected to the plurality of third patterns 103A may output information on capacitance variation contained in the input sensing signal as a predetermined voltage value. The control unit 300 may process the outputted voltage value to detect a touch position.

In the antenna driving mode (or stylus driving mode, or stylus uplink mode), the control unit 300 may electrically connect the plurality of driving circuit units for antenna driving to the plurality of second a patterns 102*a*' and the plurality of second b patterns 102*b*' of the sensor unit 100A'. The control unit 300 may control a plurality of switches to electrically connect the conductive patterns connected to the plurality of second-a patterns 102*a*' and the plurality of second-b patterns 102*b*' with the plurality of driving circuit units 310.

The control unit 300 may control a driving signal (or pen driving signal) outputted from each driving circuit unit 310 connected to the plurality of second-a patterns 102*a*' and the plurality of second-b patterns 102*b*'. The control unit 300 may control opposite pulse signals to be outputted from two random driving circuit units among the plurality of driving circuit units 310 electrically connected to the plurality of second-a patterns 102*a*' and the plurality of second-b patterns 102*b*'. Thus, the control unit 300 may variously change and set a size and a position of the current loop.

In the stylus sensing mode (or stylus downlink mode), the control unit 300 may electrically connect the plurality of sensing circuit units 330 for stylus sensing to the plurality of first patterns 101A' and the plurality of third patterns 103A' of the sensor unit 100A'. The control unit 300 may control a plurality of switches to electrically connect the conductive patterns connected to the plurality of first patterns 101A' and the plurality of third patterns 103A with the plurality of sensing circuit units 330.

The touch input device 500' in FIG. 29 is different from the touch input device in FIG. 24 in configuration of the plurality of first and second patterns 101A' and 102A' of the sensor unit 100A'. That is, since the plurality of first and second patterns 101A' and 102A' are obtained by dividing the first and second patterns 101A and 102A of FIG. 24 into half, the number of the plurality of first and second patterns 101A' and 103A' is two times greater than that of the first and second patterns 101A and 102A of FIG. 24.

This configuration feature has a disadvantage in that the number of channels of the touch input device 500' in FIG. 29 increases compared to the touch input device 500 in FIG. 24, but has an advantage of reducing power consumption because the pen driving signal is applied only to a specific portion at which the stylus pen is disposed in the antenna mode for driving the stylus pen.

The touch input device in FIG. 29 has a disadvantage in that the number of channels slightly increases compared to the touch input device in FIG. 24, but has an advantage in that an operating frequency bandwidth of each of the touch driving signal applied to the touch driving electrode and the pen driving signal for driving the stylus pen is widened by reducing a resistance value and a capacitance value of the sensor unit 100' because a length of each of the first pattern 101' and the second pattern 102' is reduced by half.

Figure 30:
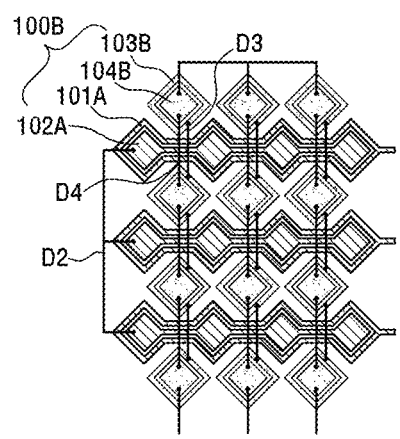
FIG. 30 is a schematic view illustrating a sensor unit according to a modified example, which may replace the sensor unit according to the above-described various embodiments.

FIG. 30 is a schematic view illustrating a modified example of the sensor units 100 and 100' in FIG. 16 or 19.

A sensor unit 100B in FIG. 30 may be used as the above-described sensor units of the touch input devices according to various embodiments of the present invention. Hereinafter, a specific structure and shape of the sensor unit 100B will be described, and a description on a method for driving a touch input device including the sensor unit 100B will be replaced by the above-described features.

Referring to FIG. 30, the sensor unit 100B includes a plurality of first to fourth patterns 101A, 102A, 103B, and 104B. The plurality of first to fourth patterns 101A, 102A, 103B, and 104B are arranged together on the same layer.

The first pattern 101A has a shape extending in a first direction (width direction). The first direction may be a major axis direction of the screen of the touch input device. The first pattern 101A may also be referred to as Active TX (ATX). The first pattern 101A has a predetermined shape in which an electrical path is formed along the first direction (width direction).

The first pattern 101A may includes a plurality of main pattern parts and a connection pattern part connecting two adjacent main pattern parts among the plurality of main pattern parts. Here, although the main pattern part may have a diamond shape, the embodiment of the present invention is not limited thereto. For example, the main pattern part may have various shapes that are different from that of the connection pattern part.

The first pattern 101A may have an opening in which the second pattern 102A is disposed. The opening may have a shape corresponding to an outer shape of the first pattern 101A. The first pattern 101A may have a structure surrounding the second pattern 102A. The first pattern 101A is spaced a predetermined distance from the second pattern 102A.

The second pattern 102A has a shape extending in the first direction, is disposed adjacent to the first pattern 101A, and is spaced a predetermined distance from the first pattern 101A. The second pattern 102A may also be referred to as Dummy TX (DTX). The second pattern 102A may be disposed adjacent to the first pattern 101A and have a predetermined shape in which an electrical path is formed along the first direction (width direction).

The second pattern 102A is disposed in the first pattern 101A.

The second pattern 102A may includes a plurality of main pattern parts and a connection pattern part connecting two adjacent main pattern parts among the plurality of main pattern parts. Here, although the main pattern part may have a diamond shape, the embodiment of the present invention is not limited thereto. For example, the main pattern part may have various shapes that are different from that of the connection pattern part.

The main pattern part of the second pattern 102A may have a shape corresponding to that of the main pattern part of the first pattern 101A, and the connection pattern part of the second pattern 102A may have a shape corresponding to that of the connection pattern part of the first pattern 101A.

The other ends (second ends) of the plurality of second patterns 102A are electrically connected to each other by a second conductive pattern.

The third pattern 103B is disposed on each of upper and lower portions based on one connection pattern part of the first pattern 101A. Here, although the third pattern 103B may have a diamond shape, the embodiment of the present invention is not limited thereto. For example, the third pattern 103B may have various shapes that are different from that of the connection pattern part. The third pattern 103B may have an opening in which the fourth pattern 104B is disposed. The opening may have a shape corresponding to an outer shape of the third pattern 103B. The third pattern 103B may have a structure surrounding the fourth pattern 104B. The third pattern 103B is spaced a predetermined distance from the fourth pattern 104B. The third pattern 103B may also be referred to as Active RX (ARX), and the fourth pattern 104B may also be referred to as Dummy RX (DRX).

The third patterns arranged along the second direction perpendicular to the first direction among the plurality of third patterns 103B are electrically connected by a third conductive pattern D3. Thus, the third patterns arranged along the second direction may be electrically connected by a plurality of third conductive patterns D3 and equal to a electrical connection direction (electrical path) of the third pattern 103 in FIG. 16 or 19.

The third conductive pattern D3 is arranged so as to cross the connection pattern part of the first pattern 101A disposed between two adjacent third patterns. The third conductive pattern D3 may also be referred to a conducive bridge. Both ends of the third conductive pattern D3 are connected to a via connected to the third pattern 103B.

The fourth patterns arranged along the second direction perpendicular to the first direction among the plurality of fourth patterns 104B are electrically connected by a fourth conductive pattern D4. Accordingly, the fourth patterns arranged along the second direction may be electrically connected by a plurality of fourth conductive patterns D4 and equal to a electrical connection direction (electrical path) of the fourth pattern 104 in FIG. 16 or 19.

The fourth conductive pattern D4 is arranged so as to cross the connection pattern part of the first pattern 101A disposed between two adjacent fourth patterns. Also, the fourth conductive pattern D4 is disposed farthest from the control unit among the plurality of fourth patterns 104B and electrically connect the fourth patterns 104B arranged in the first direction. The fourth conductive pattern D4 may also be referred to a conducive bridge. Both ends of the fourth conductive pattern D4 are connected to a via connected to the fourth pattern 104B.

The plurality of first to fourth patterns 101A, 102A, 103B, and 104B may be disposed on the same first layer, and the second to fourth conductive patterns D2, D3, and D4 may be disposed on the same second layer. Here, the first layer and the second layer are physically and electrically spaced apart from each other.

Figure 31:
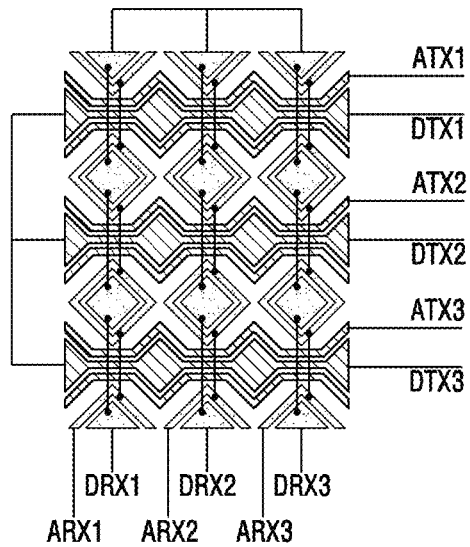
FIG. 31 is a modified example of the sensor unit in FIG. 30.

FIG. 31 is a view illustrating a modified example of the sensor unit in FIG. 30.

Referring to FIG. 31, in a sensor unit, first-1 pattern parts disposed on a first end and/or a second end of the plurality of first-1 pattern parts have a shape opened in the first direction (or horizontal direction). Thus, first-2 pattern parts disposed on the first end and/or the second end of the plurality of first-2 pattern parts may be exposed to the outside.

The first-2 pattern parts disposed on the second end of the plurality of first-2 pattern parts are electrically connected to each other through the connection pattern without the via. Here, the connection pattern may be a conductive trace. When compared with FIG. 30, the first-2 pattern parts disposed on the second end of the plurality of first-2 pattern parts may be disposed on the same layer as the connection pattern instead of being connected through the via.

Also, in the sensor unit, second-1 pattern parts disposed on a first end and/or a second end of the plurality of second-1 pattern parts have a shape opened in the second direction (or vertical direction). Thus, second-2 pattern parts disposed on a first end and/or a second end of the plurality of second-2 pattern parts may be exposed to the outside.

The second-2 pattern parts disposed on the second end of the plurality of second-2 pattern parts are electrically connected to each other through the connection pattern without a via. Here, the connection pattern may be a conductive trace. When compared with FIG. 30, the second-2 pattern parts disposed on the second end of the plurality of second-2 pattern parts may be disposed on the same layer as the connection pattern instead of being connected through the via.

The sensor unit in FIG. 31 may be controlled by the control unit 300 and driven in one of the touch sensing mode, the antenna driving mode, and the stylus sensing mode. Specifically, in case of the touch sensing mode, the control unit 300 may control the touch driving signal to be applied to ATX1, ATX2, and ATX3 and sense a touch position by receiving a touch receiving signal from ARX1, ARX2, and ARX3. In case of the antenna driving mode, the control unit 300 may apply the pen driving signal to DTX1, DTX2, and DTX3 or DRX1, DRX2, and DRX3. In case of the stylus sensing mode, the control unit 300 may sense the position of the stylus pen by receiving the pen receiving signal from ATX1, ATX2, and ATX3 and ARX1, ARX2, and ARX3. Also, the various combinations of the <table 2> may be applied to the sensor unit 200' of FIG. 31. Thus, the sensor unit of FIG. 31 may be driven in one of the touch sensing mode, the antenna driving mode, and the stylus sensing mode through various methods by the control unit 300.

Figure 32:
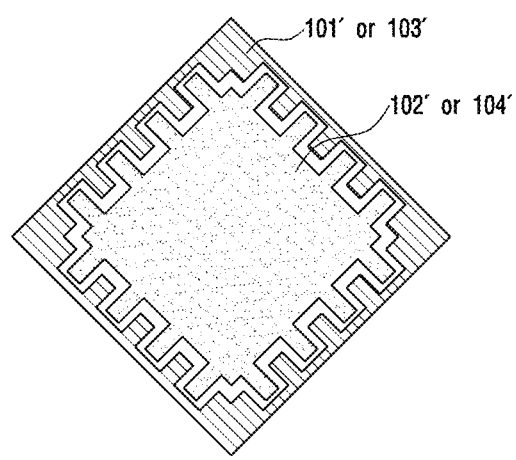
FIG. 32 is a modified example of the sensor unit according to the above-described various embodiments.

FIG. 32 is a view illustrating another modified example of the sensor unit.

Referring to FIG. 32, a structure of a main pattern part of each of first to fourth pattern parts 101', 102', 103', and 104' is different from those of FIG. 24.

In FIG. 32, the second pattern 102' or the fourth pattern 104' has an external shape of an uneven structure, and an opening of the first pattern 101' or the fourth pattern 104' has a shape corresponding to the external structure of the second pattern 102' or the fourth pattern 104'.

This structure may improve a mutual capacitance value Cm between the first pattern 101' and the second pattern 102' on the same layer and a mutual capacitance value Cm between the third pattern 103' and the fourth pattern 104' on the same layer. As the mutual capacitance Cm is improved, a voltage value outputted from the sensing circuit unit of the control unit 300 in the stylus sensing mode may increase. Thus, stylus sensing sensitivity may be improved.

Here, the modified example in FIG. 32 may be directly applied to the sensor units according to the above-described various embodiments.

Figure 33:
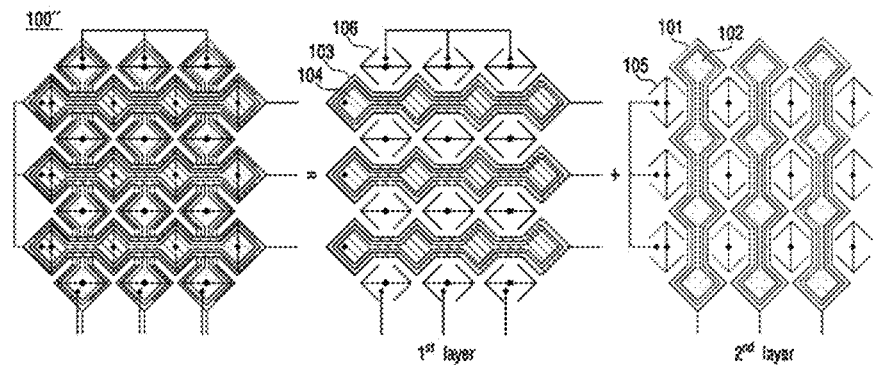
FIG. 33 is a modified example of the sensor unit according to the above-described various embodiments.

FIG. 33 is another modified example of the sensor unit.

When compared with the sensor unit 100A in FIG. 24, a sensor unit 100" in FIG. 33 further includes a plurality of fifth patterns 105 and a plurality of sixth patterns 106.

The plurality of fifth patterns 105 are disposed on the same layer (2nd layer) as the plurality of first patterns 101 and arranged in the first direction and the second direction.

Each of the fifth patterns 105 has a shape corresponding and overlapping a portion of a main pattern part of the third pattern 103 disposed on another layer ($1^{st}$ layer). Also, the fifth pattern 105 is electrically connected through the via and the fourth pattern 104 disposed on another layer ($1^{st}$ layer).

The plurality of fifth patterns 105 and the plurality of third patterns 103 may form the mutual capacitance Cm in the vertical direction. Also, since the fifth pattern 105 is electrically connected to the fourth pattern 104 in the third pattern 103, the third pattern 103 may form the mutual capacitance Cm with the fifth pattern 105 in addition to the fourth pattern 104.

The plurality of sixth patterns 106 are disposed on the same layer (first layer) as the plurality of third patterns 103 and arranged in the first direction and the second direction.

Each of the sixth patterns 106 has a shape corresponding and overlapping a portion of the main pattern part of the first pattern 101 disposed on another layer (second layer). Also, the sixth pattern 106 is electrically connected through the via and the second pattern 102 disposed on another layer (second layer).

The plurality of sixth patterns 106 and the plurality of first patterns 101 may form the mutual capacitance Cm in the vertical direction. Also, since the sixth pattern 106 is electrically connected to the second pattern 102 in the first pattern 101, the first pattern 101 may form the mutual capacitance Cm with the sixth pattern 106 in addition to the second pattern 102.

As described above, the sensor unit 100" in FIG. 33 may form the mutual capacitance in the vertical direction as well as the horizontal direction of the first pattern 101 and the mutual capacitance in the vertical direction as well as the horizontal direction of the third pattern 103. Thus, in the stylus sensing mode, the voltage value outputted from the sensing circuit unit of the control unit 300 may increase to improve the stylus sensing sensitivity.

Here, the modified example in FIG. 33 may be directly applied to the sensor units according to the above-described various embodiments.

Figure 34:
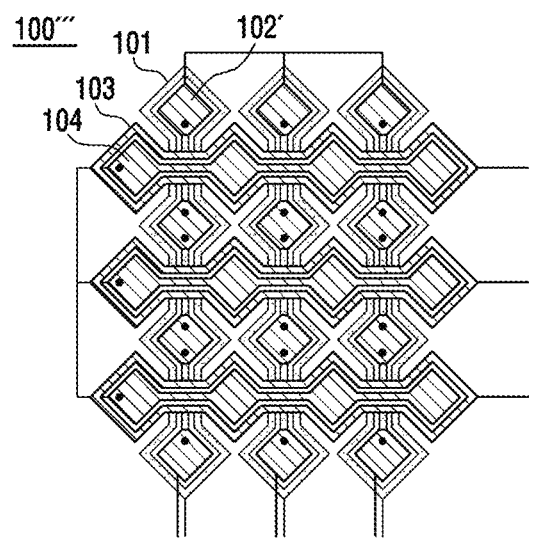
FIG. 34 is a modified example of the sensor unit according to the above-described various embodiments.

FIG. 34 is a view illustrating another modified example of the sensor unit.

When compared with the sensor unit 100A in FIG. 24, in a sensor unit 100''' of FIG. 34, a portion of a second pattern 102' is disposed on a different layer from the rest portion. Specifically, the second pattern 102' includes a plurality of main pattern parts and a connection pattern part connecting two adjacent main pattern parts of the plurality of main pattern parts, and the plurality of main pattern parts of the second pattern 102' are disposed on a different layer from the plurality of connection pattern parts of the second pattern 102'.

The plurality of main pattern parts of the second pattern 102' are disposed on the same layer as the third pattern 103 and the fourth pattern 104, and the plurality of connection pattern parts of the second pattern 102' are disposed on the same layer as the first pattern 100 as with FIG. 24.

The sensor unit 100''' in FIG. 34 may be also driven in the touch sensing mode, the antenna driving mode, and the stylus sensing mode by the control unit 300 as with the sensor unit 100A in FIG. 24. Also, the various combinations of the <table 2> may be applied to the sensor unit 100''' of FIG. 34. Thus, the sensor unit 100''' of FIG. 34 may be driven in one of the touch sensing mode, the antenna driving mode, and the stylus sensing mode through various methods by the control unit 300.

Figure 35:
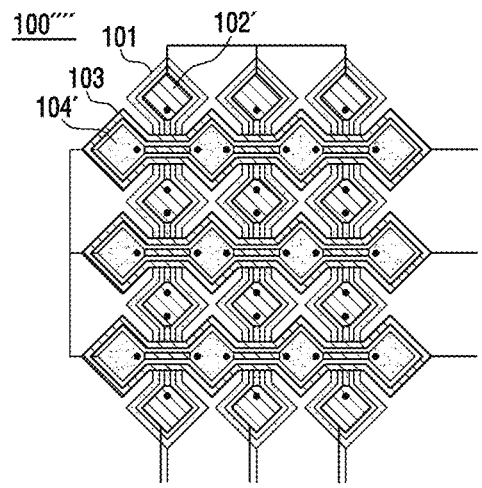
FIG. 35 is a modified example of the sensor unit according to the above-described various embodiments.

FIG. 35 is a view illustrating another modified example of the sensor unit.

When compared with the sensor unit 100''' in FIG. 34, in a sensor unit 100'''' in FIG. 35, a portion of a fourth pattern 104' is disposed on a different layer from the rest portion. Specifically, the fourth pattern 104' includes a plurality of main pattern parts and a connection pattern part connecting two adjacent main pattern parts of the plurality of main pattern parts, and the plurality of main pattern parts of the fourth pattern 104' are disposed on a different layer from the plurality of connection pattern parts of the fourth pattern 104'. The plurality of main pattern parts of the fourth pattern 104' are disposed on the same layer as the first pattern 101, and the plurality of connection pattern parts of the fourth pattern 104' are disposed on the same layer as the plurality of main pattern parts of the second pattern 102' and the third pattern 103.

In summary, in the sensor unit 100'''' in FIG. 35, the first pattern 101, the plurality of connection pattern part of the second pattern 102, and the plurality of main pattern parts of the fourth pattern 104' are disposed on the first layer, and the third pattern 103, the plurality of connection pattern part of the fourth pattern 104', and the plurality of main pattern part of the second pattern 102' are disposed on the second layer. Here, the first layer and the second layer are different from each other, and a position relationship is that one is disposed on the other.

The sensor unit 100'''' in FIG. 35 may be also driven in the touch sensing mode, the antenna driving mode, and the stylus sensing mode by the control unit 300 as with the sensor unit 100A in FIG. 24. Also, the various combinations of the <table 2> may be applied to the sensor unit 100'''' of FIG. 35. Thus, the sensor unit 100'''' of FIG. 35 may be driven in one of the touch sensing mode, the antenna driving mode, and the stylus sensing mode through various methods by the control unit 300.

Figure 36:
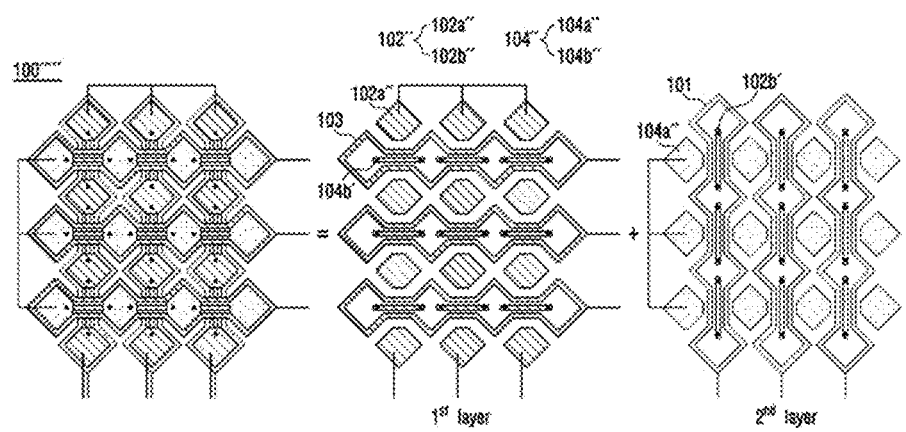
FIG. 36 is a modified example of the sensor unit according to the above-described various embodiments.

FIG. 36 is a view illustrating another modified example of the sensor unit.

A sensor unit 100''''' in FIG. 36 is a modified from the sensor unit 100'''' in FIG. 35. When compared with the sensor unit 100'''' in FIG. 35, the sensor unit 100''''' in FIG. 36 is different in a second pattern 102'' and a fourth pattern 104''.

Specifically, the second pattern 102'' includes a plurality of main pattern parts 102a'' and a plurality of connection pattern parts 102b', and the main pattern part 102a'' has a size greater than that the main pattern part of the second pattern 102' of the sensor unit 100'''' in FIG. 35. The main pattern part 102a'' may have a size and a shape corresponding to those of the main pattern part of the first pattern 101.

Also, the fourth pattern 104'' includes a plurality of main pattern parts 104a'' and a plurality of connection pattern parts 104b', and the main pattern part 104a'' has a size greater than that of the main pattern part of the fourth pattern 104' of the sensor unit 100'''' in FIG. 35. The main pattern part 104a'' may have a size and a shape corresponding to those of the main pattern part of the third pattern 103.

Since the main pattern part 102a'' of the second pattern 102'' has a size greater than that of the main pattern part of the second pattern 102' in FIG. 35, an area corresponding to the first pattern 101 may increase to further improve the mutual capacitance Cm between the second pattern 102'' and the first pattern 101. Thus, the stylus sensing sensitivity may be further improved in the stylus sensing mode.

Since the main pattern part 104a'' of the fourth pattern 104'' has a size greater than that of the main pattern part of the fourth pattern 104' in FIG. 35, an area corresponding to the third pattern 103 may increase to further improve the mutual capacitance Cm between the fourth pattern 104'' and the third pattern 103. Thus, the stylus sensing sensitivity may be further improved in the stylus sensing mode.

Figure 37:
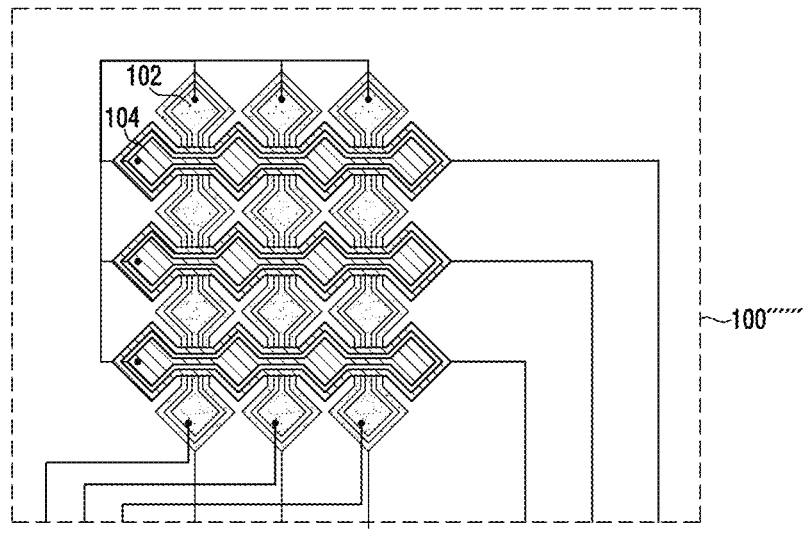
FIG. 37 is a modified example of the sensor unit according to the above-described various embodiments.

FIG. 37 is a view illustrating another modified example of the sensor unit.

When compared with the sensor unit 100A in FIG. 24, a sensor unit 100'''''' in FIG. 37 is different in that the other ends (second ends) of the plurality of second patterns 102 are electrically connected to the other ends (second ends) of the plurality of fourth patterns 104.

This configuration has an advantage of reducing an impedance because the plurality of second patterns 102 as well as other fourth patterns are electrically connected to one fourth pattern 104 when the sensor unit 100' is driven in the stylus sensing mode.

The sensor unit 100'''''' in FIG. 37 may be also driven in the touch sensing mode, the antenna driving mode, and the stylus sensing mode by the control unit 300 as with the sensor unit 100A in FIG. 24. Also, the various combinations of the <table 2> may be applied to the sensor unit 100'''''' of FIG. 37. Thus, the sensor unit 100'''''' of FIG. 37 may be driven in one of the touch sensing mode, the antenna driving mode, and the stylus sensing mode through various methods by the control unit 300.

Figure 38:
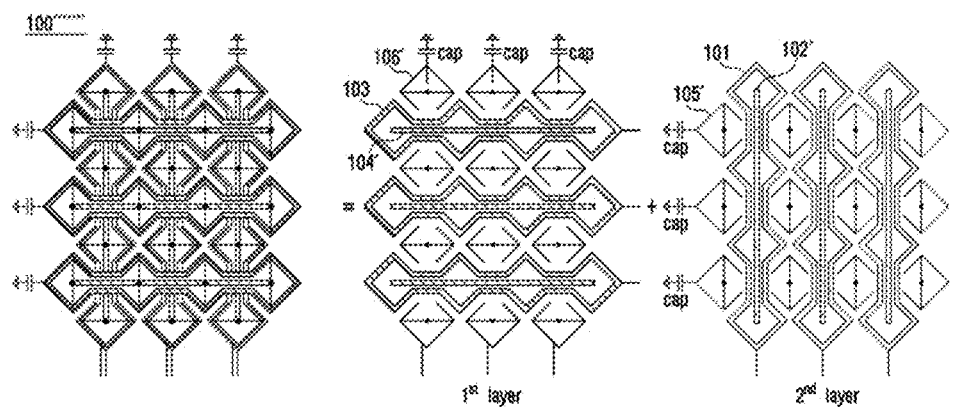
FIG. 38 is a modified example of the sensor unit according to the above-described various embodiments.

FIG. 38 is a view illustrating another modified example of the sensor unit.

When compared with the sensor unit 100A in FIG. 24, a sensor unit 100''''''' in FIG. 38 is different in a second pattern 102' and a fourth pattern 104' and further includes a plurality of fifth patterns 105', a plurality of sixth patterns 106', and a capacitor cap electrically connected to the fifth patterns 105' and the sixth patterns 106'. Since the rest components are the same as each other, different portions will be described in detail below.

The second pattern 102' may be a bar pattern disposed in the first pattern 101 and extending in the second direction. Here, the second pattern 102' may have a constant width. The second pattern 102' is disposed on the same layer ($2^{nd}$ layer) as the first pattern 101.

The fourth pattern 104' may be a bar pattern disposed in the third pattern 103 and extending in the first direction. Here, the fourth pattern 104' may have a constant width. The fourth pattern 104' is disposed on the same layer ($1^{st}$ layer) as the third pattern 103.

The plurality of fifth patterns 105' are disposed on the same layer ($2^{nd}$ layer) as the plurality of first patterns 101 and arranged in the first direction and the second direction. The plurality of fifth patterns 105' may be arranged between the plurality of first patterns 101.

Each of the fifth patterns 105' has a shape corresponding to and overlapping a main pattern part of the third pattern 103 disposed on a different layer ($1^{st}$ layer). Also, the fifth pattern 105' is electrically connected through the via and the fourth pattern 104' disposed on another layer (1$^{st}$ layer).

The fifth patterns 105' electrically connected to one fourth pattern 104' among the plurality of fifth patterns 105' are arranged in the second direction. Here, a predetermined capacitor cap is connected to the fifth pattern 105' disposed at the other edge among the fifth patterns 105' arranged in the second direction. Also, the capacitor cap may be grounded. Here, the fifth pattern 105' disposed at the other edge among the fifth patterns 105' arranged in the second direction represents a pattern electrically connected to and spaced farthest from the control unit 300 in FIG. 24 Although not shown in the drawing, the capacitor cap may be connected between the fifth pattern 105' and ELVSS of a display panel (not shown). Also, the capacitor cap may have one end connected to the fifth pattern 105' and the other end connected to another layer (1$^{st}$ layer) on which the third pattern 103, the fourth pattern 104', and sixth pattern 106' are disposed.

The plurality of fifth patterns 105' may form the mutual capacitance Cm in the vertical direction with the plurality of third patterns 103. Also, since the fifth pattern 105' is electrically connected to the fourth pattern 104' in the third pattern 103, the third pattern 103 may form the mutual capacitance Cm with the fifth pattern 105' in addition to the fourth pattern 104'.

The plurality of sixth patterns 106' are disposed on the same layer (1$^{st}$ layer) as the plurality of third patterns 103 and arranged in the first direction and the second direction. The plurality of sixth patterns 106' may be arranged between the plurality of third patterns 103.

Each of the sixth patterns 106 has a shape corresponding to and overlapping the main pattern part of the first pattern 101 disposed on another layer (2$^{nd}$ layer). Also, the sixth pattern 106' is electrically connected through the via and the second pattern 102' disposed on another layer (2$^{nd}$ layer).

The sixth patterns 106' electrically connected to one second pattern 102' among the plurality of sixth patterns 106' are arranged in the first direction. Here, a predetermined capacitor cap is connected to the sixth pattern 106' disposed at the other edge among the sixth patterns 106' arranged in the first direction. Also, the capacitor cap may be grounded. Here, the sixth pattern 106' disposed at the other edge among the sixth patterns 106' arranged in the first direction represents a pattern electrically connected to and spaced farthest from the control unit 300 in FIG. 24 Although not shown in the drawing, the capacitor cap may be connected between the sixth pattern 106' and the ELVSS of the display panel (not shown). Also, the capacitor cap may have one end connected to the sixth pattern 106' and the other end connected to another layer (2$^{nd}$ layer) on which the third pattern 101, the second pattern 102', and the fifth pattern 105' are disposed.

The plurality of sixth patterns 106' may form the mutual capacitance Cm in the vertical direction with the plurality of first patterns 101. Also, since the sixth pattern 106' is electrically connected to the second pattern 102' in the first pattern 101, the first pattern 101 may form the mutual capacitance Cm with the sixth pattern 106' in addition to the second pattern 102'.

As described above, the sensor unit 100'''''' in FIG. 38 may form the mutual capacitance in the vertical direction as well as the horizontal direction of the first pattern 101 and the mutual capacitance in the vertical direction as well as the horizontal direction of the third pattern 103. Thus, in the stylus sensing mode, the voltage value outputted from the sensing circuit unit of the control unit 300 may increase to improve the stylus sensing sensitivity.

Since each of the second pattern 102' and the fourth pattern 104' does not have a diamond-shaped main pattern part unlike the second pattern 102 and the fourth pattern 104 of the sensor unit 100A of FIG. 24, when the display panel is disposed below the sensor unit 100'''''', visibility may be further improved in comparison with the sensor unit 100A of FIG. 24.

The sensor unit 100'''''' in FIG. 38 may be also driven in the touch sensing mode, the antenna driving mode, and the stylus sensing mode by the control unit 300 as with the sensor unit 100A in FIG. 24. Also, the various combinations of the <table 2> may be applied to the sensor unit 100'''''' of FIG. 38. Thus, the sensor unit 100'''''' of FIG. 38 may be driven in one of the touch sensing mode, the antenna driving mode, and the stylus sensing mode through various methods by the control unit 300.

Although not shown in the drawing, the capacitor cap may be electrically connected to the other ends of the plurality of second and fourth patterns 102 and 104 without the fifth and sixth patterns 105' and 106'. Furthermore, in the above-described sensor units according to various embodiments, the other ends of the plurality of second and fourth patterns may be connected to the capacitor instead of being connected to each other.

Figure 39:
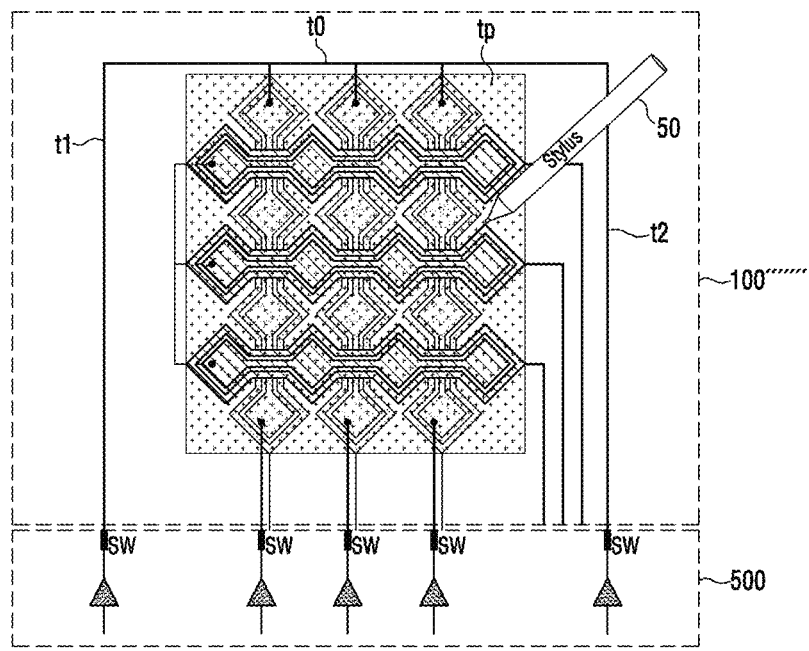
FIG. 39 is a modified example of the sensor unit according to the above-described various embodiments.

FIG. 39 is a view illustrating another modified example of the sensor unit.

In case of the sensor unit 100A of FIG. 24, when the stylus pen 10 is disposed on a right edge (or left edge) of the sensor unit 100A, the stylus pen 10 may not provide a sufficient magnetic field, and a magnitude of a signal emitted from the stylus pen 10 is not large enough. In order to solve the above-described problem, a sensor unit 100'''''' in FIG. 39 further includes a first trace t1 and a second trace t2 in comparison with the sensor unit 100A in FIG. 24.

The first trace t1 and the second trace t2 are directly connected to a conductive trace t0 electrically connecting the other end of the plurality of second patterns 102 to each other and disposed on a non-active area outside an active area tp (or touch area) of the touch input device. Here, at least a portion of the conductive trace t0 may be disposed outside the active area tp. The active area tp represents an area that is directly touched by an object, e.g., a finger or the stylus pen 10, and the non-active area is disposed around the active area tp. The non-active area may be, e.g., a bezel area.

Specifically, the first trace t1 may be disposed on the non-active area outside the active area tp, and have one end directly connected to the conductive trace to and the other end connected to the driving circuit unit of the control unit 300 through a switch sw in one of the touch driving mode, the touch sensing mode, the antenna driving mode, and the stylus sensing mode.

The second trace t2 may be disposed on the non-active area outside the active area tp and have one end directly connected to the conductive trace to and the other end connected to the driving circuit unit of the control unit 300 through a switch sw in the antenna driving mode.

The first trace t1 may be disposed on the non-active area while surrounding one side of both left and right sides of the active area tp, and the second trace t2 may be disposed on the non-active area while surrounding the other side of the active area tp.

Although the stylus pen 10 is disposed at one edge of the active area tp when the first trace t1, the second trace t2, and the sensor unit 100'''''' are driven in the antenna driving mode as with FIG. 25, the stylus pen may provide a sufficient magnetic field signal. Thus, in the touch input device including the sensor unit 100''''''' in FIG. 39, the stylus pen 10 may receive a sufficient magnetic field signal and emit a sufficient signal although the stylus pen 10 is disposed on any portion of the active area tp.

Each of the first and second traces t1 and t2 of the sensor unit 100''''''' in FIG. 39 may correspond to one channel in FIG. 25, and the driving method such as that in FIG. 25 may be directly used.

The sensor unit 100''''''' in FIG. 39 may be also driven in the touch sensing mode, the antenna driving mode, and the stylus sensing mode by the control unit 300 as with the sensor unit 100A in FIG. 24. Also, the various combinations of the <table 2> may be applied to the sensor unit 100''''''' of FIG. 39. Thus, the sensor unit 100''''''' of FIG. 39 may be driven in one of the touch sensing mode, the antenna driving mode, and the stylus sensing mode through various methods by the control unit 300.

Figure 40:
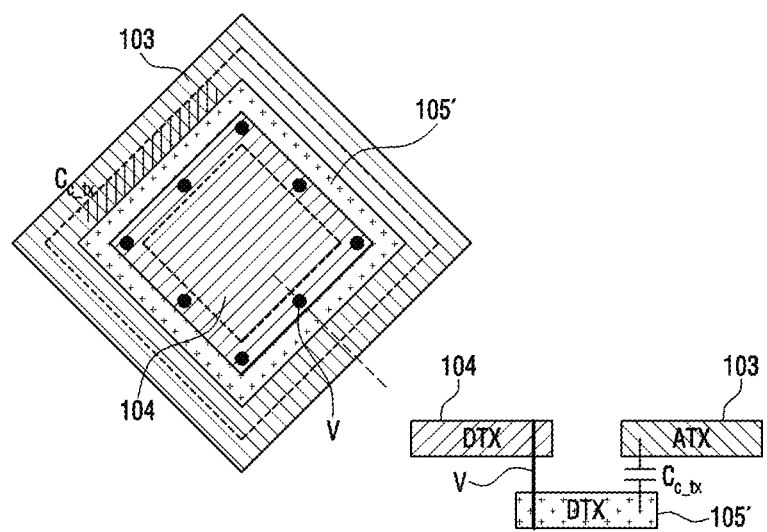
FIG. 40 is a view for explaining a first modified example of the fifth pattern 105 in FIG. 33.

FIG. 40 is a view for explaining a first modified example of the fifth pattern 105 in FIG. 33.

Referring to FIG. 40, a fifth pattern 105' is disposed on a layer different from a layer on which the third pattern 103 and the fourth pattern 104 are disposed.

The fifth pattern 105' may have a shape corresponding to the third pattern 103. For example, the fifth pattern 105' may have a diamond shape and a diamond-shaped opening therein.

The fifth pattern 105' may have one portion overlapping the third pattern 103 in the vertical direction and the other portion overlapping the fourth pattern 104 in the vertical direction. For example, an outer edge of the fifth pattern 105' may overlap an inner edge of the third pattern 103 disposed on another layer. Also, an inner edge of the fifth pattern 105' may overlap an outer edge of the fourth pattern 104 disposed on another layer.

The fifth pattern 105' is electrically connected to the fourth pattern 104 disposed on another layer through a conductive via v. Here, the via v may be provided in plurality, and a plurality of vias v may be arranged on outer edge of the fourth pattern 104.

The plurality of fifth patterns 105' may form the mutual capacitance Cm in the vertical direction with the third patterns 103 disposed on another layer. Also, since the fifth pattern 105' is electrically connected to the fourth pattern 104 in the third pattern 103 through the via v, the third pattern 103 may form a mutual capacitance Cc_tx with the fifth pattern 105' in addition to the fourth pattern 104.

Although not shown in the drawing, the sixth pattern 106 in FIG. 33 may have the same shape as the fifth pattern 105' in FIG. 40. Here, a sixth pattern (not shown) may have an outer edge overlapping an inner edge of the first pattern 101 disposed on another layer and an inner edge overlapping an outer edge of the second pattern 102 disposed on another layer. Also, the sixth pattern (not shown) may be electrically connected to the second pattern 102 disposed on another layer through the conductive via. Likewise, the sixth pattern (not shown) may form the mutual capacitance in the vertical direction with the first pattern 101. Since the sixth pattern (not shown) is electrically connected to the second pattern 102 in the first pattern 101, the first pattern 101 may form the mutual capacitance Cc_tx with the sixth pattern (not shown) in addition to the second pattern 102.

As described above, the sensor unit including the modified example of the fifth pattern 105' in FIG. 40 may form the mutual capacitance in the vertical direction as well as the horizontal direction of the third pattern 103, and the sensor unit including the modified example of the sixth pattern (not shown) may also form the mutual capacitance in the vertical direction as well as the horizontal direction of the first pattern 101. Thus, in the stylus sensing mode, the voltage value outputted from the sensing circuit unit of the control unit may increase to improve the stylus sensing sensitivity.

Figure 41:
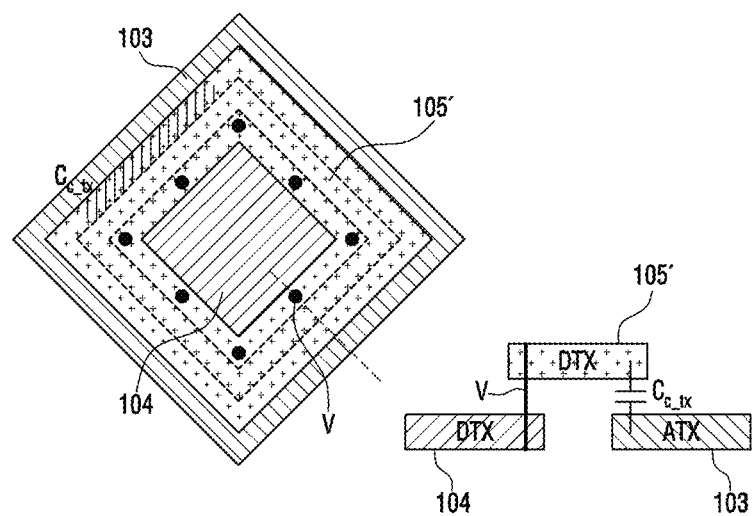
FIG. 41 is a view illustrating a modified example of FIG. 40.

FIG. 41 is a view illustrating a modified example of FIG. 40.

FIG. 40 is a view illustrating a state in which the fifth pattern 105' is disposed below the third and fourth patterns 103 and 104, and on the contrary, FIG. 41 is a view illustrating a state in which the fifth pattern 105' is disposed on the third and fourth patterns 103 and 104.

A structure of the fifth pattern 105" in FIGS. 40 and 41 may be applied to the above-described sensor units according to various embodiments.

Figure 42:
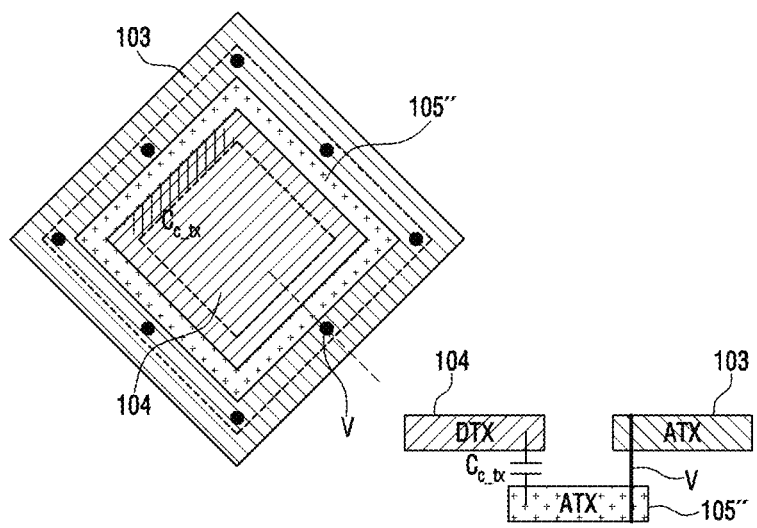
FIG. 42 is a view for explaining a modified example of the fifth pattern 105' in FIG. 40.

FIG. 42 is a view for explaining a modified example of the fifth pattern 105' in FIG. 40.

Referring to FIG. 42, a fifth pattern 105" has the same shape and position as the fifth pattern 105' in FIG. 40. The fifth pattern 105" is different from the fifth pattern 105' in FIG. 40 in that the fifth pattern 105" is electrically connected to the third pattern 103 disposed on another layer through the conductive via v. Also, the via v is disposed on an inner edge of the third pattern 103.

Since the fifth pattern 105" is electrically connected to the third pattern 103 disposed on another layer, the fourth pattern 104 may form a mutual capacitance Cc_Tx in the vertical direction with the fifth pattern 105".

Also, the sensor unit including the modified example of the fifth pattern 105" in FIG. 42 may form the mutual capacitance in the vertical direction as well as the horizontal direction.

Figure 43:
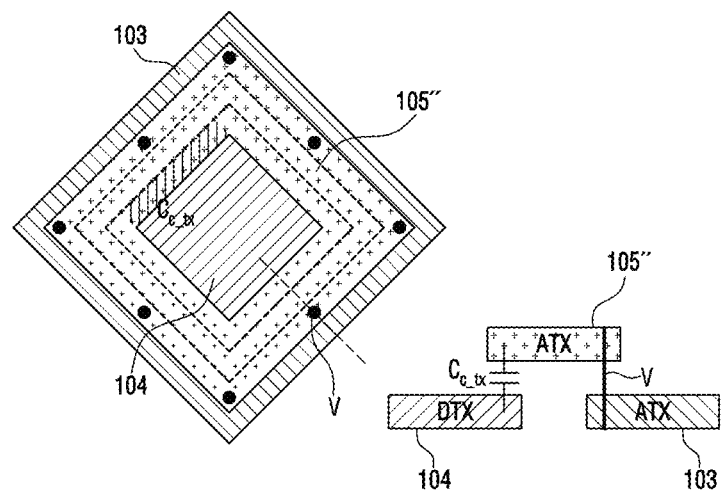
FIG. 43 is a view illustrating a modified example of FIG. 42.

FIG. 43 is a view illustrating a modified example of FIG. 42.

FIG. 42 is a view illustrating a state in which the fifth pattern 105" is disposed below the third and fourth patterns 103 and 104, and on the contrary, FIG. 43 is a view illustrating a state in which the fifth pattern 105" is disposed on the third and fourth patterns 103 and 104.

A structure of the fifth pattern 105" in FIGS. 42 and 43 may be applied to the above-described sensor units according to various embodiments.

Figure 44:
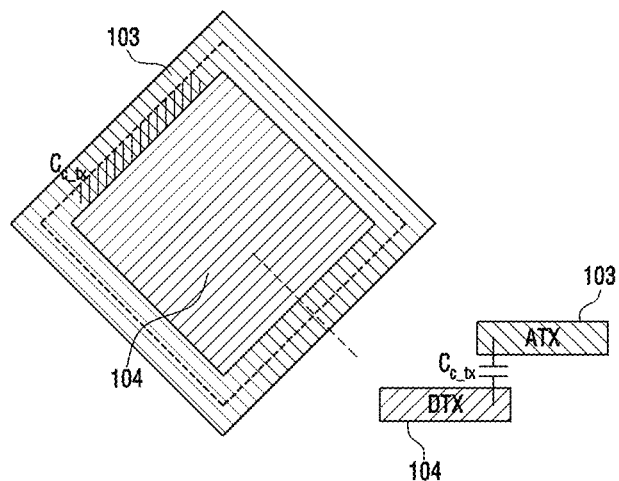
FIGS. 44 and 45 are views for explaining modified examples of the third pattern 103 and the fourth pattern 104 in the sensor unit in FIG. 34 or 35.
Figure 45:
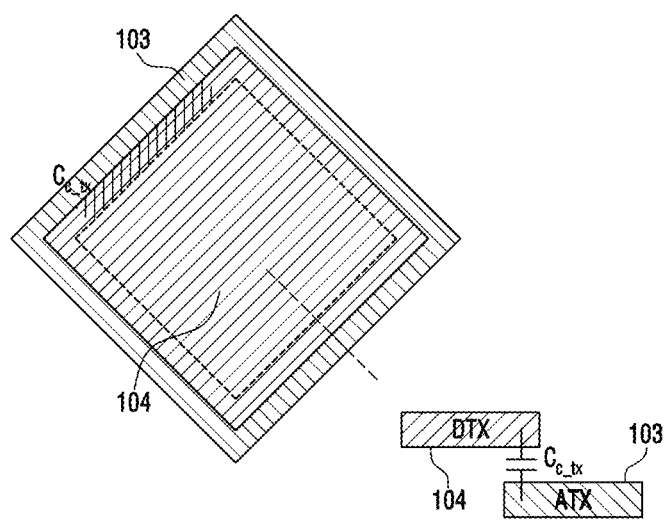

FIGS. 44 and 45 are views for explaining modified examples of the third pattern 103 and the fourth pattern 104 in the sensor unit in FIG. 34 or 35.

Referring to FIGS. 44 and 45, the third pattern 103 and the fourth pattern 104 according to a modified example are disposed on different layers, and a portion of the third pattern 103 and a portion of the fourth pattern 104 overlap each other in the vertical direction. For example, an inner edge of the third pattern 103 may overlap an outer edge of the fourth pattern 104 in the vertical direction. FIG. 44 is a view illustrating a state in which the third pattern 103 is disposed on the fourth pattern 104, and FIG. 45 is a view illustrating a state in which the third pattern 103 is disposed below the fourth pattern 104.

A sensor unit including the third and fourth patterns 103 and 104 in FIGS. 44 and 45 may form the mutual capacitance Cc_Tx in the vertical direction instead of the horizontal direction. Although not shown in the drawing, the first and second patterns 101 and 102 in FIGS. 34 and 35 may have the same structures as that in FIGS. 44 and 45

A structure according to the modified example in FIGS. 44 and 45 may be applied to the above-described various embodiments.

The touch input device according to the various embodiments in this specification may include various types of devices. The touch input device may include, e.g., a portable communication device (e.g., a smart phone), a computer device, a portable multimedia device, a portable medical device, a camera, a wearable device, or a home appliance. The touch input device according to the embodiment of this specification is not limited to the above-described devices.

According to at least one of the embodiments of the present disclosure, the sufficient output signal may be generated even with the small diameter by using the structure of the resonance circuit of the optimized stylus pen.

According to at least one of the embodiments of the present disclosure, the stylus pen that is robust against external factors may be provided.

When the touch input device according to the embodiment of the present invention is used, the position of the stylus pen may be detected while detecting the touch position and driving the stylus pen.

Also, the limitation in which the output voltage is varied according to the position of the stylus pen may be solved.

Also, when the screen of the touch input device increases to the size of the screen of the tablet PC, the bandwidth of the operating frequency of each of the touch driving signal and the pen driving signal may be widened.

Also, when the screen of the touch input device increases to the size of the screen of the tablet PC, the attenuation of the pen sensing signal may be relieved.

The present invention is not limited to the above-described effects, and better or specific effects may be exhibited for each of the embodiments described in [Detailed Description].

The various embodiments of this specification and the terms used herein are not intended to limit the technical features described in this document to specific embodiments, and should be understood to include various modifications, equivalents, or substitutions of the embodiments. When the drawings are described, like reference numerals refer to like elements throughout. The singular form of the noun corresponding to the item may include one or more items, unless the relevant context clearly describes otherwise. As used herein, each of the phrases "A or B", "at least one of A and B", "at least one of A or B," "A, B or C," "at least one of A, B, and C," and "at least one of A, B, or C" may include all possible combinations of the items listed together in the corresponding one of the phrases. Terms such as "1st", "2nd", "first", or "second" may simply be used to distinguish a component from another component, and the component is not limited in another aspect (e.g., importance or order). When one (e.g., first) component is "coupled" or "connected" to another (e.g., second) component, with or without the terms "functionally" or "communicatively", this indicates that one component may be connected to the other component directly (e.g., by wire), wirelessly, or through a third component.

As used herein, the term "module" may include a unit implemented in hardware, software, or firmware, and may be used interchangeably with terms such as, e.g., logic, logic block, component, or circuit. A module may be an integrally formed part or a minimum unit or a portion of the part that performs one or more functions. For example, according to an embodiment, the module may be implemented in the form of an application-specific integrated circuit (ASIC).

Various embodiments of the present specification may be implemented as software (e.g., a program) including one or more commands stored in a storage medium (e.g., internal memory or external memory) readable by a machine (e.g., an electronic device). For example, a processing unit (e.g., a processor) of a device (e.g., a touch input device) may call one or more commands stored from a storage medium and execute it. This makes it possible for the device to be operated to perform one or more functions depending on the called one or more commands. The one or more commands may include codes generated by a compiler or executable by an interpreter. The device-readable storage medium may be provided in the form of a non-transitory storage medium. Herein, the term 'non-transitory' only indicates that the storage medium is a tangible device and does not include a signal (e.g., electromagnetic wave), and this term does not distinguish a case in which data is stored semi-permanently in a storage medium from a case in which data is temporarily stored therein.

According to an embodiment, the method according to various embodiments disclosed in this document may be provided as being included in a computer program product. A computer program product may be traded between a seller and a buyer as a commodity. The computer program product may be distributed in the form of a machine-readable storage medium (e.g., compact disc read only memory (CD-ROM)), or may be distributed (e.g., downloaded or uploaded) via an application store (e.g., Play Store™), directly between two user devices (e.g., smart phones), or in an online manner. In the case of online distribution, at least a part of the computer program product may be at least temporarily stored or temporarily created in a machine-readable storage medium such as a memory of a server of a manufacturer, a server of an application store, or a memory of a relay server.

According to various embodiments, each component (e.g., a module or a program) of the above-described components may include a singular entry or a plurality of entities. According to various embodiments, one or more components or operations among the above-described corresponding components may be omitted, or one or more other components or operations may be added. Alternatively or additionally, a plurality of components (e.g., a module or a program) may be integrated into one component. In this case, the integrated component may perform one or more functions of each component of the plurality of components identically or similarly to being performed by the corresponding component among the plurality of components prior to the integration. According to various embodiments, operations performed by a module, program, or other component may be executed sequentially, in parallel, repeatedly, or heuristically, one or more of the operations may be executed in a different order or may be omitted, or one or more other operations may be added.

What is claimed is:

1. A pen and touch input system comprising: a touch input device comprising a sensor unit and a control unit configured to control the sensor unit; and a stylus pen configured to interact with the touch input device, wherein the sensor unit comprises:

a plurality of first patterns each extending in a first direction and having first ends electrically connected to the control unit;

a plurality of second patterns each extending in the first direction and disposed adjacent to the first patterns;

a plurality of third patterns each extending in a second direction different from the first direction and having first ends electrically connected to the control unit; and a plurality of fourth patterns each extending in the second direction and disposed adjacent to the third patterns, wherein second ends of at least a portion of the plurality of second patterns are electrically connected to each other, and second ends of at least a portion of the plurality of fourth patterns are electrically connected to each other,
wherein the stylus pen comprises:
a body unit;
a tip exposed to the outside in the body unit;
an inductor unit comprising a ferrite core disposed in the body unit and a coil wound in multiple layers around at least a portion of the ferrite core; and
a capacitor unit disposed in the body unit and electrically connected to the inductor unit to form a resonance circuit,
wherein the control unit applies a touch driving signal to the plurality of first patterns and receives a touch sensing signal from the third patterns, and
the control unit applies a stylus pen driving signal to at least one of the plurality of first to fourth patterns and receives a stylus pen sensing signal from at least one of the plurality of first to fourth patterns.

2. The pen and touch input system of claim 1, wherein the ferrite core has a dielectric constant of 1000 or less, the coil is formed such that adjacent winding layers are alternately wound, and the coil is a wire that surrounds two or more insulated wires.

3. The pen and touch input system of claim 1, wherein the coil is formed such that adjacent winding layers are wound in an inclined zigzag pattern.

4. The pen and touch input system of claim 1, wherein the ferrite core comprises nickel.

5. The pen and touch input system of claim 1, wherein the coil is a litz wire.

6. The pen and touch input system of claim 1, further comprising a bobbin that surrounds at least a portion of the ferrite core,
wherein the coil is wound around at least a portion of the bobbin.

7. The pen and touch input system of claim 1, wherein the inductor unit is formed such that two or more inductor units are connected in series.

8. The pen and touch input system of claim 7, further comprising a conductive blocking member disposed on at least a portion of the inductor unit.

9. The pen and touch input system of claim 8, wherein the blocking member comprises one slit configured to block generation of an eddy current,
both ends of the blocking member are spaced apart from each other in the first direction by the one slit, and
the first direction is a direction in which the eddy current is formed.

10. The pen and touch input system of claim 1, wherein at least one of the second pattern or the fourth pattern is used to apply the stylus pen driving signal for driving the stylus pen.

11. The pen and touch input system of claim 1, wherein the stylus pen driving signal for driving the stylus pen is applied through a pattern different from a pattern for applying the touch driving signal and a pattern for receiving the touch sensing signal.

12. The pen and touch input system of claim 1, wherein one of the second pattern or the fourth pattern is electrically floated.

13. The pen and touch input system of claim 1, wherein among at least one plurality of patterns of the plurality of second patterns or the plurality of fourth patterns for applying the stylus pen driving signal, first ends of at least two patterns are electrically connected to each other.

14. The pen and touch input system of claim 1, wherein at least one of the second pattern or the fourth pattern is used to receive the stylus pen sensing signal for sensing the stylus pen.

15. The pen and touch input system of claim 1, wherein the stylus pen sensing signal for sensing the stylus pen is received through a pattern different from a pattern for applying the touch driving signal and a pattern for receiving the touch sensing signal.

16. The pen and touch input system of claim 1, wherein at least one of the first pattern or the third pattern is used to apply the stylus pen driving signal for driving the stylus pen.

17. The pen and touch input system of claim 1, wherein the stylus pen sensing signal for sensing the stylus pen is received through the same pattern as a pattern for applying the touch driving signal or a pattern for receiving the touch sensing signal.

18. The pen and touch input system of claim 1, wherein each of the first pattern and the second pattern has a length greater than that of each of the third pattern and the fourth pattern.

19. The pen and touch input system of claim 1, wherein at least one of the first to fourth patterns is used to apply the stylus pen driving signal for driving the stylus pen and sense the stylus pen driving signal.

20. The pen and touch input system of claim 1, wherein the first pattern comprises first-a patterns and first-b patterns arranged in the first direction,
the second pattern comprises second-a patterns and second-b patterns arranged in the first direction,
second ends of at least a portion of the plurality of second-a patterns are electrically connected to each other,
second ends of at least a portion of the plurality of second-b patterns are electrically connected to each other, and
the second ends of at least a portion of the plurality of second-a patterns face the second ends of at least a portion of the plurality of second-b patterns.

21. The pen and touch input system of claim 20, wherein each of the first pattern and the second pattern has a length greater than that of each of the third pattern and the fourth pattern.

22. The pen and touch input system of claim 1, wherein at least one of the first pattern to fourth pattern comprises a plurality of main pattern parts and a connection pattern part configured to connect two adjacent main pattern parts among the plurality of main pattern parts.

23. The pen and touch input system of claim 22, wherein at least a portion of the main pattern parts has a diamond shape.

24. The pen and touch input system of claim 22, wherein the main pattern part of the second pattern has a shape corresponding to that of the main pattern part of the first pattern part, and
the main pattern part of the fourth pattern has a shape corresponding to that of the main pattern part of the third pattern part.

25. The pen and touch input system of claim 1, wherein the first pattern or the third pattern has an opening, and
the second pattern or the fourth pattern is disposed in the opening of the first pattern or the third pattern, respectively.

26. The pen and touch input system of claim 1, wherein the first pattern or the third pattern surrounds the second pattern or the fourth pattern, respectively.

27. The pen and touch input system of claim 1, wherein the first pattern and the second pattern are disposed on the same layer, or
the third pattern and the fourth pattern are disposed on the same layer.

28. The pen and touch input system of claim 1, wherein at least a portion of the first pattern and at least a portion of the second pattern are disposed on a first layer, and
at least a portion of the third pattern and at least a portion of the fourth pattern are disposed on a second layer.

29. The pen and touch input system of claim 1, wherein second ends of the plurality of second patterns and the plurality of fourth patterns are electrically connected to each other through vias.

30. The pen and touch input system of claim 1, wherein the control unit:
applies a driving signal for touch sensing to at least one first pattern of the plurality of first patterns; and
receives a sensing signal received from at least one third pattern of the plurality of third patterns.

31. The pen and touch input system of claim 30, wherein the control unit connects the plurality of second patterns or the plurality of fourth patterns to a plurality of driving circuit units.

32. The pen and touch input system of claim 1, wherein the control unit comprises a recording medium in which a program is recorded for executing:
a process of applying a driving signal for touch sensing to at least one first pattern of the plurality of first patterns; and
a process of receiving a sensing signal received from at least one third pattern among the plurality of third patterns.

33. The pen and touch input system of claim 32, wherein the control unit comprises a recording medium in which a program is recorded for executing:
a process of connecting the plurality of second patterns or the plurality of fourth patterns to a plurality of driving circuit units.

34. The pen and touch input system of claim 1, further comprising: a plurality of driving circuit units for touch sensing; and a plurality of sensing circuit units for touch sensing,
wherein the control unit controls to:
apply a driving signal for touch sensing to at least one driving pattern of the first pattern or the third pattern through the plurality of driving circuit units for touch sensing; and
receive a sensing signal for touch sensing from at least one sensing pattern of the first pattern or the third pattern through the plurality of sensing circuit units for touch sensing.

35. The pen and touch input system of claim 1, further comprising a plurality of pen driving circuit units,
wherein the control unit controls to apply the same signal as the driving signal for touch sensing to the plurality of second patterns or the plurality of fourth patterns through the plurality of pen driving circuit units.

36. The pen and touch input system of claim 1, wherein the control unit controls to output:
the stylus pen driving signal to one pen driving pattern of at least one kind of patterns of the plurality of first patterns or the plurality of fourth patterns; and
a driving signal opposite to the above driving signal to one pen driving pattern of at least the other patterns.

37. The pen and touch input system of claim 1, wherein the control unit comprises a recording medium in which a program is recorded for executing:
a process of outputting the driving signal to one pen driving pattern of at least one kind of patterns of the plurality of first patterns to the plurality of fourth patterns; and
a process of outputting a driving signal opposite to the above driving signal to one pen driving pattern of at least the other patterns.

38. The pen and touch input system of claim 1, further comprising a plurality of driving circuit units for driving the pen,
wherein the control unit controls to apply:
a driving signal to at least one driving pattern of the plurality of first to fourth patterns through at least one driving circuit unit for driving the pen of the plurality of driving circuit units for driving the pen; and
a signal opposite to the above driving signal to at least one driving pattern of the plurality of first to fourth patterns through at least another driving circuit unit for driving the pen of the plurality of driving circuit units for driving the pen.

39. The pen and touch input system of claim 1, wherein the control unit controls to sense the pen based on an output value from at least one sensing pattern of at least one kind of sensing patterns of the plurality of first to fourth patterns and an output value from at least one sensing pattern of one kind of sensing patterns different from the at least one kind of sensing patterns.

40. The pen and touch input system of claim 1, wherein the control unit comprises a recording medium in which a program is recorded for executing:
a process of sensing a pen based on an output value from at least one sensing pattern of at least one kind of sensing patterns of the plurality of first to fourth patterns and an output value from at least one sensing pattern of one kind of sensing patterns different from the at least one kind of sensing patterns.

41. The pen and touch input system of claim 1, further comprising a plurality of sensing circuit units for pen sensing,
wherein the control unit controls to sense the pen based on an output value from at least one sensing pattern of the plurality of first to fourth patterns, which is sensed through at least one sensing circuit unit for pen sensing among the plurality of sensing circuit units for pen sensing, and an output value from a sensing pattern different from the at least one pen sensing pattern, which is sensed through at least one sensing circuit unit for pen sensing among the plurality of sensing circuit units for pen sensing.

42. The pen and touch input system of claim 41, wherein at least a portion of the sensing circuit unit for pen sensing is used for touch sensing.

43. The pen and touch input system of claim 1, further comprising a capacitor connected to a pattern of the second end among the plurality of second patterns or the plurality of fourth patterns.

44. The pen and touch input system of claim 1, wherein the second pattern is a bar pattern disposed in the first pattern and extending in the first direction, and
the fourth pattern is a bar pattern disposed in the third pattern and extending in the second direction,
wherein the pen and touch input system further comprises:

a plurality of fifth patterns disposed between the plurality of first patterns, having a shape corresponding to and overlapping main pattern parts of the first patterns, and electrically connected to the fourth patterns;

a capacitor connected to patterns of second ends of the plurality of fifth patterns;

a plurality of sixth patterns disposed between the plurality of third patterns, having a shape corresponding to and overlapping the main pattern parts of the first patterns, and electrically connected to the second patterns; and a capacitor connected to patterns of second ends of the plurality of sixth patterns.

45. The pen and touch input system of claim 1, further comprising at least one trace directly connected to a portion at which the patterns disposed on the second end are electrically connected to each other and disposed outside an active area of the touch input device.

46. The pen and touch input system of claim 1, wherein the sensor unit further comprises at least one of a fifth pattern and a sixth pattern, the fifth pattern is disposed on a layer different from a layer on which one pattern of the third pattern and the fourth pattern is disposed, electrically connected to one pattern of the third pattern and the fourth pattern, and overlapping at least one portion of the other pattern of the third pattern and the fourth pattern in a vertical direction, and the sixth pattern is disposed on a layer different from a layer on which one pattern of the first pattern and the second pattern is disposed, electrically connected to one pattern of the first pattern and the second pattern, and overlapping at least one portion of the other pattern of the first pattern and the second pattern in the vertical direction.

47. The pen and touch input system of claim 1, wherein the first pattern and the second pattern are disposed on different layers, and the first pattern overlaps one portion of the second pattern in a vertical direction, or the third pattern and the fourth pattern are disposed on different layers, and the third pattern overlaps one portion of the fourth pattern in the vertical direction.

48. A pen and touch input system comprising: a touch input device comprising a sensor unit and a control unit configured to control the sensor unit; and a stylus pen configured to interact with the touch input device, wherein the sensor unit comprises:

a plurality of first patterns each extending in a first direction and having first ends electrically connected to the control unit;

a plurality of second patterns each extending in the first direction and disposed adjacent to the first patterns;

a plurality of third patterns each extending in a second direction perpendicular to the first direction and having first ends electrically connected to the control unit; and a plurality of fourth patterns each extending in the second direction and disposed adjacent to the third patterns, wherein second ends of at least a portion of the plurality of second patterns or at least a portion of the plurality of fourth patterns are electrically connected to each other, wherein the stylus pen comprises:

a body unit;

a tip exposed to the outside in the body unit;

an inductor unit comprising a ferrite core disposed in the body unit and a coil wound in multiple layers around at least a portion of the ferrite core; and a capacitor unit disposed in the body unit and electrically connected to the inductor unit to form a resonance circuit, wherein the control unit applies a touch driving signal to the plurality of first patterns and receives a touch sensing signal from the plurality of third patterns, and the control unit applies a stylus pen driving signal to at least one of the plurality of second patterns or the plurality of fourth patterns.

49. A pen and touch input system comprising: a touch input device comprising a sensor unit and a control unit configured to control the sensor unit; and a stylus pen configured to interact with the touch input device, wherein the sensor unit comprises:

a plurality of first patterns each extending in a first direction and having first ends electrically connected to the control unit;

a plurality of second patterns each extending in the first direction and disposed adjacent to the first patterns;

a plurality of third patterns each extending in a second direction different from the first direction and having first ends electrically connected to the control unit; and a plurality of fourth patterns each extending in the second direction and disposed adjacent to the third patterns, wherein second ends of at least a portion of the plurality of second patterns or at least a portion of the plurality of fourth patterns are electrically connected to each other, wherein the stylus pen comprises:

a body unit;

a tip exposed to the outside in the body unit;

an inductor unit comprising a ferrite core disposed in the body unit and a coil wound in multiple layers around at least a portion of the ferrite core; and a capacitor unit disposed in the body unit and electrically connected to the inductor unit to form a resonance circuit, wherein the control unit applies a touch driving signal to the plurality of first patterns and receives a touch sensing signal from the plurality of third patterns, and the control unit receive a stylus pen sensing signal from at least one of the plurality of second patterns or the plurality of fourth patterns.

50. A pen and touch input system comprising: a touch input device comprising a sensor unit and a control unit configured to control the sensor unit; and a stylus pen configured to interact with the touch input device, wherein the sensor unit comprises:

a plurality of first patterns each extending in a first direction and having first ends electrically connected to the control unit;

a plurality of second patterns each extending in the first direction and disposed adjacent to the first patterns;

a plurality of third patterns each extending in a second direction different from the first direction and having first ends electrically connected to the control unit; and a plurality of fourth patterns each extending in the second direction and disposed adjacent to the third patterns, wherein second ends of at least a portion of the plurality of second patterns are electrically connected to each other, and second ends of at least a portion of the plurality of fourth patterns are electrically connected to each other, wherein the stylus pen comprises:

a body unit;

a tip exposed to the outside in the body unit;

an inductor unit comprising a ferrite core disposed in the body unit and a coil wound in multiple layers around at least a portion of the ferrite core; and
a capacitor unit disposed in the body unit and electrically connected to the inductor unit to form a resonance circuit,
wherein the control unit applies a touch driving signal to the plurality of first patterns and receives a touch sensing signal from the plurality of third patterns, and
the control unit selects at least one of the plurality of first to fourth patterns as a pen driving electrode and applies a stylus pen driving signal to the selected pen driving.

51. A pen and touch input system comprising: a touch input device comprising a sensor unit and a control unit configured to control the sensor unit; and a stylus pen configured to interact with the touch input device,
wherein the sensor unit comprises:
a plurality of first patterns each extending in a first direction and having first ends electrically connected to the control unit;
a plurality of second patterns each extending in the first direction and disposed adjacent to the first patterns;
a plurality of third patterns each extending in a second direction different from the first direction and having first ends electrically connected to the control unit; and
a plurality of fourth patterns each extending in the second direction and disposed adjacent to the third patterns,
wherein second ends of at least a portion of the plurality of second patterns are electrically connected to each other, and
second ends of at least a portion of the plurality of fourth patterns are electrically connected to each other,
wherein the stylus pen comprises:
a body unit;
a tip exposed to the outside in the body unit;
an inductor unit comprising a ferrite core disposed in the body unit and a coil wound in multiple layers around at least a portion of the ferrite core; and
a capacitor unit disposed in the body unit and electrically connected to the inductor unit to form a resonance circuit,
wherein the control unit applies a touch driving signal to the plurality of first patterns and receives a touch sensing signal from the plurality of third patterns, and
the control unit selects at least two of the plurality of first to fourth patterns as a pen sensing electrode and senses a stylus pen signal emitted from the stylus pen through the selected pen sensing electrode.

* * * * *